United States Patent
Hirukawa

(10) Patent No.: US 6,310,929 B1
(45) Date of Patent: Oct. 30, 2001

(54) IN-CORE FIXED NUCLEAR INSTRUMENTATION SYSTEM AND POWER DISTRIBUTION MONITORING SYSTEM

(75) Inventor: Koji Hirukawa, Kanagawa-Ken (JP)

(73) Assignee: Kabushiki Kaisha Toshiba, Kanagawa-ken (JP)

( * ) Notice: Subject to any disclaimer, the term of this patent is extended or adjusted under 35 U.S.C. 154(b) by 0 days.

(21) Appl. No.: 09/382,597

(22) Filed: Aug. 25, 1999

(30) Foreign Application Priority Data

Aug. 25, 1998 (JP) ................................. 10-238809

(51) Int. Cl.$^7$ .............................................. G21C 17/00
(52) U.S. Cl. ............................... 376/245; 376/254
(58) Field of Search .................. 376/245, 254, 376/255

(56) References Cited

U.S. PATENT DOCUMENTS

| | | | |
|---|---|---|---|
| 4,298,430 | * 11/1981 | Rolstad et al. | 376/254 |
| 4,637,913 | * 1/1987 | Jacquot et al. | 376/254 |
| 5,015,434 | * 5/1991 | Wimpee et al. | 376/254 |
| 5,225,149 | * 7/1993 | Banda | 376/255 |
| 5,251,242 | * 10/1993 | Impink, Jr. et al. | 376/254 |
| 5,473,644 | * 12/1995 | Yasuoka et al. | 376/254 |

FOREIGN PATENT DOCUMENTS 6-289182   10/1994  (JP).

* cited by examiner

Primary Examiner—Harvey E. Behrend
(74) Attorney, Agent, or Firm—Finnegan, Henderson, Farabow, Garrett & Dunner, L.L.P.

(57) ABSTRACT

In an in-core fixed nuclear instrumentation system for a reactor, each of a plurality of in-core nuclear instrumentation assemblies has a nuclear instrumentation tube. LPRM detectors are housed in the nuclear instrumentation tube for detecting LPRM signal in a core of the reactor. A GT assembly is housed in the tube. The GT assembly has fixed GT detectors for detecting γ-ray heating values and a built-in heater therein for calibrating the fixed GT detectors. The fixed GT detectors are arranged at least close to the fixed LPRM detectors, respectively. GT signals by the detected γ-ray heating values of the fixed GT detectors of each GT assemblies are processed by a GT signal processing unit. The heater in each GT assemblies is electrically energized by a GT heater control unit. Predetermined time intervals are stored in a memory unit. One of the predetermined time intervals for specified γ-ray thermometer assemblies, respectively is selected so that the GT heater control unit controls an electrical energy supplied to the heater by the selected interval so as to heat the heater, thereby executing a heater calibration of output voltage sensitivities of the fixed GT detectors of the GT assembly.

6 Claims, 24 Drawing Sheets

IN-CORE FIXED NUCLEAR INSTRUMENTATION SYSTEM AND POWER DISTRIBUTION MONITORING SYSTEM

BACKGROUND OF THE INVENTION

1. Field of the Invention

The present invention relates to an in-core fixed nuclear instrumentation system and a power distribution monitoring system of a reactor such as a boiling water type reactor.

2. Description of the Prior Art

A reactor, for example, a boiling water type reactor (hereinafter, referred simply to as BWR) is provided with a power distribution monitoring system which monitors a reactor operating mode and a reactor power distribution (hereinafter, in this specification, the reactor power distribution is described as "in-core power distribution", "core power distribution", or the like), as generally shown in FIG. 23 and FIG. 24.

In the BWR, as shown in FIG. 23, a reactor pressure vessel 2 is housed in a primary containment vessel 1, and a reactor core 3 is accommodated in the reactor pressure vessel 2. As shown in FIG. 24, the reactor core 3 is constructed in a manner that many fuel assemblies 4 and control rods 5 are mounted therein. In the reactor core 3, an in-core nuclear instrumentation assembly 6 is located on a position in the reactor core 3, which is surrounded by fuel assemblies 4.

As shown in FIG. 24, the in-core nuclear instrumentation assembly 6 is arranged in a corner water gap G formed by four fuel assemblies 4, and neutron detectors 8 are discretely arranged on several positions along a core axial direction in a nuclear instrumentation tube (pipe) 7.

The neutron detector 8 is a so-called fixed type, and in a boiling water type reactor (BWR), usually, four neutron detectors are discretely arranged on a fuel effective portion at equal intervals.

Further, in the nuclear instrumentation tube 7, a TIP (Traversing In-Core Probe) conduit pipe 9 is arranged, and in the TIP conduit pipe (tube) 9, one traversing neutron detector (TIP) 10 is located so as to be movable in an axial direction of the TIP conduit pipe 9. Moreover, as shown in FIG. 23, there is located a movable type neutron flux measuring system for axially continuously measuring neutron flux by means of a matrix device 11, a TIP driving device 12, a TIP control and neutron flux signal processing system 13 or the like. A reference numeral 14 denotes a penetration section, a reference number 15 denotes a valve mechanism and a reference number 16 denotes a shielding container. These neutron detectors 8 and 10, control systems such as signal processing systems 13 and 17 (will be described later) for neutron detectors 8 and 10 constitute a reactor nuclear instrumentation system 18.

On the other hand, the in-core fixed neutron detectors 8 {LPRM (local power range monitor) detector} arranged in the reactor core are divided into some groups, and then, an average signal {APRM (average power range monitor) signal} for each group is generated so that an power level of a power range of the reactor core 3 is monitored on the basis of these APRM signals. More specifically, when an abnormally transient phenomenon or accident such that neutron flux rapidly rises up happens, the LPRM detectors 8 detect the transient phenomenon and the occurrence of accident so that, according to the APRM signals generated by the detected signals of the LPRM detectors 8, a reactor safety protection system (not shown) rapidly makes a scram operation of a reactor scram system (not shown) such as a control rod driving mechanism or the like in order to prevent fuel assemblies or the reactor core from being break down. That is, the LPRM detector 8 is constituted as a part of the reactor safety protection system.

By the way, in individual in-core fixed neutron detectors 8, a sensitivity change takes place by neutron irradiation or the like. In order to calibrate a sensitivity of each neutron detector 8 for each predetermined period during operation, the TIP (traversing neutron detector) 10 is operated so as to obtain a continuous power distribution in a core axial direction, and the sensitivity change of each neutron detector 8 is corrected by means of a gain adjusting function of a neutron detector (LPRM) signal processing system 17. A detection signal S2 detected by the neutron detector 8 is processed by means of the signal processing system 17, and thereafter, is transmitted to a process computer 20 which will be described later.

In general, the BWR is provided with a process control computer 20 for monitoring an operating mode and power distribution of a nuclear (atomic) power plant. The process control computer 20 is provided with a nuclear instrumentation control system 21 for monitoring and controlling the reactor nuclear instrumentation system 18, a power distribution simulating system 22 including a physics model having three-dimensional thermal-hydraulics simulation code, and an input-output system 23. The reactor power distribution simulating system 22 is incorporated in one or plural process control computers 20 as a program.

Further, the reactor power distribution simulating system 22 includes a power distribution simulating module 24 and a power distribution learning (adaptive) module 25.

Neutron flux signal obtained by the TIP 10 of the reactor nuclear instrumentation system 18 is processed as a nuclear instrumentation signal corresponding to a core axial direction position by means of the TIP neutron flux signal processing system 13 of the reactor nuclear instrumentation system 18. Then, the nuclear instrumentation signal is read via the nuclear instrumentation control system 21 of the process control computer 20 into the power distribution simulating system 22 as a reference power distribution in a three-dimensional nuclear thermal-hydraulics simulation.

On the other hand, core state data S3 (process quantity) including a control rod pattern, a core coolant flow rate, an internal pressure of the reactor pressure vessel, flow of feed water, a temperature of feed water (a core inlet coolant temperature) and so on, which are used as various operating parameters indicative of a reactor operating mode (state) and obtained from a core state data measuring apparatus 26 as a reactor core state data measuring means, is read into a core state data processing system 27, and then, is processed so that a reactor thermal output or the like is calculated. Then, the reactor core state data S3 including the calculated reactor thermal output is transmitted to the reactor power distribution simulating system 22 via the nuclear instrumentation control system 21 of the process control computer 20.

In fact, the reactor core state data measuring apparatus 26 is composed of a plurality of monitoring devices. In addition, the reactor core state data measuring apparatus 26 is a general name of an apparatus for collecting process data of various operating parameters of the reactor, and is shown as one measuring apparatus in FIG. 23 for simplification. Moreover, the core state data processing system 27 may be used as one function of the process control computer 20.

The detection signals S2 and the core state data S3 transmitted in the aforesaid manner are transmitted to the power distribution simulating system 22 of the process control computer 20. In the power distribution simulating system 22, a core power distribution is simulated on the basis of the transmitted core state data S3 and the three-dimensional nuclear thermal-hydraulics simulation code of the power distribution simulating module 24. Further, the power distribution simulating system 22 learns a reference power distribution of the core nuclear instrumentation data by a learning function (adapting function) of the power distribution learning (adapting) module 25, and then, corrects the simulation result (core power distribution) while referring to the reference power distribution. As a result, in a power distribution predictive simulation after that, it is possible to accurately simulate a reactor power distribution.

In the conventional in-core nuclear instrumentation assembly 6, in place of the traversing neutron detector 10, as shown in a perspective view partly in section of FIG. 25, there may be provided a traversing γ-ray detector 10A which is moved in a core axial direction so as to continuously measure a γ-ray flux in the core axial direction. The γ-ray is generated in proportional to a fission quantity in the reactor core; for this reason, the γ-ray flux is measured, and whereby, it is possible to measure a fission quantity profile in the reactor core.

By using the traversing neutron detector 10 and the γ-ray detector 10A, it is possible to calibrate a dispersion of each detection accuracy of each plural neutron detector 8 arranged in the core axial direction.

As described above, in the conventional reactor nuclear instrumentation system 18, in order to continuously measure a power distribution in the axial direction of the reactor core 3, the traversing neutron detector 10 and the traversing γ-ray detector 10A constituting a movable type in-core instrumentation system have been used.

However, in the traversing (movable type) neutron detector 10 and the γ-ray detector 10A, measurement is made in a manner of vertically moving at least one neutron detector 10 or γ-ray detector 10A over the entire length (core axial length) of the core 3 in the TIP conduit tube 9 from the outside of the reactor pressure vessel 2. For this reason, there are the problems that a mechanical driving and operating mechanism for moving and operating the traversing neutron detector 10 and the γ-ray detector 10A is made large and its structure is complicate so that a moving operation and maintenance of the mechanical driving and operating mechanism are troublesome. In particular, maintenance and management are required for the mechanical driving and operating mechanisms such as the detector driving device 12 for moving and operating the traversing neutron detector 10 and the traversing γ-ray detector 10A, the matrix device 11 for selecting the TIP conduit tube 9, the valve mechanism 15, the shielding container 16 or the like. In addition, the traversing detectors 10 and 10A are activated; for this reason, there is the possibility that an operator (worker) which is carried out the above maintenance and management works of the traversing neutron detector 10 and the traversing γ-ray detector 10A is exposed.

In view of the above problem, in the reactor nuclear instrumentation system, there is made a demand for a method of monitoring a reactor operating mode and a power distribution in a core axial direction without using a traversing type measuring (nuclear instrumentation) system.

The in-core nuclear instrumentation assembly 6 used in the conventional reactor nuclear instrumentation system is usually provided with four fixed neutron detectors 8, one traversing neutron detector (TIP) 10 or traversing γ-ray detector 10A, and a hollow conduit (TIP conduit tube 9) for housing movably the traversing neutron detector (traversing γ-ray detector). In place of the TIP 10, a study has been made such that a fixed γ-ray heating detector is arranged in the same manner as the fixed neutron detector 8.

However, in the case where a plurality of, for example, four fixed γ-ray heating detectors, are located in a core axial direction, it is impossible to measure a power on an upper and lower portions of the reactor core 3. Further, in the case of extrapolating measurement data on the upper and lower portions of the reactor core 3 from four measurement data or interpolating these four measurement data, a behavior of power distribution change differs between individual portions in the core axial direction; for this reason, a great measurement error is caused so that an accuracy becomes worse.

If only fixed measuring (nuclear instrumentation) devices are located at several positions in an axial direction in the reactor nuclear instrumentation system, a measurement error is great in a power distribution of the core axial direction. For this reason, there is a need of previously setting a great margin on a limiting condition (operational thermal limit) for a reactor operation. As a result, a degree of the margin of the reactor operation is reduced, so that there is the possibility of giving a bad influence to an availability factor of the reactor.

Moreover, in order to improve a measurement accuracy of the power distribution in the core axial direction, it is considered that a plurality of fixed γ-ray heating detectors are arranged in the core axial direction. However, in this case, a number of detector signal cables is increased, and there is a limit to arrange many γ-ray heating detectors in view of restriction of the number of detector connecting cables capable of passing through the nuclear instrumentation tube 7 of the in-core nuclear instrumentation assembly 6.

As disclosed in Japanese Unexamined Patent Publication No. 6-289182, there has been proposed a reactor nuclear instrumentation system in which many γ-ray heating detectors (called as GT or GT detector) are arranged. However, in the reactor nuclear instrumentation system, a γ-ray heating contributing range analysis and a knowledge of γ-ray heating are insufficient. Since at least one of γ-ray heating detectors located on upper and lower ends of the core is arranged at a position within 15 cm from the upper and lower ends of the fuel effective portion of the core axial direction, it is difficult to accurately detect each γ-ray heating value on the upper and lower ends of the fuel effective portion.

In the case of measuring a power distribution of reactor core with the use of many fixed γ-ray heating detectors (GT detectors), a part of these many GT detectors is arranged in the vicinity of an LPRM detector, and thereby, the following technique has been proposed; more specifically, since the GT detector has characteristic of less variation of bias, sensitivity or gain of the LPRM detector is adjusted by means of GT detectors, or a GT assembly, which has a plurality of GT detectors arranged in an axial direction, is used as core axial direction power distributing measuring means, in place of the traversing neutron detector or the traversing gamma-ray detector.

In the γ-ray heating detector (GT detector) used in the conventional reactor nuclear instrumentation system, a differential thermocouple is used for detecting a γ-ray heating temperature. For this reason, the following report has been made; more specifically, almost no aged deterioration; however, a voltage output of the thermocouple with respect to a gamma heat value lowers depending upon an elapse time for unit of week or month, and a saturated phenomenon of the voltage output happens after a stay time of the GT detector in the core (mounted time of the GT detector in the core) to some degree. Therefore, with the use of a heater incorporated into a gamma-ray thermometer (GT) assembly comprising a plurality of GT detectors, a sensitivity {sensitivity coefficient (constant); a value for determining a relationship between a thermocouple output voltage of each GT detector and a γ-ray heating value (unit: W/g) per unit weight} is periodically measured. Then, the measured sensitivity value is checked, and when the measured sensitivity value is changed over a constant level, it is necessary to calculate a γ-ray heating value of the GT detector from a thermocouple output voltage signal with the use of a new sensitivity coefficient corresponding to the changed sensitivity value.

In this specification, the aforesaid processing, that is, a processing of measuring a sensitivity of each GT detector with the use of the heater, and in the case where a sensitivity change with respect to the measurement result exceeds a constant level, setting a new sensitivity coefficient corresponding to the changed sensitivity, is described as "sensitivity calibration processing".

Moreover, when carrying out the aforesaid sensitivity calibration processing, a GT signal outputted from the GT detector is bypassed so as not to be used for power distribution measurement processing. In addition, the GT detector or GT assembly, which is not used for the aforesaid power distribution measurement processing because the sensitivity of the GT detector or GT assembly is being calibrated or the sensitivity of that shows a defective value so that the GT detector or GT assembly is out of order, is called as bypassed GT detector or bypassed GT assembly.

By the way, the GT assembly is incorporated in the same in-core nuclear instrumentation tube integrally with the LPRM detector assembly which are thermal neutron detectors. A sensitivity with respect to a thermal neutron of the LPRM detector is determined depending upon a change by an in-core irradiation quantity of U235 and U234 coated onto an inner surface of a fission detector. If the sensitivity with respect to a thermal neutron of the LPRM detector gets to be a constant value or less, the in-core nuclear instrumentation assembly, that is, the in-core nuclear instrumentation tube including the LPRM detectors and the GT assembly having a sensitivity lowering to a constant value or less, is replaced together. Therefore, in actual use, an in-core mounted elapse time of the gamma-ray thermometer (GT) assembly differs for each in-core nuclear instrumentation assembly.

An actual sensitivity of the GT detector in the output voltage sensitivity calibration processing by a heater incorporated into the GT assembly, is measured by the following equation (2) which will be described later, on the basis of an increase of the thermocouple voltage signal by a additional heating value of the GT detector.

For this reason, in a thermal equilibrium state that additional heating by a built-in heater is sufficiently completed, an average value must be obtained from large number of time series data of one GT detector signal. Therefore, a time of approximately 30 to 60 seconds per GT assembly is required to collect the GT signal (output voltage signal).

In an ABWR (Advanced Boiling Water Reactor) in a 135 ten-thousand kWe range, the reactor core is provided with 52 in-core nuclear instrumentation tubes each including the aforesaid GT assembly. Therefore, in the case of carrying out a calibration by the built-in heater of the GT assembly, if three circuits are prepared for each tube, about 9 to 20 minutes are required depending upon the number of power supply circuits of the heater and heating value measuring circuits of the heater.

Moreover, in a core mounted lifetime (approximately 7 years) of the GT assembly, if a heater calibration of the GT assembly is carried out according to heating by the heater, there is the possibility that the heater is latently break down. Thus, by avoiding unnecessary calibration by heater heating, and shortening a time spent for the calibration by heater heating, it is desirable to reduce a time inoperable of measuring a power distribution of the whole core by the GT signal as much as possible.

On the other hand, during a calibration of the GT assembly by heater heating and in-core power distribution measurement by the calibrated GT assembly, it is necessary that the core or in-core power distribution is a steady state for a predetermined time or more (approximately one hour when a gamma decay chain becomes a substantially equilibrium state) on the basis of the principle of measuring a gamma-ray heating value.

In the BWR, the process control computer has a built-in three-dimensional simulator, and a core power distribution simulation is periodically or always carried out with the use of the parameter of core state data such as a reactor pressure, a core heat output, a core coolant flow rate, a control rod pattern or the like, and thus, it is confirmed that a fuel assembly satisfies a core operational thermal condition (limit).

Before a time (within about one hour) relatively shorter than the point of time of a periodically core power distribution simulation, for example, in the case where the core power distribution varies by a change of the control rod pattern or a great change of the core coolant flow rate, the LPRM detector can instantaneously output neutron flux signal corresponding to a power distribution change. However, a signal (GT signal) of the GT detector becomes a precise signal level after a predetermined time, for example, one hour or more elapses because a delayed gamma-ray source slowly varies.

Therefore, it is impossible to carry out the in-core power distribution adaptive correction processing or LPRM detector sensitivity and gain adjustment processing until the GT signal becomes the precise signal level. For this reason, the in-core power distribution adaptive correction processing or LPRM detector sensitivity and gain adjustment processing can not be periodically or always carried out.

SUMMARY OF THE INVENTION

The present invention is directed to overcome the foregoing problems.

Accordingly, it is a first object of the present invention to provide an in-core fixed nuclear instrumentation system and a power distribution monitoring system, which accurately carry out a heater heating calibration control of a gamma-ray thermometer assembly (GT assembly) so as to improve a sensitivity calibration or gain calibration of a GT detector or an LPRM detector, making it possible to carry out a high accurately power distribution simulation.

A second object of the present invention is to provide an in-core fixed nuclear instrumentation system and a power distribution monitoring system, which decrease a heater heating calibration time of a gamma-ray thermometer assembly so as to reduce a heat damage probability so as to be able to accurately adjust a sensitivity of an LPRM detector or gain thereof.

Further, a third object of the present invention is to provide an in-core fixed nuclear instrumentation system and a power distribution monitoring system, which accurately perform a heater heating calibration control of gamma-ray thermometer assemblies on the basis of the difference between the respected in-core mounted times of the respected gamma-ray thermometer assemblies or the difference between the respected in-core irradiation burn-ups of the respected gamma-ray thermometer assemblies so as to prevent a wasteful sensitivity calibration of a part of the gamma-ray thermometer assemblies which is in a sensitivity stabilizing state, thereby reducing a load of an operator.

Moreover, a fourth object of the present invention is to provide an in-core fixed nuclear instrumentation system and a power distribution monitoring system, which accurately carry out a heater heating calibration control of a gamma-ray thermometer assembly so as to improve, when a GT signal level of a GT detector of the gamma-ray thermometer assembly is in an equilibrium state, a sensitivity adjustment accuracy or gain adjustment accuracy of an LPRM detector and an in-core power distribution simulation accuracy.

Still furthermore, a fifth object of the present invention is to provide an in-core fixed nuclear instrumentation system and a power distribution monitoring system, which accurately carry out a heater heating calibration control of a gamma-ray thermometer assembly whereby, even in a case where GT signal level of a GT detector of the gamma-ray thermometer is in a non-equilibrium state, to periodically or always carry out a sensitivity adjustment or gain adjustment of an LPRM detector, and further, accurately to carry out an in-core power distribution simulation with the use of a calibration value of an LPRM signal or an equilibrium predictive value of the GT detector.

A sixth object of the present invention is to provide a power distribution monitoring system which captures a high accurate GT signal or LPRM signal in a power distribution simulating system so as to accurately carry out a power distribution simulation after a core state (operating mode) varies, thereby accurately monitoring the power distribution in the core according to the simulated power distribution.

In order to achieve such objects, according to one aspect of the present invention, there is provided an in-core fixed nuclear instrumentation system for a reactor, comprising: a plurality of in-core nuclear instrumentation assemblies each having a nuclear instrumentation tube, a plurality of fixed neutron detectors housed in the nuclear instrumentation tube and adapted to detect neutron flux of a local power distribution of a power range in a core of the reactor and a gamma-ray thermometer assembly housed in the nuclear instrumentation tube, the gamma-ray thermometer assembly having a plurality of fixed γ-ray heating detectors for detecting γ-ray heating values and a heater built therein and adapted to calibrate the fixed γ-ray heating detectors, the fixed γ-ray heating detectors being arranged at least close to the fixed neutron detectors; means for processing a neutron flux detection signal based on the detected neutron flux by each of the fixed neutron detectors; means for processing a gamma-ray thermometer signal based on the detected γ-ray heating value by each of the fixed γ-ray heating detectors of each of the gamma-ray thermometer assemblies; means for electrically energizing the heater in each of the gamma-ray thermometer assemblies; means for storing a plurality of predetermined time intervals therein; and means for selecting one of the predetermined time intervals for specified γ-ray thermometer assemblies respectively, wherein the energizing means is adapted to control an electrical energy supplied to the heater according to the selected one of the predetermined time intervals so as to heat the heater, thereby executing a heater calibration of output voltage sensitivities of the fixed γ-ray heating detectors of the gamma-ray thermometer assembly.

In preferred embodiment of this aspect, the energizing means has means for measuring increase sensitivities of the output voltage of the fixed γ-ray heating detectors of the gamma-ray thermometer assemblies and current and voltage corresponding to the supplied electrical energy so as to execute the heater calibration according to the measured increase sensitivities and the measured currents and voltages, the increase sensitivities being caused to the heating of the heaters, and the selection means has means for storing at least one of an in-core mounted time of each of the gamma-ray thermometer assemblies and an in-core irradiation quantity of each of the fixed γ-ray heating detectors thereof, which are calculated while the reactor operates, the in-core mounted time of each of the gamma-ray thermometer assemblies representing an operating time of the reactor after each of the gamma-ray thermometer assemblies is mounted in the core, and means for selecting one of the predetermined time intervals according to at least one of the in-core mounted time and the in-core irradiation quantity corresponding to the gamma-ray thermometer assembly.

This aspect of the present invention has an arrangement that the energizing means is adapted to store time series data of the output voltage sensitivity of the fixed γ-ray heating detector of each of the gamma-ray thermometer assemblies, estimate a change curve of each output voltage sensitivity thereof by sampling latest two and over time series data points from a present point of time by using the time series data, in a case where the change curve of the output voltage sensitivity exceeds a predetermined judgement value preset with respect to a predetermined future time, set another one of the predetermined time intervals prior to the selected time interval, the another one of the time intervals being shorter than the selected time interval or being a maximum time interval of the predetermined time intervals satisfying the predetermined judgement value, and execute the heater calibration of the output voltage sensitivity by heating of the heater at a resettled future time in accordance with the set another one of the time intervals.

In preferred embodiment, this aspect further comprises: means for detecting a core state data representing in a state of the core, wherein the energizing means is adapted to detect a change of the core state according to the detected core state data, judge whether or not a predetermined time after detecting the change of the core state elapses and execute the heater calibration in a case where the predetermined time after detecting the change of the core state elapses.

For achieving such objects, according to another aspect of the present invention, there is provided a power distribution monitoring system for a reactor, comprising: a plurality of in-core nuclear instrumentation assemblies each having a nuclear instrumentation tube, a plurality of fixed neutron detectors housed in the nuclear instrumentation tube and adapted to detect neutron flux of a local power distribution of a power range in a core of the reactor and a gamma-ray thermometer assembly housed in the nuclear instrumentation tube, the gamma-ray thermometer assembly having a plurality of fixed γ-ray heating detectors for detecting γ-ray heating values and a heater built therein and adapted to calibrate the fixed γ-ray heating detectors, the fixed γ-ray heating detectors being arranged at least close to the fixed neutron detectors; means for processing a neutron flux detection signal based on the detected neutron flux by each of the fixed neutron detectors; means for processing gamma-ray thermometer signals based on the detected γ-ray heating values by the fixed γ-ray heating detectors of each of the gamma-ray thermometer assemblies; means for electrically energizing the heater in each of the gamma-ray thermometer assemblies; means for detecting a core state data representing in a state of the core; means for detecting a change of the core state according to the detected core state data so as to judge whether or not a predetermined time after detecting the change of the core state elapses; and means for gathering at least one of the gamma-ray thermometer signal processed by the gamma-ray thermometer process means from a predetermined fixed γ-ray heating detector and the gamma-ray heating value calculated with the gamma-ray thermometer signal therefrom.

In preferred embodiment, the another aspect further comprises means for adjusting at least one of a sensitivity and a gain of the fixed neutron detector in a case where the predetermined time after detecting the change of the core state elapses by using the gamma-ray heating value simulated by the gamma-ray thermometer signal from the predetermined fixed γ-ray heating detector, the predetermined fixed γ-ray heating detector and the adjusted fixed neutron detector being housed in the identical in-core instrumentation tube, the predetermined fixed γ-ray heating detector being located identically to a core axial direction of the adjusted fixed neutron detector.

This another aspect of the present invention has an arrangement comprising means for simulating a power distribution in the core according to at least one of the gamma-ray thermometer signal and the neutron flux signal, wherein, in a case where a predetermined time after detecting the change of the core state does not elapse, the detecting means inputs the neutron flux signal to the simulating means in a place of the gamma-ray thermometer signal, and wherein the simulating means has a memory for storing adaptive correction quantities by simulating power distribution according to the gamma-ray thermometer signals at a latest point of time, executes a power distribution simulation corresponding to the core state at the present point of time based on the above predetermined adaptive correction quantities and the current core state, obtains a pseudo gamma-ray thermometer signal by correcting a difference in response between the change of the neutron flux signal predicted by a simulation from the latest point of time and a change of a gamma-ray thermometer signal predicted by a simulation while accounting a change of a control rod state and void fraction of fuel nodes around the neutron flux detectors until the present point of time from the latest point of time, simulates the power distribution at the present point of time while adapting the power distribution by interpolating and extrapolating correction ratios obtained by making a comparison between the pseudo gamma-ray thermometer signal and the simulated equilibrium value of the gamma-ray thermometer signal in an axial direction of the core so as to obtain an additional correction ratio of all axial nodes, evaluates a power distribution even in a case where a gamma-ray thermometer signal is in a non-equilibrium transient state, and executes a zero-clear process of the additional correction ratio when the gamma-ray thermometer signal is in an equilibrium state by simulating the power distribution so as to obtain the adaptive correction quantity according to the gamma-ray thermometer signal so as to store it therein.

To achieve such objects, according to further aspect of the present invention, there is provided a power distribution monitoring system for a reactor, comprising: a plurality of in-core nuclear instrumentation assemblies each having a nuclear instrumentation tube, a plurality of fixed neutron detectors housed in the nuclear instrumentation tube and adapted to detect neutron flux of a local power distribution of a power range in a core of the reactor and a gamma-ray thermometer assembly housed in the nuclear instrumentation tube, the gamma-ray thermometer assembly having a plurality of fixed γ-ray heating detectors for detecting γ-ray heating values and a heater built therein and adapted to calibrate the fixed γ-ray heating detectors, the fixed γ-ray heating detectors being arranged at least close to the fixed neutron detectors; means for processing a neutron flux detection signal based on the detected neutron flux by each of the fixed neutron detectors; means for processing gamma-ray thermometer signals based on the detected γ-ray heating values by the fixed γ-ray heating detectors of each of the gamma-ray thermometer assemblies; means for electrically energizing the heater in each of the gamma-ray thermometer assemblies; means for detecting a core state data representing in a state of the core; means for detecting a change of the core state according to the detected core state data so as to judge whether or not a predetermined time after detecting the change of the core state elapses; in a case where predetermined time after detecting the change of the core state does not elapse, means for estimating equilibrium signal levels of the gamma-ray thermometer signals of the gamma-ray heating detectors after the predetermined time elapses; and means for executing a power distribution simulation corresponding to the core state at a present point of time while adapting the power distribution by interpolating and extrapolating correction ratios obtained by making a comparison between gamma-ray thermometer signal reading values simulated from the simulated power distribution and the evaluated equilibrium signal levels of the gamma-ray thermometer signals in an axial direction of the core, so as to obtain a correction ratio of all axial nodes, thereby evaluating a power distribution even in a case where gamma-ray thermometer signals are in a non-equilibrium transient state.

In preferred embodiment of this further aspect, the estimation means is adapted to estimate an equilibrium signal level of the gamma-ray thermometer signal after a required time elapses by using time series gamma-ray thermometer signal readings, read a gamma-ray thermometer signal each new time while a prediction function execution instruction is inputted to the estimation means, cancel an oldest data of reading value of the gamma-ray thermometer signal so as to update estimated equilibrium reading value thereof by using a least square approximation, and transmit the updated estimated equilibrium value of the gamma-ray thermometer signal to the execution means, whereby the execution means executes the power distribution simulation by using the updated estimated equilibrium reading values of the gamma-ray thermometer signals.

In preferred embodiment of this further aspect, the estimation means is adapted to gather a number of gamma-ray thermometer signals of time series, estimate an equilibrium signal level of the gamma-ray thermometer signal after a required time elapses, read the gamma-ray thermometer signal each new time, and cancel an oldest data of the reading value of the gamma-ray thermometer signal so as to update estimated equilibrium reading value thereof by using a least square approximation, and wherein the execution means corrects the simulated power distribution according to the estimated equilibrium gamma-ray thermometer signal reading values.

BRIEF DESCRIPTION OF THE DRAWINGS

Other objects and aspects of the present invention will become apparent from the following description of embodiments with reference to the accompanying drawings in which.

DETAILED DESCRIPTION OF THE PREFERRED EMBODIMENTS

Embodiments of an in-core fixed nuclear instrumentation system and a power distribution monitoring system according to the present invention will be described hereinafter with reference to the accompanying drawings.

[First embodiment]

Figure 1:
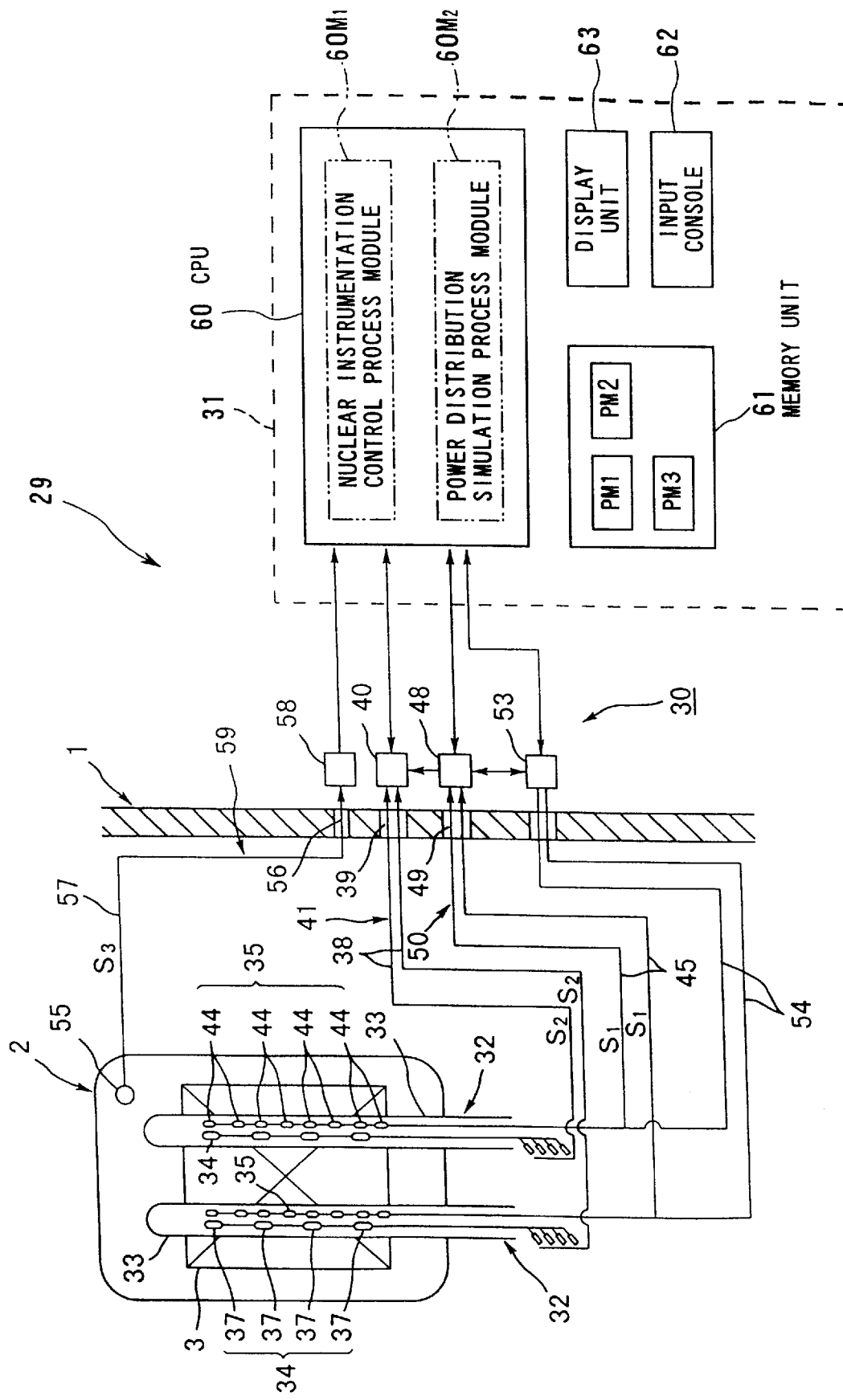
FIG. 1 is a block diagram showing a schematically structure of a reactor power distribution monitoring system of a boiling water type reactor (BWR) according to a first embodiment of the present invention.
Figure 23:
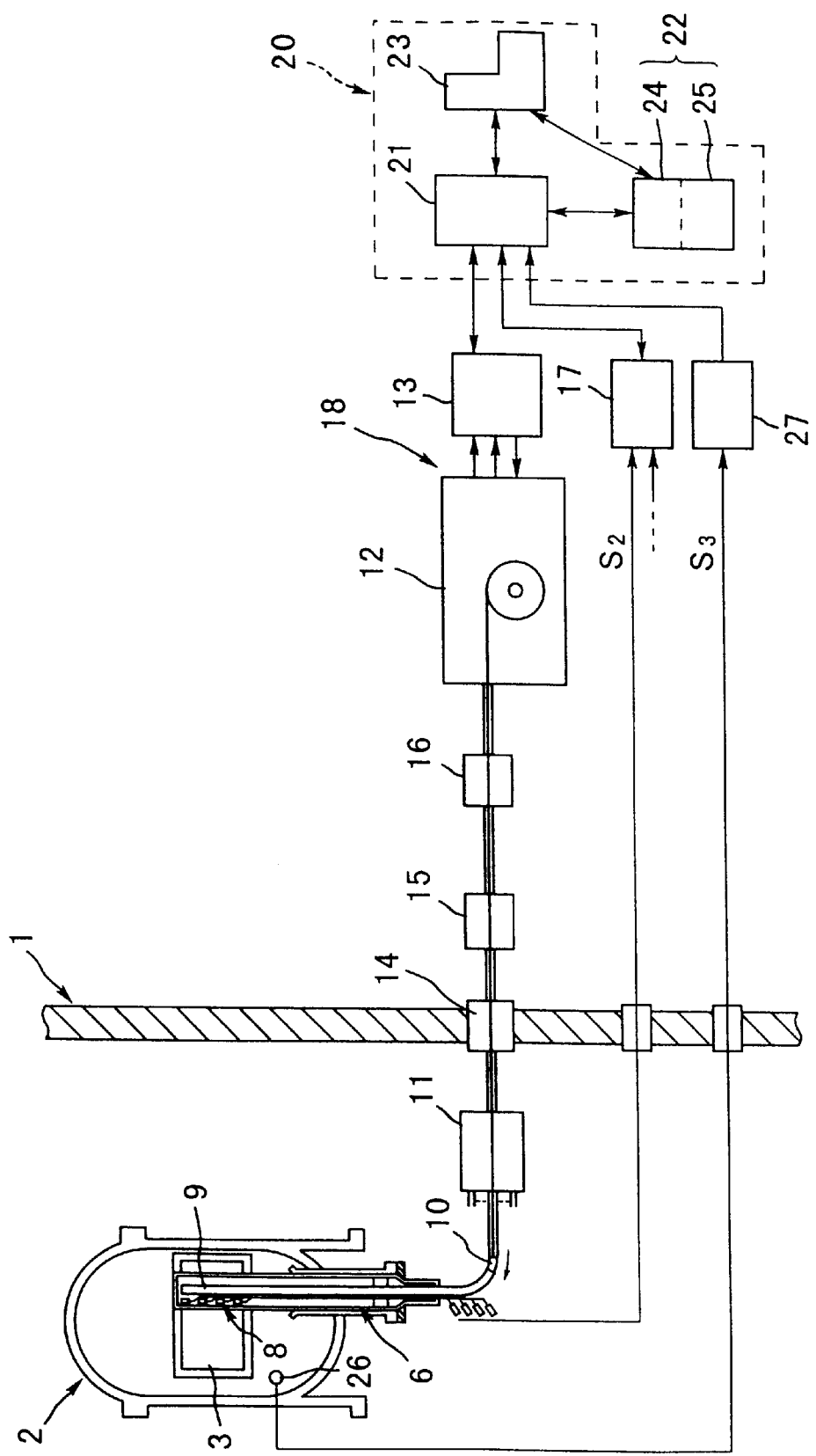
FIG. 23 is a block diagram showing a conventional reactor power distribution monitoring system and a conventional reactor power distribution simulating system.
Figure 24:
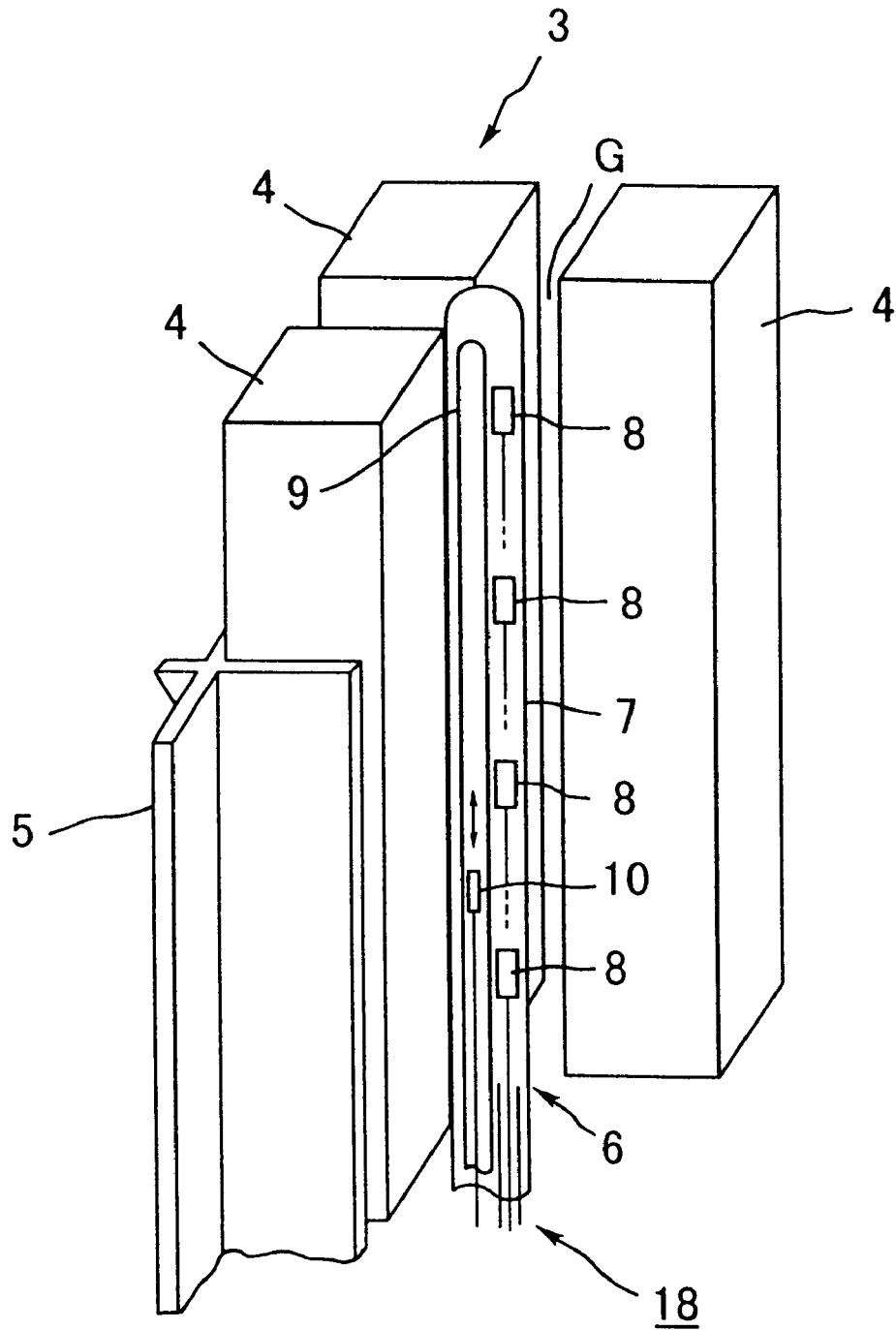
FIG. 24 is a view showing an arrangement relationship between detectors of a conventional power distribution measuring system and showing a traversing neutron detector and a fixed neutron detector in FIG. 23.
Figure 25:
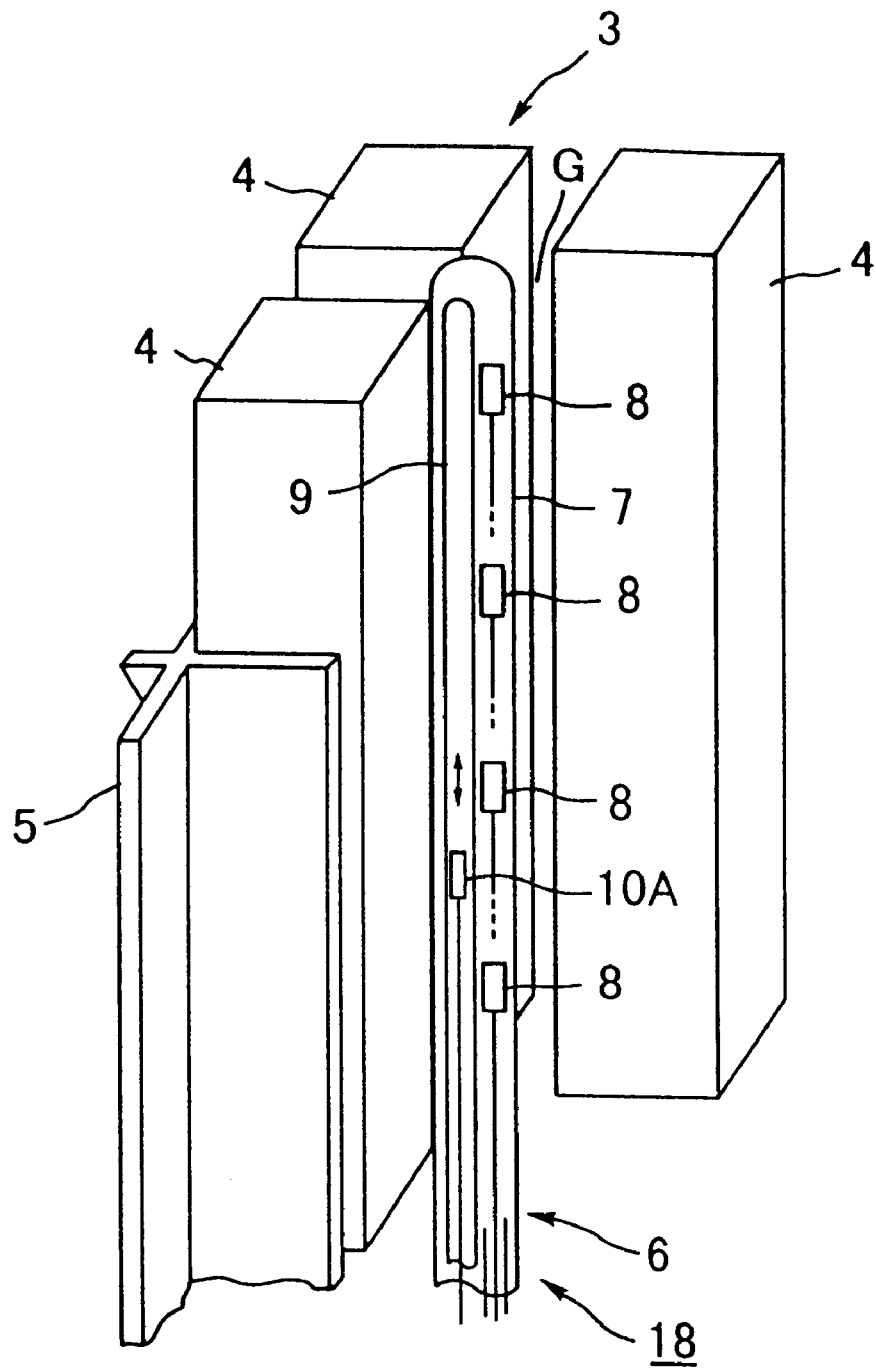
FIG. 25 is a view showing an arrangement relationship between detectors of a conventional power distribution measuring system and showing a traversing gamma-ray detector and a fixed gamma-ray detector in FIG. 23.

FIG. 1 is a block diagram showing a schematically structure of a reactor power distribution monitoring system of a boiling water type reactor (BWR) according to a first embodiment of the present invention. In the reactor power distribution monitoring system shown in FIG. 1, the same component or configuration as the power distribution monitoring system of the BWR shown in FIG. 23 to FIG. 25 will be described with the use of like reference numerals.

As shown in FIG. 1, a reactor power distribution monitoring system 29 of a boiling water type reactor includes an in-core fixed nuclear instrumentation system 30 having detectors and signal processing units, and a process control computer 31 for monitoring an operating mode of a reactor and a core performance.

The process control computer 31, as shown in FIG. 1, comprises, for example, a CPU 60, a memory unit 61, an input console 62 and a display unit 63. The CPU 60 is electrically connected to the memory unit 61, input console 62 and the display unit 63 so as to communicate to each other.

The process control computer 31 has a function for simulating a core power distribution of the BWR, and a function for monitoring a core performance of the BWR according to the simulated core power distribution.

Figure 2:
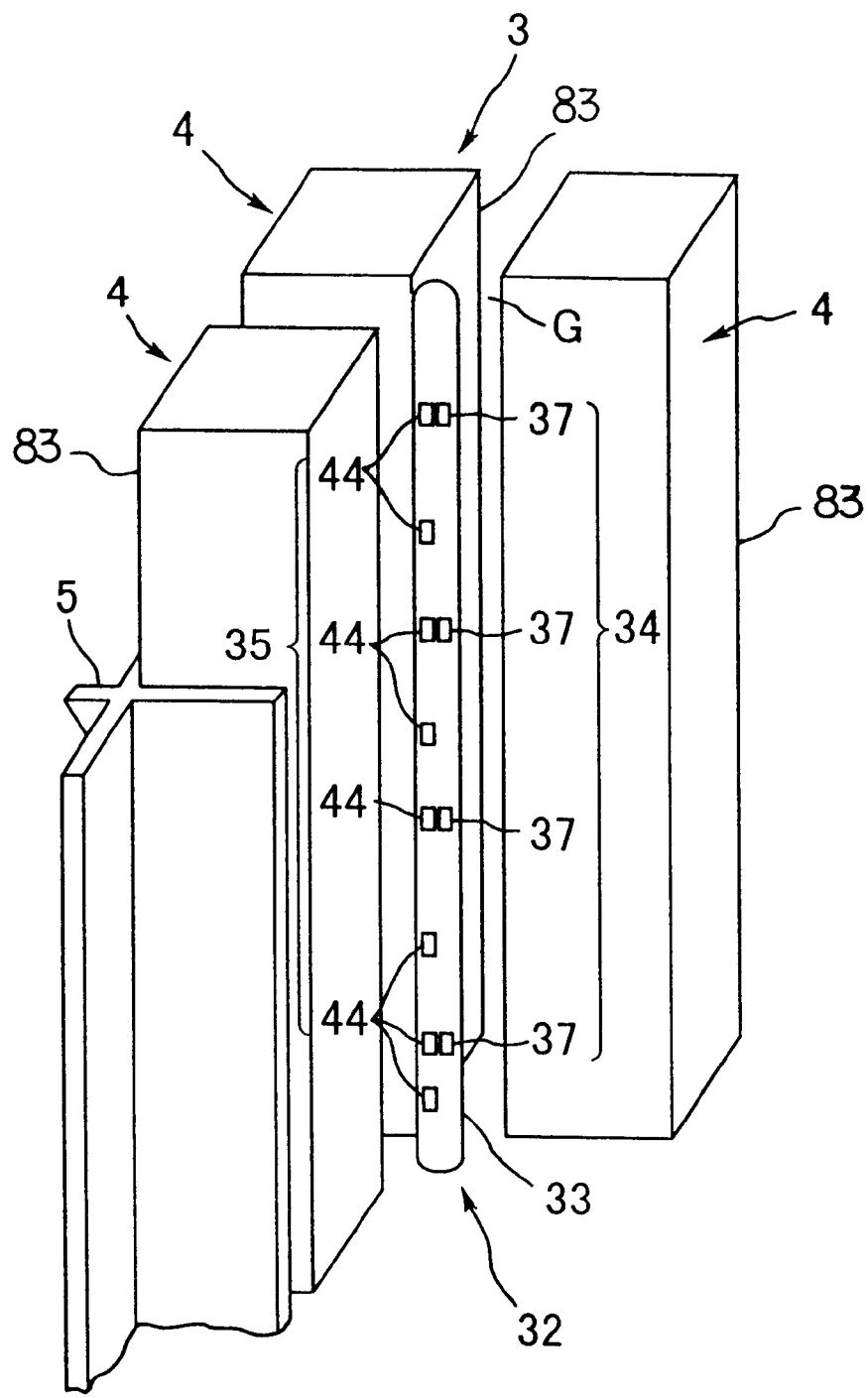
FIG. 2 is a perspective view, partly broken away, showing an arrangement relationship of detectors of an in-core fixed nuclear instrumentation system of the power distribution monitoring system according to the first embodiment of the present invention.
Figure 3:
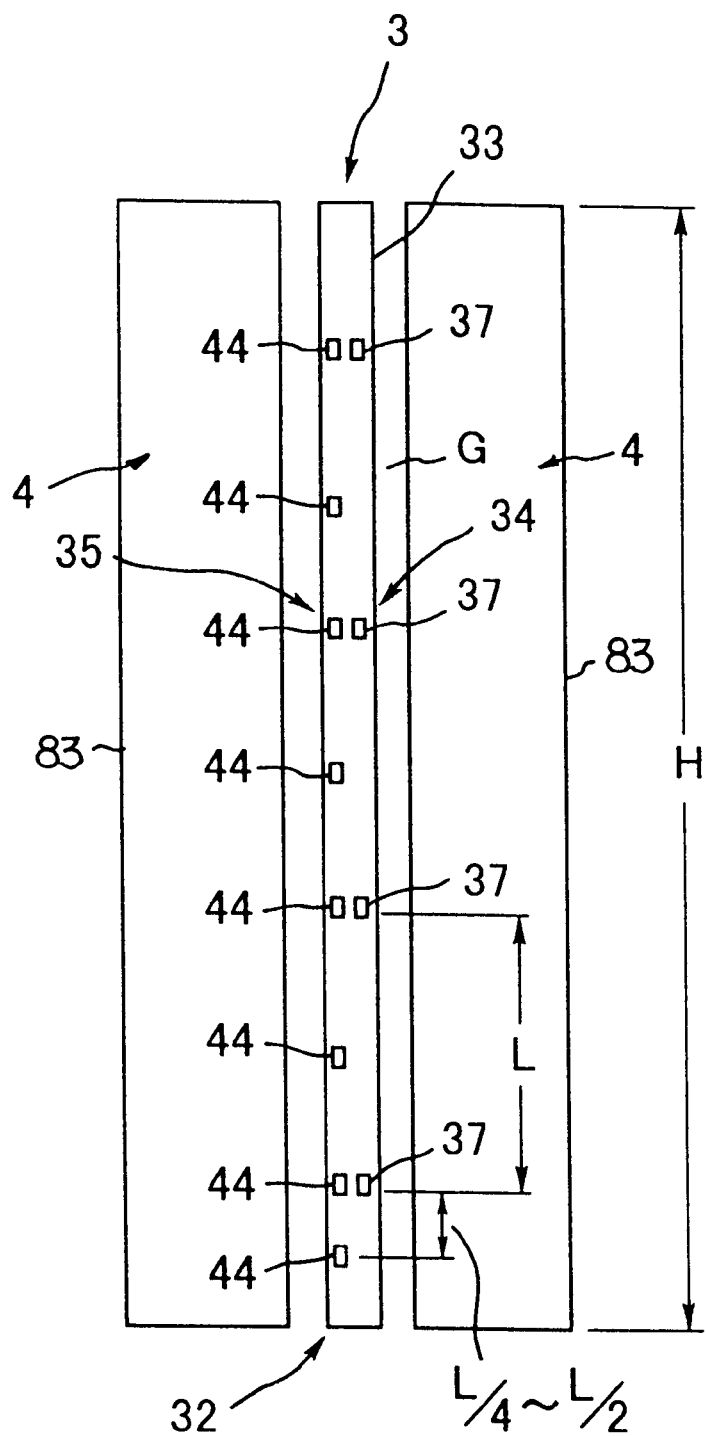
FIG. 3 is a front view, partly broken away, showing the arrangement relationship of the detectors in FIG. 2.

On the other hand, in the BWR, a reactor pressure vessel 2 is housed in a primary containment vessel 1, and a reactor core 3 is housed in the reactor pressure vessel 2. The core 3 is cooled by a coolant used as a moderator. In the reactor core 3, a large number of fuel assemblies 4 are mounted as shown in FIG. 2 and FIG. 3. In large number of fuel assemblies 4, four fuel assemblies is constructed as one group, a control rod 5 having a cross-like shape in its lateral cross section is mounted between each of the four fuel assemblies constructed as one group so as to be taken in and out from below of each of the fuel assembly group.

The reactor core 3 is constructed by mounting large number of groups of four fuel assemblies, and is provided with a plurality of, for example, 52 in-core nuclear instrumentation assemblies 32 which function as a detect unit of the reactor nuclear instrumentation system. Each in-core nuclear instrumentation assembly 32 is arranged at a position different from the place where the control rod 5 is located, and is located at a corner water gap G formed between four fuel assemblies 4 as shown in FIG. 2 and FIG. 3.

More specifically, the in-core nuclear instrumentation assembly 32 includes a thin and long tube-like nuclear instrumentation tube 33, a neutron detector assembly (LPRM detector assembly) 34 functioning as a fixed neutron detection means (LPRM) and a γ-ray heating detector assembly (GT assembly) 35 functioning as a fixed γ-ray detecting means (gamma-ray thermometer), which are housed in the nuclear instrumentation tube 33, respectively.

The LPRM detector assembly 34 is constructed in a manner that a plurality of LPRM detectors 37 functioning as the fixed neutron detectors are discretely arranged in a core axial direction at equal intervals in the nuclear instrumentation tube 33. In the boiling water type reactor, in general, four LPRM detectors 37 are discretely arranged on a fuel effective portion of the core 3 in the core axial direction at equal intervals. Further, each LPRM detector 37 is adapted to detect neutron flux so as to generate a neutron flux signal (LPRM signal) according to the measured neutron flux. Moreover, each LPRM detector 37 is electrically connected to an LPRM signal processing unit 40 by means of a signal cable 38 through a penetration portion 39, and thus, a power range neutron flux measuring system 41 is constructed. The LPRM signal processing unit 40 include a computer having a CPU, a memory unit and so on, is operative to perform, for example, A/D conversion operation and gain processing operation of each LPRM signal S2 transmitted from each LPRM detector 37 so as to obtain digital LPRM signals (LPRM data) D2, and then, transmits them to the process control computer 31.

On the other hand, the GT assembly 35 is constructed in a manner that a plurality of fixed γ-ray heating detectors 44 are discretely arranged in a core axial direction, and a gamma-ray heating value is measured by means of each γ-ray heating detector. The same number or more as LPRM detectors 37 arranged in the core axial direction, for example, eight (8) γ-ray heating detectors 44 are arranged in the core axial direction, and a assembly of the γ-ray heating detectors is constructed as the gamma-ray thermometer assembly (GT assembly) 35. Each γ-ray heating detector 44 of the GT assembly 35 is electrically connected to a gamma-ray thermometer signal processing unit 48 by means of a signal cable 45 through a penetration portion 49, and thus, a gamma-ray thermometer power distribution measuring system 50 is constructed.

Figure 4:
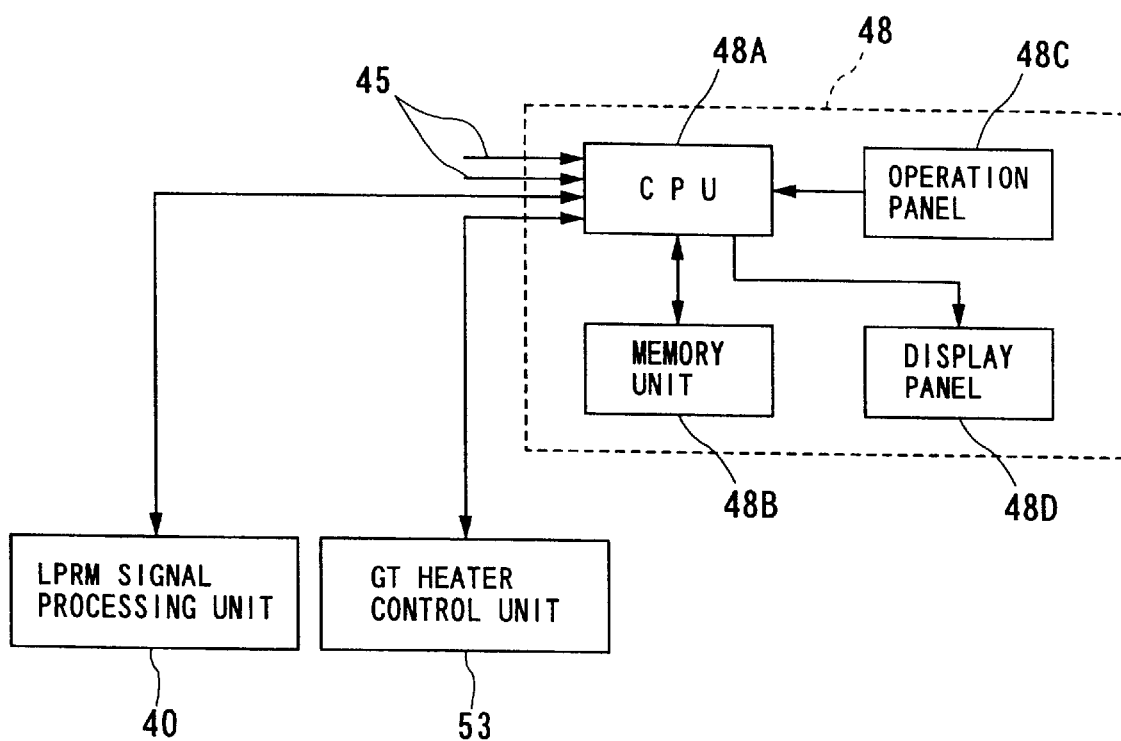
FIG. 4 is a block diagram showing a structure of a GT signal processing unit in FIG. 1 according to the first embodiment.

The gamma-ray thermometer signal processing unit 48 (hereinafter, also described as GT signal processing unit 48) is, as shown in FIG. 4, a computer which includes a CPU 48A, a memory unit 48B, an operation panel 48C and a display panel 48D or the like. The CPU 48A is electrically connected to the memory unit 48B, the operation panel 48C and the display panel 48D so as to communicate to each other. The GT signal processing unit 48 is operative to, according to the GT signals S1 outputted from each gamma-ray heating detector 44 of each GT assembly 35 and each sensitivity $S_0$ of each gamma-ray heating detector 44, obtain digital γ-ray heating measurement signals (GT signals D1; or described as GT data D1, hereinafter) each representing a γ-ray heating value (W/g) per unit weight. The GT signal processing unit 48 is also operative to transmit the obtained GT data D1 to the process control computer 31.

More specifically, the fixed in-core nuclear instrumentation system 30 includes the aforesaid power range neutron measuring system 41 and the gamma-ray thermometer power distribution measuring system 50. The in-core nuclear instrumentation assembly 32 (the LPRM detector assembly 34 and the GT assembly 35) including a group of detectors 37 and 44 of the fixed in-core nuclear instrumentation system 30, is adapted to measure neutron flux and a γ-ray heating value in the core 3 as core nuclear instrumentation data (GT data D1 and LPRM data D2) by means of transmission operation of the detected signals of the detectors 37 and 44 and the signal processing of signal processing units 40 and 48 at predetermined fixed measurement points in the core 3.

Moreover, each of the GT assembly 35 has a built-in heater wire. The fixed in-core nuclear instrumentation system 30 has a gamma-ray thermometer heater control unit 53 (hereinafter, also described as GT heater control unit) 53 which is electrically connected to each built-in heater (described later) so as to supply a power source to each built-in heater and is operative to control the power supply to each built-in heater.

The GT heater control unit 53 is a power supply unit which includes a power supply circuit, a current measurement circuit, a voltage measurement circuit, a voltage control circuit (microcomputer) and an electrically energizing changeover circuit and is operative to apply a voltage to the built-in heater of the GT assembly 35 which is selected via a power cable 54 so that the heater of the selected GT assembly 35 is heated. In the in-core fixed nuclear instrumentation system 30, since no traversing neutron detector and traversing γ-ray detector is required, it is possible to omit a mechanical driving and operating mechanism included in the conventional reactor nuclear instrumentation system. Therefore, it is possible to simplify a structure of the in-core fixed nuclear instrumentation system 30. In addition, in the nuclear instrumentation system 30, no movable parts are required; therefore, it is possible to achieve a maintenance free, and to avoid or greatly reduce a radiation exposure work of workers.

Moreover, in the reactor pressure vessel 2 or a primary system piping (not shown), a core state data measuring device 55 is provided. The core state data measuring device 55 measures core state data S3 (process quantity) including a control rod pattern, a core coolant flow rate, an internal pressure of the reactor pressure vessel, flow of feed water, a temperature of feed water (a core inlet coolant temperature) and so on, which are used as various operating parameters indicative of a reactor operating mode (state) of the reactor.

The core state data measuring device 55 is shown as one measuring device in the primary containment vessel 1, simplified in FIG. 1; however, in fact, the core state data (process data) measuring device 55 is a core state data measuring means which is composed of a plurality of measuring devices for measuring or monitoring a plurality of core state data (process data), located inside and outside of the primary containment vessel 1.

Further, one part of the core state data measuring devices 55, which is inside of the vessel 1, is connected to a core state data processing unit 58 via a signal cable 57 penetrating through a penetration portion 56, and other part thereof, which is outside of the vessel 1, is connected via the signal cable 57 to the core state data processing unit 58, so that a process data measuring system 59 is constructed.

The core state data processing unit 58 receives the core state process data S3 (analog signals or digital signals) measured by the core state data measuring device 55, and then, carries out data processing on the basis of the received core state process data S3 to simulate (calculate) a reactor thermal output, a core inlet coolant temperature and so on. Further, the core state data processing unit 58 converts the core state process data S3 including the calculated reactor thermal output and so on into digital core state data D3, and then, transmits the digital data D3 to the process control computer 31.

The core state data processing unit 58 of the process data measuring system 59 is not constructed as a dedicated independent unit, but may be constructed as a part of processing functions (modules) of the process control computer 31. In other words, the process data measuring system 59 may be constructed as a part of processing functions including the in-core power distribution simulating function (module) of the process control computer 31. Furthermore, the process data measuring system 59 may be constructed as a part of the reactor in-core nuclear instrumentation system 30 from the concept of detector and signal processing system.

In addition, the core state data processing unit 58 of the process data measuring system 59, the LPRM signal processing unit 40 of the power range neutron flux measuring system 41, the gamma-ray thermometer heater control unit 53 of the gamma-ray thermometer heater control system and the GT signal processing unit 48 of the gamma-ray thermometer power distribution measuring system 50, are individually electrically connected to the process control computer 31.

A group of data processed by processing units 40, 48 and 58, that is, the core nuclear instrumentation data (GT data D1 and LPRM data D2) and the core state data D3, are transmitted to the process control computer 31 so as to be inputted therein by an interface process of the process control computer 31.

The CPU 60 of the control process computer 31 has a nuclear instrumentation control process module (process function) 60M1 as a part of elements of the in-core nuclear instrumentation system 30 for controlling the LPRM signal processing unit 40, the GT signal processing unit 48 and the gamma-ray thermometer heater control unit 53 constituting the in-core nuclear instrumentation system 30, in addition to the aforesaid interface process on the basis of a nuclear instrumentation control program module PM1 memorized in the memory unit 61.

The CPU 60 of the process control computer 31 has a power distribution simulation process module M2 (process function) for simulating neutron flux distribution in the core 3, a power distribution therein and a margin with respect to an operational thermal limit according to a power distribution simulation program module PM2 including a physics model (three-dimensional thermal-hydraulics simulation code), wherein the power distribution simulation program module PM2 is memorized in the memory unit 61.

The power distribution simulation process module (process function) M2 is also operative to correct the simulation result simulated thereby so as to obtain a core power distribution reflecting the actually measured core nuclear instrumentation data on the basis of a power distribution learning (adaptive) program module PM3 memorized in the memory unit 61.

The process control computer 31 is also capable of receiving various commands such as GT calibration instruction command, power distribution simulating command and the like, which are inputted by an input operation of an operator through the input console 62.

The CPU 60 is also operative to output a simulated result including, for example, the power distribution and the margin with respect to the operational thermal limit, a display information such as warning or the like to the operator through the display unit 63.

The in-core power distribution simulation process module M2 of the CPU 60 simulates the neutron flux distribution, the core power distribution and the margin with respect to the operational thermal limit in the core 3 so as to store the simulated result including the neutron flux distribution and the core power distribution in the memory unit 61.

Then, the power distribution simulation process module M2 of the CPU 60 corrects the simulated result (the neutron flux distribution and the core power distribution) stored in the memory unit 61 according to the inputted GT data D1, or the GT data D1 and the LPRM data D2 so as to determine an accurate core power distribution and an accurately margin with respect to the operational thermal limit, which reflect the actually core nuclear instrumentation data (the GT data D1, the LPRM data D2) and have a high reliability.

As described above, each of the modules M1 and M2 of the CPU 60 are realized as processing functions of the CPU 60 on the basis of the program modules PM1, PM2 and PM3.

By the way, the in-core nuclear instrumentation assemblies 32 constitute a part of the in-core nuclear instrumentation system 30 of the BWR, as shown in FIG. 1 to FIG. 3, and the core 3 is provided with a large number of, for example, 52 in-core nuclear instrumentation assemblies 32. The in-core nuclear instrumentation assembly 32 is arranged at a corner water gap G position surrounded by four fuel assemblies 4.

The in-core nuclear instrumentation assembly 32 includes a nuclear instrumentation tube 33, the neutron detector assembly (LPRM detector assembly) 34 functioning as fixed neutron detecting means, the γ-ray heating detector assembly (GT assembly) 35 functioning as fixed gamma-ray detection means (gamma-ray thermometer). Further, the in-core nuclear instrumentation assembly 32 is constructed in a manner that the LPRM detector assembly 34 and the GT assembly 35 are combined so as to be integrally arranged in the nuclear instrumentation tube 33.

The LPRM detector assembly 34 constitutes a local power range monitor (LPRM) as a nuclear fission ionization chamber, and has N (N≧4), for example, four LPRM detectors 37 which are discretely arranged in a fuel effective portion in a core axial direction at equal intervals. Incidentally, each interval between each LPRM detector 37 is referred to "L". The GT assembly 35 is inserted into the nuclear instrumentation tube 33 together with the LPRM detector assembly 34.

The GT assembly 35 includes eight (8) or nine (9) gamma (γ) ray heating detectors 44 which are discretely arranged in the core axial direction. Each neutron detector 37 of the LPRM detector assembly 34 and each gamma-ray heating detector 44 of the GT assembly 35 are housed in the nuclear instrumentation tube 33, and a coolant is guided so as to flow through the nuclear instrumentation tube 33 from the lower portion of the tube 33 in a mounted state to the upper end thereof.

In FIG. 2 and FIG. 3, there is shown in an example of the GT assembly 35 which is constructed in a manner that eight (8) γ-ray heating detectors 44 are arranged in a fuel effective portion H of the core axial direction. As shown in FIG. 3, the fuel effective portion H is indicative of a range where a nuclear fuel is effectively filled along the core axial direction in each fuel element (nuclear fuel filled in a fuel rod), and also, the fuel effective portion H along the core axial direction is described as a fuel effective length.

Each arranging distance (or interval) between γ-ray heating detectors 44 in the core axial direction is determined taking each core axial direction arranging distance between neutron detectors 37 of the LPRM detector assembly 34 into consideration.

More specifically, if the core axial direction arranging distance between each of the neutron detectors 37 is set as L, the gamma-ray thermometer assembly (GT assembly) 35 is constructed in the following manner that axially center positions of four γ-ray heating detectors of the above 8 γ-ray heating detectors 44 are arranged at the same axial positions of the LPRM detector 37, axially center positions of three γ-ray heating detectors of them are arranged on an intermediate position between LPRM detectors 37 at an interval of L/2, and an axially center position of one lowermost γ-ray heating detector 44 of them is arranged below the lowermost LPRM neutron detector 37 in a fuel effective portion of 15 cm or more upper from a lower end of the fuel effective portion at a distance of L/4 to L/2.

In the case where the γ-ray heating detector 44 is located above the uppermost LPRM detector 37, the γ-ray heating detector 44 is arranged above the lowermost LPRM neutron detector 37 in a fuel effective portion of 15 cm or more lower from an upper end of the fuel effective portion at a distance of L/4 to L/2. As described above, the γ-ray heating detector 44 is arranged within a 15 cm or more range separating from the upper and lower ends of the fuel effective portion. The reason is as follows; more specifically, according to γ-ray heating contributing range analysis, a γ-ray contributing range is newly found out; for this reason, it is necessary to accurately detecting a γ-ray heating value close to the upper and lower ends of the fuel effective portion.

The lowermost γ-ray heating detector 44 must be arranged in the fuel effective length H and in the vicinity of the lower end of the fuel effective portion as much as possible. For this reason, in the case where the fuel effective length (approximately 371 cm at present) H is divided into 24 nodes in the core axial direction, it is preferable that the axially center position of the lowermost γ-ray heating detector 44 is located on the center position of the axis of an axial node which is a second from the lowermost node. By arranging the γ-ray heating detector 44 as described above, a γ-ray heating value on the lower end side of the core is detected by means of the lowermost γ-ray heating detector 44 of the GT assembly 35. Thus, it is possible to measure a γ-ray heating value over a considerably wide range in the axial direction along the fuel effective length H, and to measure a γ-ray heating value on a lower end range of the core.

This results from the following reasons; more specifically, the lowermost node primarily has a low output due to a neutron leakage, the lowermost γ-ray heating detector 44 has a low response, and further, a contributing range of gamma-ray to the γ-ray heating detector 44 is 15 cm or more. Therefore, the lowermost γ-ray heating detector 44 is arranged on a position separating from the lower end of the fuel effective length at a distance of 15 cm or more, and thereby, it is possible to be equally heated upper and lower sides of the location with γ-ray. Moreover, the following disadvantage should be avoided. More specifically, if the lowermost γ-ray heating detector 44 is not arranged at a position separating from the lower end of the fuel effective length at a distance of 15 cm or more, other γ-ray heating detectors 44 arranged in other core axial directions measure a heating effect of γ-ray from the upper and lower sides in the axial direction; while the lowermost γ-ray heating detector 44 detects only γ-ray heating contribution from the upper side. For this reason, a balance of γ-ray heating value measurement between each detector 44 is not proper, and a correlation equation of GT signal to power is also not proper. Therefore, because the lowermost γ-ray heating detector 44 is arranged on a position separating from the lower end of the fuel effective length at a distance of 15 cm or more, it is possible to avoid unbalance of γ-ray heating value measurement of the lowermost γ-ray heating detector 44 so as to prevent the correlation equation of GT signal to power of the lowermost γ-ray heating detector 44 from being different from other γ-ray heating detectors 44 except for the lowermost γ-ray heating detector 44.

In an axial design of the latest fuel assembly 4, a natural uranium bracket is frequently used as the lowermost node. For this reason, even if the natural uranium bracket portion having a low output is measured, an output signal of the GT assembly 35 is extremely low; as a result, there is no meaning of interpolating and extrapolating a power distribution at a position below the lowermost LPRM detector 37.

Figure 5:
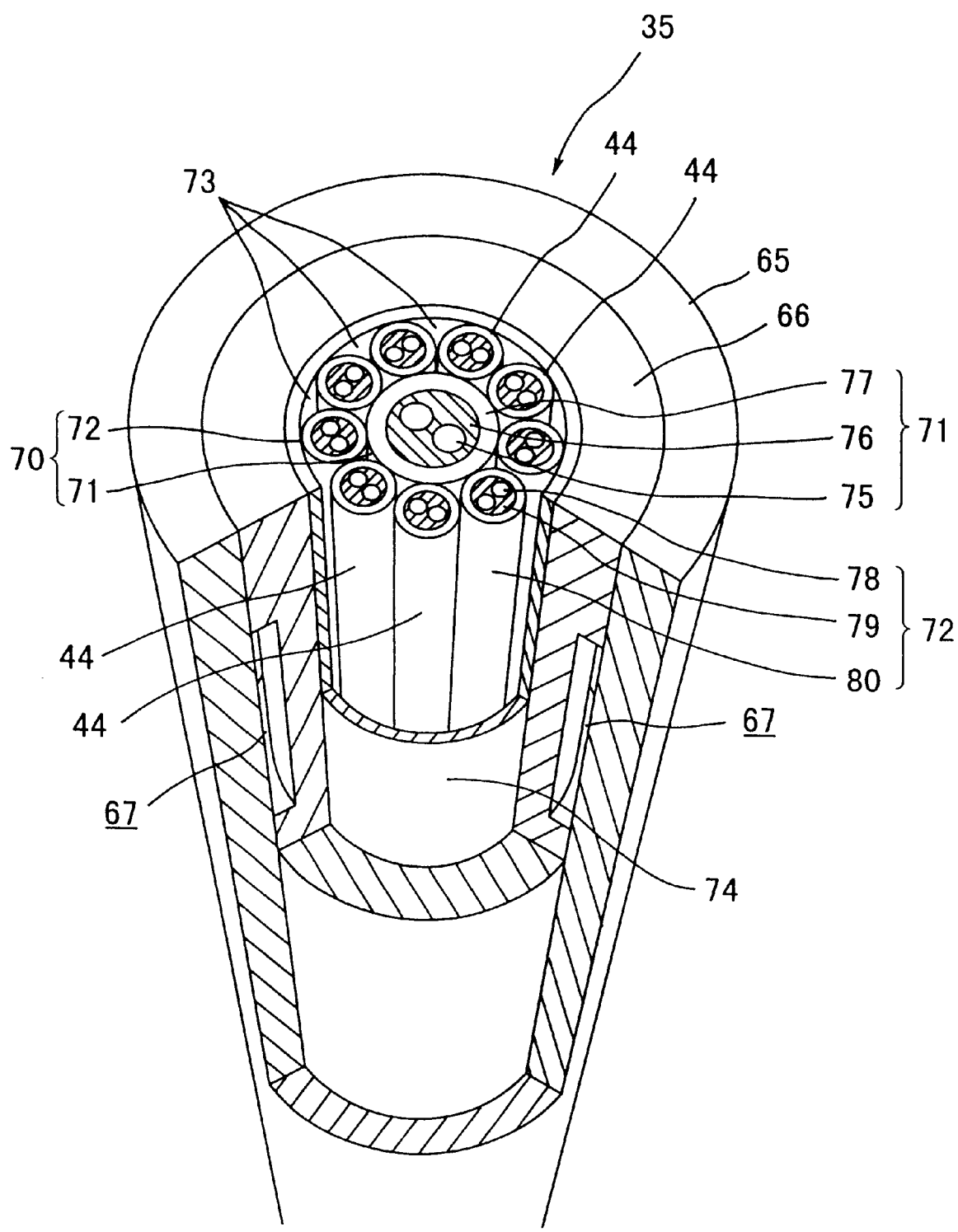
FIG. 5 is a perspective view, partly broken away, showing a structure of a gamma-ray thermometer assembly according to the first embodiment of the present invention.
Figure 6:
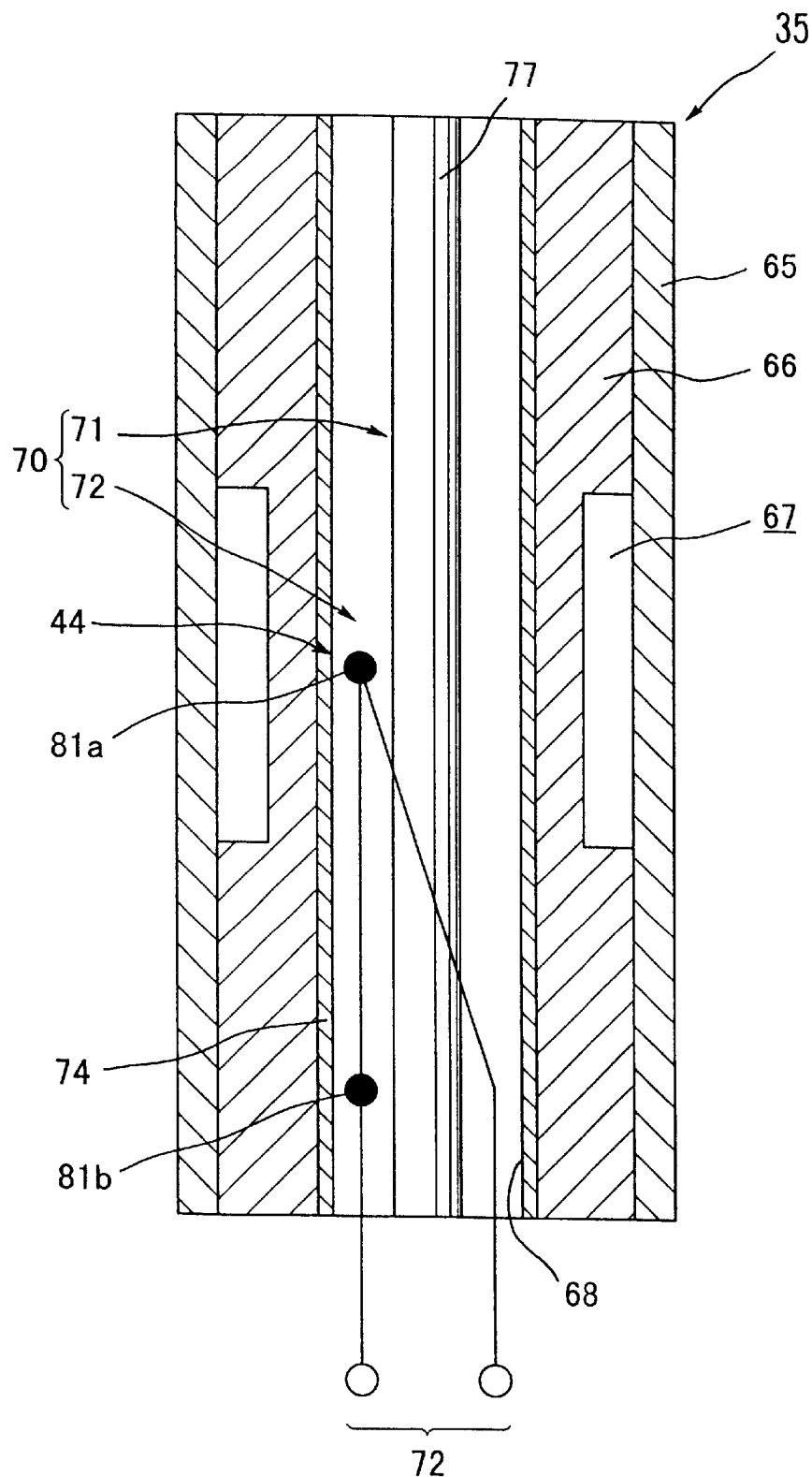
FIG. 6 is a view showing a principle for measuring a gamma-ray heating value of a gamma-ray thermometer according to the first embodiment.

By the way, the gamma-ray thermometer assembly (GT assembly) 35 is constructed in combination with the fixed γ-ray heating detector 44, and has a long rod-like structure as shown in FIG. 5 and FIG. 6.

The gamma-ray thermometer assembly 35 is a thin and long rod-like assembly having a diameter of e.g., approximately 8 mmø, and has a length of substantially covering a fuel effective length, for example, 3.7 m (370 cm) to 4 m (400 cm) in the core axial direction.

The gamma-ray thermometer assembly (GT assembly) 35 includes a cover tube 65 formed of stainless steel, which is used as a metallic jacket, and a metallic long rod-like core tube 63 is housed in the cover tube 65. Further, the cover tube 65 and the core tube 66 are fixed to each other by shrinkage fit, cooling fit or the like. A sleeve or annular space portion 67 constituting an adiabatic portion is formed between the cover tube 65 and the core tube 66. A plurality of e.g., at least four (4), more specifically, eight (8) or nine (9) annular space portions 67 are discretely arranged at equal intervals in the axial direction.

The annular space portion 67 is formed by cutting an outer surface of the core tube 66 along a circumferential direction thereof. Then, a gas having a low heat conductivity, for example, an Ar (argon) gas is filled in the annular space portion 67. The annular space portion 67 may be formed on the cover tube 65 in side wall which is a jacket tube. As the gas having a low heat conductivity, an inert gas such as the Ar gas, a nitrogen gas or the like may be used.

The fixed γ-ray heating detector (GT detector) 44 is provided at a position where the annular space portion 67 is formed, and thus, a sensor portion of the gamma-ray thermometer assembly 35 is constructed. The core tube 66 has an internal hole 68 which extends through a center portion of the core tube 66 along an axial direction thereof. In the internal hole 68, a mineral insulated (MI) cable sensor assembly 70 is fixed by brazing, caulking (fastening) or the like.

The cable sensor assembly 70 is provided at its center portion with a built-in heater 71 which functions as a rod-like exothermic member of a heater wire for calibrating the gamma-ray thermometer assembly 35, and a plurality of differential type thermocouples 72 which functions as temperature sensors, around the heater 71. A space between the built-in heater 71 and each thermocouple 72 are filled with an electric insulating layer or a metal/metal alloy filler 73, and then, are integrally housed in a metallic cladding tube 74. The metallic cladding tube 74 is closely contacted at outer peripheral surface thereof to the inner peripheral surface of the core tube 66 and at inner peripheral surface thereof to each outer peripheral surface of each thermocouple 72. The built-in heater 71 of the gamma-ray thermometer assembly 35 comprises a sheath heater, and is integrally constructed in a manner that a heater wire 75 is coated with a metallic cladding tube 77 via an electric insulating layer 76. Similarly, each thermocouple 72 is integrally constructed in a manner that thermocouple signal wire 78 are coated with a metallic cladding tube 80 via an electric insulating layer 79.

In the differential type thermocouple 72 located in the internal hold 68 of the core tube 66, its low temperature point and a high temperature point are arranged so as to correspond to the annular space portion 67, and thus, the γ-ray heating detector 44 which is the sensor portion of the gamma-ray thermometer assembly 35 is constructed. As shown in FIG. 6, each thermocouple 72 is set in a manner that a high temperature point 81a is located on the sensor portion formed in the annular space portion 67, that is, on the center of the adiabatic portion in the axial direction, and that a low temperature point 81b is located at a downward position slightly separating from the adiabatic portion (the low temperature point 81b may be located at an upward position slightly separating from the adiabatic portion). The thermocouples 72 are coaxially inserted around the built-in heater 71 by the same number as the γ-ray heating detectors 44.

Figures 7A, 7B:
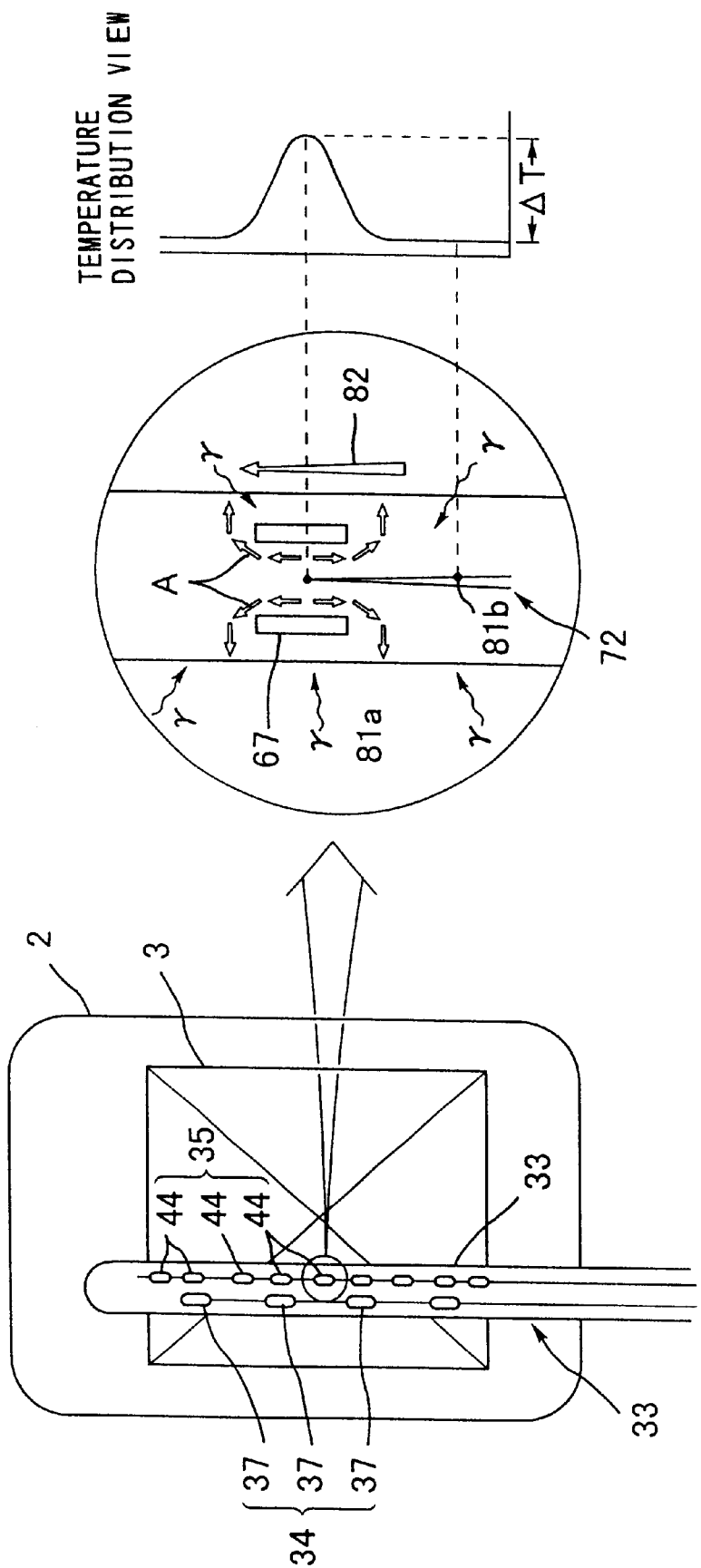
FIG. 7A is a view showing a principle for measuring the gamma-ray heating value of the gamma-ray thermometer according to the first embodiment.
FIG. 7B is a partly enlarged view of FIG. 7A showing a flow of a heat flux.

The fixed γ-ray heating detectors 44 constitute the gamma-ray thermometer assembly 35 for detecting an in-core power distribution detector, and the principle of measuring the in-core power distribution is shown in FIG. 7A and FIG. 7B.

In a reactor such as a boiling water type reactor or the like, a γ-ray is generated in proportional to a local fission rate of a nuclear fuel mounted in the reactor core 3 housed in the reactor pressure vessel 2. The generated γ-ray flux heats a structural element of the gamma-ray thermometer assembly 35, for example, the core tube 66. The heat energy is proportional to a local γ-ray flux; on the other hand, the γ-ray flux is proportional to the fission rate close thereto. In the annular space portion 67 of each γ-ray heating detector 44 which constitutes the gamma-ray thermometer assembly 35, since a performance of removing heat in radial direction by a coolant 82 is poor due to a heat resistance of the annular space portion 67, there is generated a heat flow as shown by an arrow A in FIG. 7B, which makes a detour in the axial direction so that a temperature difference is caused. So, the high temperature point 81a and the low temperature point 81b of the differential type thermocouple 72 are arranged as shown in FIG. 6 and FIG. 7B so that it is possible to detect the temperature difference by a voltage signal. The temperature difference is proportional to the γ-ray heating value, making it possible to obtain a γ-ray heating value which is proportional to a local fission rate from the voltage signal of the differential type thermocouple 72. This is the measuring principle of the gamma-ray thermometer.

On the other hand, in the fuel assembly 4, as shown in FIG. 2 and FIG. 3, a large number of fuel rods (not shown) are housed in a rectangular or cylindrical channel box 83. Each fuel rod housed in the fuel assembly 4 is fixed in a manner that an uranium oxide sintered pellet or an uranium-plutonium mixed oxide sintered pellet is filled in a fuel cladding tube made of a zirconium alloy so that upper and lower ends of the fuel cladding tube are welded by end plugs, respectively. Large number of fuel rods are bundled so that a plurality of fuel spacers are arranged in an axial direction at predetermined intervals in order to secure a predetermined distance between the fuel rods.

Moreover, an upper tie-plate and a lower tie-plate are arranged at the upper and lower end portions of the fuel assembly 4 so as to engaging with a lower structure and an upper structure of the core 3, respectively. In the fuel assembly 4 of the boiling water type reactor (BWR), the channel box 83 covers an outer side of the bundled fuel assembly 4 so as to form a coolant passage for each fuel assembly 4.

The great number of fuel assemblies 4 as described above stand in the core 3 of the reactor, and the process control computer 31 executes a simulation of the in-core power distribution, the margin with respect to the operational limit value {maximum linear heat generating ratio (kW/m) and minimum critical power ratio} of core fuel, according to the power distribution simulation program module, so-called three-dimensional nuclear thermal-hydraulics simulation code. The margin with respect to the operational limit value {maximum linear heat generating ratio (kW/m), referred simply to MLHGR, and minimum critical power ratio, referred simply to MCPR} of core fuel is simulated by the process control computer 31, and then, the simulation result is displayed on the display unit 63 so that the operator monitors the simulation result.

Next, monitoring process of core power distribution of the power distribution monitoring system 29 according to the present invention is explained hereinafter, and more particularly, calibration process of detection sensitivity of the in-core fixed nuclear instrumentation system 30 is explained in the central of the monitoring process.

In the reactor power distribution monitoring system 29 according to the present invention, a fuel state of the core 3 and a reactor operating mode of the boiling water type reactor (BWR) are monitored by the process control computer 31.

That is, various process data {control rod pattern, core coolant flow rate, reactor doom pressure, flow of feed water, a temperature of feed water (a core inlet coolant temperature) and so on} as the reactor state data measured by the core state data measuring device 55 of the boiling water type reactor, are inputted to the state data processing unit 58, and then, these data are collected and processed by the state data processing unit 58 so as to calculate a reactor thermal output or the like.

The state data processing unit 58 may be constructed as a part of the process control computer 31; in this case, processing for collecting the core state data is carried out by the process control computer 31.

The core state data D3 including the reactor thermal output, which is collected and calculated by the core state data processing unit 58, is transmitted to the process control computer 31 so as to be received in the CPU 60 by the interface process of the nuclear instrumentation control process module 60M1 thereof.

On the other hand, neutron flux in the core 3 detected by each LPRM detector assembly 34 of each in-core nuclear instrumentation assembly 32 is converted into the LPRM data D2 via the LPRM signal processing unit 40, and then, each of the LPRM data D2 is transmitted to the process control computer 31 so as to be received in the CPU 60 by the interface process of the nuclear instrumentation control process module 60M1 thereof.

Similarly, thermocouple output signal (GT signal) measured by each γ-ray heating detector 44 of each in-core nuclear instrumentation assembly 32 is converted into the GT data D1 representing the γ-ray heating value (W/g) per unit weight by means of the GT signal processing unit 48 on the basis of each sensitivity $S_0$ of each γ-ray heating detector 44, and then, is transmitted to the process control computer 31 so as to be received in the CPU 60 by the interface process of the nuclear instrumentation control process module 60M1 thereof.

The power distribution simulation process module 60M2 of the CPU 60 executes the power distribution simulating process in accordance with the program module (three-dimensional nuclear thermal-hydraulics simulation code) PM2 stored in the memory unit 61 on the basis of the transmitted the GT data D1, the LPRM data D2 and the core state data D3, so that the core power distribution, the core neutron flux distribution, simulation values of the GT signals corresponding to the measured GT data S1, the margin with respect to the operational thermal limit value and so on are simulated. The simulated data including the core power distribution, the simulation values of the GT signals, the margin with respect to the operational thermal limit value and so on are stored in the memory unit 61 as the occasion demands.

Incidentally, in this embodiment, in the memory unit 61, at least one of approximate expression data (data set) according to correlation parameters representing the correlation between the nodal power of the fuel assembly 4 and the GT data values D1 based on the GT signals S1 and interpolation and extrapolation lookup table data (data set) according to the above correlation parameters is stored, wherein the correlation parameters includes, for example, a fuel type, a node burn-up, control rod state, a historical relative water density (historical void fraction), an instantaneous relative water density (instantaneous void fraction).

That is, the process module 60M2 of the CPU 60 is adapted to simulate the correlation parameters simultaneously with simulating the core power distribution, and to simulate the simulation values of the GT signals by using the at least one of the approximate expression data and the lookup table data according to the simulated correlation parameters.

In addition, the process module 60M2 of the CPU 60 corrects the simulated results including the core power distribution and so on by using the actually measured core nuclear instrumentation data (GT data D1) from the core 3 and the three-dimensional nuclear thermal-hydraulics simulation code) in accordance with the program module PM3.

At this time, in order to measure the power distribution in an axial direction of the core 3, each GT assembly 35 has fixed GT detectors 44 which is the same N-th (number) as the fixed LPRM detector 37 less than 24 nodes, for example, four or more, and then, the core power distribution or the like simulated by the power distribution simulation process module 60M2 of the CPU 60 is learnt so as to be corrected on the basis of the three-dimensional nuclear thermal-hydraulics simulation code and the core nuclear instrumentation data (GT data D1) corresponding to the GT signals measured by each GT detector 44 of each GT assembly 35. Incidentally, the power distribution adaptation correction process of the CPU 60 will be detailedly explained by referring to FIG. 13 and FIG. 14 in sixth embodiment of the specification.

Namely, the actual thermocouple output signals (GT signals) S1 from the GT assemblies 35 are converted from the voltage signals into the GT data D1 corresponding to the gamma-ray heating values (W/g) by the GT signal processing unit 48 so as to be inputted to the process control computer 31.

At this time, by the power distribution simulation process module 60M2 of the CPU 60, a γ-ray heating value for each axial node of each GT assembly is obtained according to the core power distribution simulated by the power distribution simulation process module 60M2 of the CPU 60 on the basis of the three-dimensional nuclear thermal-hydraulics simulation code of the program module PM2. Each γ-ray heating value is temporally stored in the memory unit 61.

Related to some nodes in the axial direction at which the GT detector 44 is provided, difference between each simulation value of the part of nodes stored in the memory unit 61 and each actual measured value (GT data D1 value) thereof is obtained by ratio.

Then, by the power distribution simulation process module 60M2 of the CPU 60, data indicative of differences (ratios) between the respected actual γ-ray heating values (GT data D1 values) of the GT detectors 44 having the limited number in the core axial direction and the respected simulation values of the γ-ray heating values corresponding to the GT detectors 44 are interpolated and extrapolated in other (remained) nodes in the axial direction, respectively, wherein the GT detector 44 is not provided at the other nodes in the axial direction, thereby obtaining the correction data of the γ-ray heating value differences with respect to the whole axial nodes. Incidentally, in addition to interpolation and extrapolation in the axial direction, it is possible to interpolate and extrapolate the γ-ray heating value difference corrections (correction ratios; correction factors) with respect to radial positions at which the GT assemblies are not provided along a core radial direction.

Further, the power distribution simulation process module 60M2 of the CPU 60 corrects the core power distribution simulated by the power distribution simulating process so that each γ-ray heating value difference correction data value for each node of each GT assembly is "1.0"; that is, the GT data D1 value of each node in the axial direction of each GT assembly and each simulation value of each γ-ray heating value corresponding to each node are coincident with each other, and whereby, it is possible to obtain a high accurate reactor power distribution and a high accurate margin with respect to an operational thermal limit value, or, in addition to them, a high accurate neutron flux distribution.

As described above, in the process control computer 31 for monitoring the reactor operating mode and the core power distribution, the CPU 60 always continuously receives the core state data D3, and periodically (e.g., one time per hour) or always carries out the core power distribution simulation process (three-dimensional nuclear thermal-hydraulics simulation process) on the basis of the latest operating parameters (core state data D3) and the three-dimensional nuclear thermal-hydraulics simulation code (program module PM2) in accordance with a simulation request command inputted from the input console 62 by the input operation of the operator.

More specifically, in accordance with the power distribution adaptation process module PM3, according to the GT data D1 (W/g) based on the GT signals S1 at that point of time at which the power distribution is simulated, the simulated core power distribution is corrected so that the actually measured core nuclear instrumentation data (the GT data D1) are reflected the simulated power distribution, whereby it is possible to simulate a high accurate reactor power distribution and a high accurate margin with respect to the operational thermal limit value, or, in addition to them, a high accurate neutron flux distribution.

Meanwhile, the nuclear instrumentation control process module 60M1 as a part of processing functions of the CPU 60 has a function of computing a reactor operating time, for example, in-core elapse time after each GT assembly 35 is loaded (mounted) in the reactor (core 3), a function of updating and storing each in-core elapse time (in-core mounted time) of each GT assembly 35 in the memory unit 61 of the process control computer 31, and a function of storing a plurality of preset heater calibration time intervals in the memory unit 61 which will be described later.

Further, in a state that there is no change in the core state process S3 such as operating parameters (core power, core coolant flow rate, control rod pattern, etc.), the nuclear instrumentation control process module 60M1 has a function of transmitting an execution instruction of output voltage sensitivity measurement processing (computation processing) by the built-in heater 71 of each fixed GT detector 44 of each GT assembly 35, to the GT heater control unit 53 every predetermined time. Incidentally, the aforesaid processing (computation processing) for measuring a sensitivity of each fixed GT detector 44 by the built-in heater 71, is called as heater calibration processing, wherein the sensitivity of each fixed GT detector 44 represents a value for determining a relationship between thermocouple output voltage and γ-ray heating value (unit: (W/g) per unit weigh) of each GT detector 44.

In addition, the nuclear instrumentation control process module 60M1 of the CPU 60 has a function of storing a time (calibration processing start time) at the point of time of transmitting the executive instruction of output voltage measurement processing (heater calibration instruction) of each GT assembly 35 in the memory unit 61. That is, each calibration processing start time of each GT assembly 35 is stored in each different address of the memory unit 61.

At this time, the nuclear instrumentation control process module 60M1 of the CPU 60 previously sets different transmission intervals of the heater calibration instruction (hereinafter, the transmission interval is referred to "heater calibration time interval") to the GT assemblies 35 according to the in-core elapse times of the GT assemblies 35.

That is, the following different heater calibration time intervals are stored in the memory unit 61 of the process control computer 31. Namely, 48-hours is set as a first heater calibration time interval with respect to the GT assembly in which a reactor operating time after the GT assembly mounted in the core 3 is within 500 hours (that is, in-core elapse time within 500 hours), 168-hours is set as a second heater calibration time interval with respect to the GT assembly in which the in-core elapse time ranges from 500 to 1000 hours, 336-hours is set as a third heater calibration time interval with respect to the GT assembly in which the in-core elapse time ranges from 1000 to 2000 hours, and one month (or 1000 hours) is set as a fourth heater calibration time interval with respect to the GT assembly in which the in-core elapse time exceeds 2000 hours.

Figure 8:
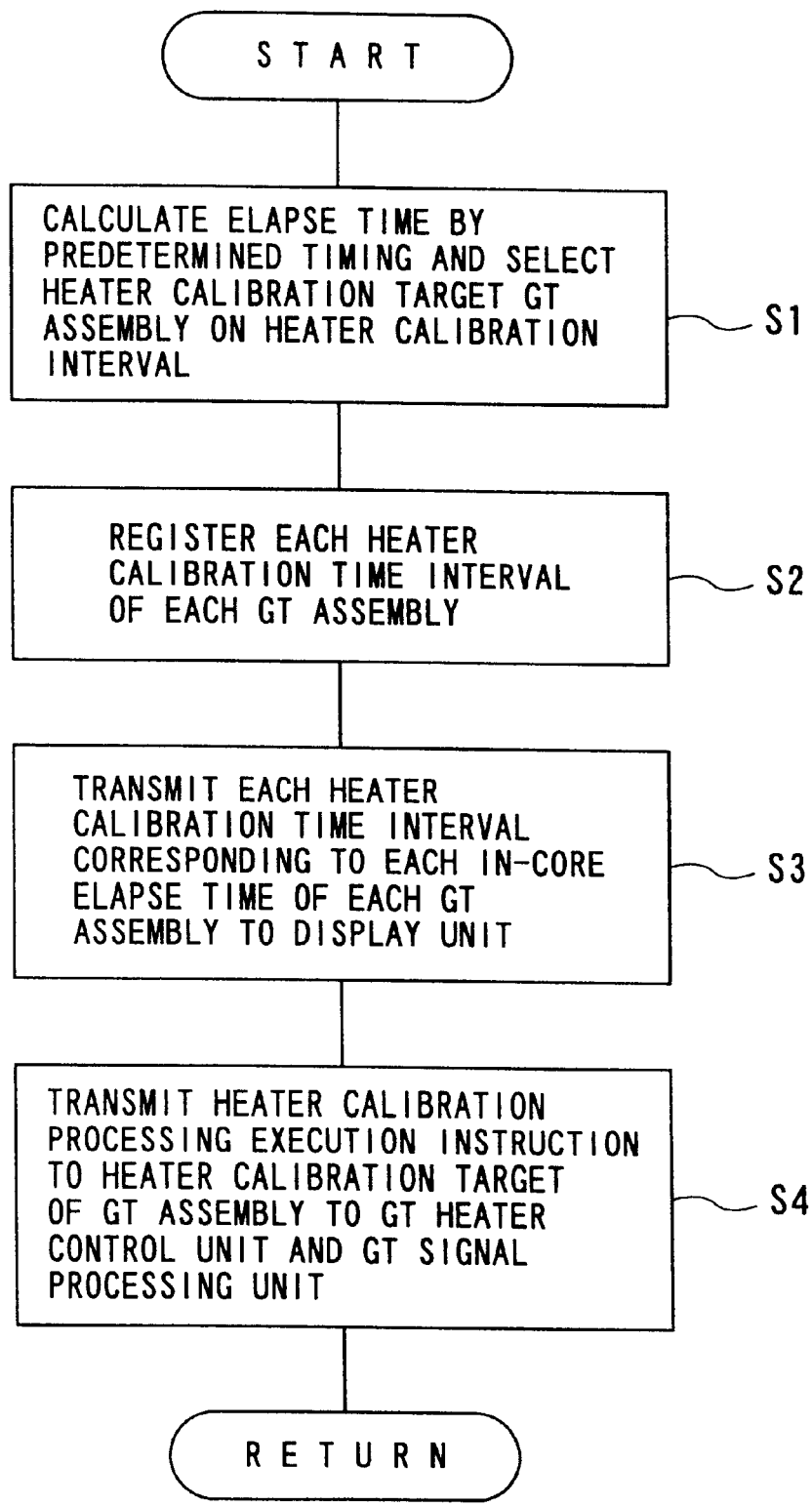
FIG. 8 is a flow chart schematically showing processes of a nuclear instrumentation control process module of a CPU of a process control computer in FIG. 1 according to the first embodiment.

By referring to the memory unit 61, as shown in FIG. 8, the nuclear instrumentation control process module 60M1 calculates the in-core elapsed times of the GT assemblies and discriminates and selects a GT assembly or GT assemblies as a heater calibration target from all GT assemblies on the basis of each elapse time from the previous calibration processing time of each GT assembly 35 to the present time and a heater calibration time interval corresponding to the present in-core elapse time of each GT assembly 35 (step S1).

Next, the nuclear instrumentation control process module 60M1 of the CPU 60 registers each heater calibration time interval corresponding to each discriminated in-core elapse time of each GT assembly 35 in the memory at each of the discrimination processes (step S2). Then, the nuclear instrumentation control process module 60M1 transmits each registered heater calibration time interval corresponding to each in-core elapse time corresponding to each GT assembly 35 to the display unit 63 so as to display each heater calibration time interval of each GT assembly 35 as a heater calibration time interval registration image on the display unit 63 (step S3).

Furthermore, the nuclear instrumentation control process module 60M1 automatically transmits a heater calibration processing execution instruction {including an address (positional address) of the selected heater calibration target of the GT assembly 35} with respect to the selected heater calibration target of the GT assembly 35, to the GT heater control unit 53 and the GT signal processing unit 48, or transmits a GT calibration instruction command transmission request with respect to the heater calibration target of the GT assembly 35, to the display unit 63 so as to display and output the GT calibration instruction command transmission request with respect to the operator via the display unit 63 (step S4).

At this time, the operator operates the input console 62 in accordance with the GT calibration instruction command transmission request displayed on the display unit 63 so as to transmit a GT calibration instruction command corresponding to the aforesaid heater calibration target of the GT assembly 35. In response to the transmitted GT calibration instruction command, the nuclear instrumentation control process module 60M1 automatically transmits the aforesaid heater calibration processing execution instruction to the GT heater control unit 53 and the GT signal processing unit 48.

At this time, the GT heater control unit 53 starts to supply a power (applies a voltage) to the built-in heater 71 of at least one of the target GT assembly 35 corresponding to the positional address of the transmitted heater calibration processing execution instruction with delay time, and controls the applied heater voltage so that a current value flowing through the built-in heater 71 becomes a predetermined value.

Next, the GT heater control unit 53 measures the applied voltage value of the built-in heater 71 of the at least one of the target GT assembly 35 and the current value flowing through the built-in heater 71 thereof so as to transmit the measured values to the GT signal processing unit 48.

Figure 9:
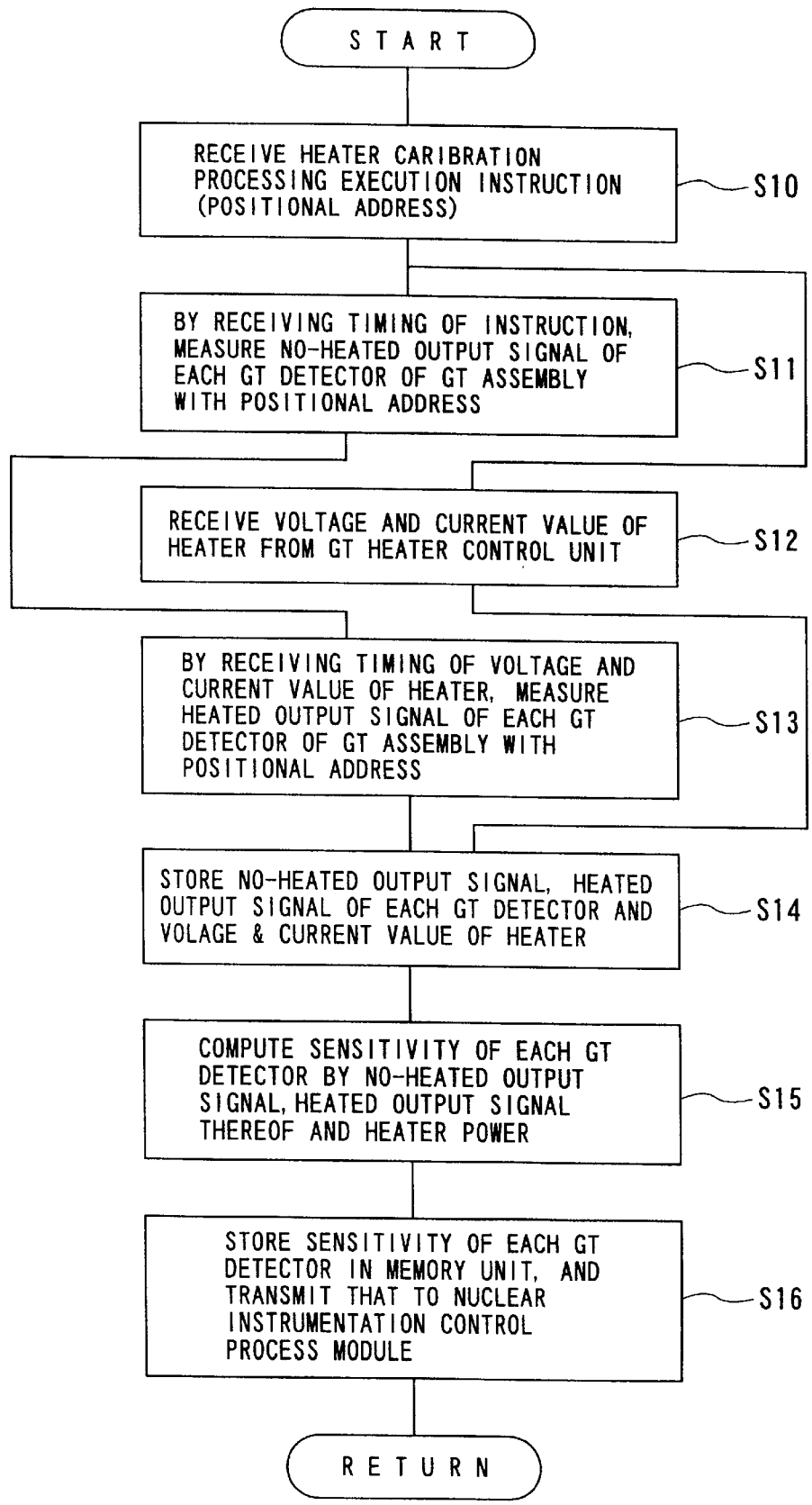
FIG. 9 is a flow chart schematically showing processes of a CPU of a GT signal processing unit in FIG. 1 according to the first embodiment.

On the other hand, the CPU 48A of the GT signal processing unit 48, as shown in FIG. 9, receives the heater calibration processing execution instruction (positional address) transmitted from the nuclear instrumentation control process module 60M1 (step S10), and then, in response to a receiving timing of the heater calibration processing execution instruction, concurrently measures a thermocouple output voltage signal (mV) of each GT detector 44 of the GT assembly 35, in a no-heated state, having the positional address along the core axial direction (step S11). Incidentally, the thermocouple output voltage signal of each GT detector 44 which is not heated by the built-in heater 71 is referred to "no-heated output voltage signal" hereinafter.

Furthermore, simultaneously to Step S11, the CPU 48A of the GT signal processing unit 48 receives the applied voltage to the heater 71 and the measured current value in the heater 71 transmitted from the GT heater control unit 53 (step S12), and then, in accordance with the receiving timing of the applied voltage and the measured current value, concurrently measures a thermocouple output voltage signal (mV) of each GT detector 44 of the GT assembly 35 having the positional address with each GT detector 44 heating by the heater 71 (step S13). Incidentally, the thermocouple output voltage signal of each GT detector 44 which is heated by the built-in heater 71 is referred to "heated output voltage signal" hereinafter.

Then, the CPU 48A of the GT signal processing unit 48 stores the measured no-heated output voltage signal and the measured heated voltage signal of each GT detector 44, and voltage and current of heater power supply of the heater calibration target of the GT assembly 35 with the positional address in each separated address of the memory unit 48B (step S14).

The above heater calibration process according to the heater calibration process execution instruction is continued while changing the positional addresses of the target GT assemblies until the heater calibration process to all of the target GT assemblies which have need of the heater calibration is finished.

Next, the CPU 48A of the GT signal processing unit 48 measures (computes) a sensitivity $S_0$ {a value for determining a relationship between a thermocouple output voltage and a γ-ray heating value (unit: W/g) per unit weight of each GT detector 44} of each present heater calibration target of each GT detector 44 on the basis of the no-heated output voltage signal and the heated output voltage signal of heater power of each present heater calibration target of each GT detector 44 (step S15).

Figure 10:
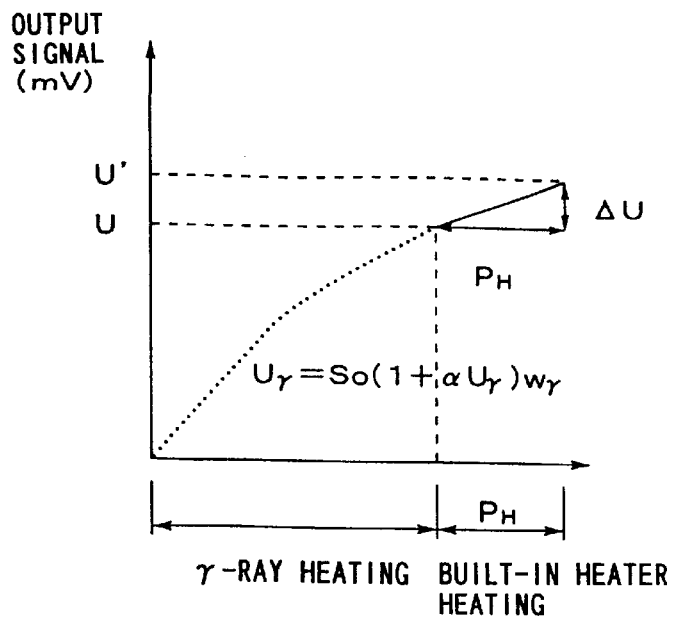
FIG. 10 is a view showing a principle for calibrating a sensitivity of a GT detection portion by built-in heater according to the first embodiment.

The following is a description about the sensitivity measurement process by the CPU 48A of the GT signal processing unit 48 with reference to FIG. 10.

The following equation (1) is established as an expression of relation between a thermocouple output voltage of the GT detector 44 and a gamma-ray heating value Wγ per unit weight of the GT detector 44.

$$U\gamma = S_0(1+\alpha U\gamma)W\gamma \quad (1)$$

where,
$S_0$: output voltage sensitivity (mV/(W/g))
α: non-linear coefficient (mV$^{-1}$)
Uγ: output signal (mV)
Wγ: gamma heating value (W/g)

In this case, the above non-linear coefficient α is a fixed value computed taking a temperature dependency of a physical property value of a structural material of the GT detector 44 into consideration.

Moreover, the output voltage sensitivity $S_0$ of the present GT detector 44 is computed by the following equation (2) with the use of the measured no-heated output voltage signal and the heated output voltage signal.

$$S_0 = [\{U'/(1+\alpha U')\} - \{U/(1+\alpha U)\}]/P_H \quad (2)$$

where,
U: no-heated output voltage (mV)
U': heated output voltage (mV)
$P_H$: additional heating value (W/g) by built-in heater More specifically, in a state that the operator confirms that a state of the core 3 is constant and stable, when adding a heating value $P_H$ by means of the built-in heater 71 shown in FIG. 5 and FIG. 6, a change of thermocouple output signal (difference between U and U') is caused in accordance with the added heating value $P_H$. Thus, the sensitivity $S_0$ of the GT detector 44 can be computed with the use of a previously measured mass (weight) of the GT detector 44, a heater resistance value thereof and the above equation (2). In this case, preferably, the built-in heater 71 of the GT assembly 35 is manufactured so that the resistance value of the built-in heater 71 is constant in the axial direction independent of each GT detector. However, because of considering a manufacture error for each GT assembly 35 or a manufacture error with respect to an axial distribution of each GT assembly 35, its manufacturing data is reflected so that the additional heating value $P_H$ of each of the aforesaid built-in heaters 71 is determined on the basis of the supply current and the resistance value of the detecting section of each of the built-in heaters 71.

By the way, a gamma-ray heating value Wγ per unit weight of the GT detector 44 is computed from the aforesaid output voltage sensitivity $S_0$ of the GT detector 44 and the output voltage signal (mV signal) of the GT detector 44 with the use of the following equation (3).

$$W\gamma = U\gamma/\{S_0(1+\alpha U\gamma)\} \quad (3)$$

As described above, the CPU 48A of the GT signal processing unit 48 can compute the sensitivities $S_0$ of all GT detectors 44 of the heater calibration target GT assemblies 35 on the basis of controlling the built-in heaters 71 of the heater calibration target GT assemblies 35 by the GT heater control unit 53. Then, the CPU 48A of the GT signal processing unit 48 stores the computed sensitivity $S_0$ of each GT detector 44 of the heater calibration target in the memory unit 48B, and then, transmits the computed sensitivity $S_0$ of each GT detector 44 of the heater calibration target to the nuclear instrumentation control process module 60M1 of the process control computer 31 (step S16).

As described above, the sensitivity measuring process by the GT heater control unit 53 and the GT signal processing unit 48 according to the heater calibration process execution instruction, is repeatedly carried out in a predetermined sequence until all GT assemblies 35 of the heater calibration target are processed. Moreover, the sensitivity measuring process of each GT detector 44 of each GT assembly 35 of the heater calibration target is repeatedly carried out in accordance with the heater calibration processing execution instruction transmitted by the discrimination process of the nuclear instrumentation control process module 60M1 at each corresponding heater calibration time interval.

As is evident from the above description, the sensitivity $S_0$ of each GT detector 44 of each GT assembly 35 is periodically measured (computed) by the GT signal processing unit 48 in accordance with each heater calibration interval determined based on each in-core elapse time of each GT assembly 35, and then, the measured sensitivity $S_0$ of each GT detector 44 of each GT assembly 35 is transmitted to the nuclear instrumentation control process module 60M1.

At that time, the nuclear instrumentation control process module 60M1 stores the sensitivity $S_0$ of each GT detector 44 of each GT assembly 35 periodically transmitted in accordance with each heater calibration interval, that is, time sequentially change data of the sensitivity $S_0$ of each GT detector 44 of each GT assembly 35 in the memory unit 61 for each GT detector 44.

Then, the nuclear instrumentation control process module 60M1 executes a process of making a comparison between a sensitivity $S_0'$ of each GT detector 44 newly transmitted to the nuclear instrumentation control process module 60M1 and past several sensitivity $S_0$ data (sensitivity change data) before the point of time of the sensitivity $S_0'$ transmission, and displaying the comparative result via the display unit 63, or a process of displaying a elapsed change trend (graph) of sensitivity including the sensitivity $S_0'$ on the basis of the time sequentially change data of the sensitivity stored in the memory unit 61 via the display unit 63. To give an example of displaying process of elapse time change trend, with the use of all sensitivity $S_0$ data of the GT detector 44 after the GT detector 44 is mounted in the core 3, or past several sensitivity $S_0$ data from the present time, according to least square approximation, a function of computing the following equation (4) for each GT detector 44 may be incorporated into the nuclear instrumentation control process module 60M1.

$$S_0 = a + b \cdot e^{-\lambda t} \tag{4}$$

In this case, $\lambda$ of the above equation (4) can be determined on the basis of the sensitivity $S_0$ data according to the least square approximation, and also, can be used as a representative value of past actual data value.

Figure 11:
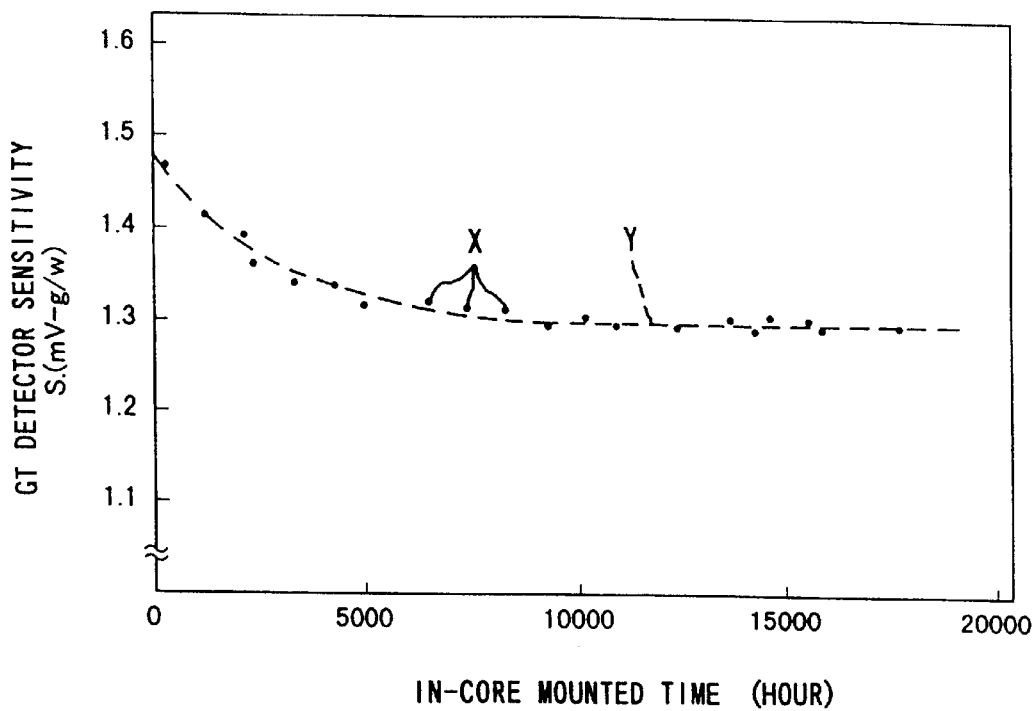
FIG. 11 is a view showing a change of the sensitivity of the GT detection portion, which is dependent on an in-core mounted time according to the first embodiment.

Now, referring to FIG. 11, there is shown an example of an elapse time change trend graph of the sensitivity $S_0$ of each GT detector 44 of each GT assembly 35, which is dependent on in-core elapsed (mounted) time based on the above equation (4). In the graph, a symbol X denotes an actually measured GT detector sensitivity $S_0$, and a symbol Y denotes an approximation curve represented by a predictive approximate equation of the equation (4) obtained by using the actually measured sensitivity $S_0$.

The operator monitors the comparative result between a newly transmitted sensitivity $S_0'$ and sensitivity change data, or the elapse time change trend graph (see FIG. 11), which is displayed on the display unit 63. In the monitoring result, in the case where the operator judges that the newly transmitted sensitivity $S_0'$ changes not less than a predetermined value {first judgement value (abnormal judgement value; allowable sensitivity change judgement value, for example 10% of the sensitivity $S_0$)}, the operator judges the transmitted sensitivity $S_0'$ to be wrong so as to transmit a bypass instruction to the process control computer 31 via the input console 62.

Moreover, for example, in the case where any sensitivities of plural GT detectors 44 of plural GT assemblies 35 change within a predictable range so that any sensitivities of them are normal, the operator is adapted to transmit a sensitivity update instruction for collectively updating the corresponding sensitivities of plural GT detectors 44 of plural GT assemblies 35, and further, is adapted to transmit a sensitivity update instruction for individually updating the corresponding sensitivity for each GT detector 44 and for each GT assembly 35.

The nuclear instrumentation control process module 60M1 of the CPU 60 of the process control computer 31 transmits a sensitivity update instruction for updating the sensitivity $S_0$ of the GT detector 44 of the GT assembly 35 corresponding to the transmitted sensitivity update instruction from the input console 62 into a new sensitivity $S_0'$, to the GT signal processing unit 48.

The GT signal processing unit 48 updates the sensitivity $S_0$ of GT detector 44 of the corresponding GT assembly 35 on the basis of the transmitted sensitivity update instruction into a new sensitivity $S_0'$, and then, converts the output voltage signal from the GT detector 44 into the GT data D1 with the use of the updated new sensitivity $S_0'$.

In addition, the nuclear instrumentation control process module 60M1 of the process control computer 31, according to a second judgement value (second allowable sensitivity change judgement value) which is previously stored in the memory unit 61 and is within the predictable range and less than the first judgement value, for example 0.2% of the sensitivity $S_0$ and the comparative result between the obtained sensitivity $S_0'$ and the sensitivity change data, or the sensitivity elapse time change trend graph, automatically makes a decision whether or not the newly transmitted sensitivity $S_0'$ changes more than the second judgement value and less than the first judgement. Then, in the case where it is judged that the newly transmitted sensitivity $S_0'$ changes more than the second judgement value and less than the first judgement value by the nuclear instrumentation control process module 60M1, the nuclear instrumentation control process module 60M1 of the CPU 60 of the process control computer 31 judges that the change of the newly sensitivity $S_0'$ is a normally and preferable change so as to transmit a sensitivity update instruction for updating the sensitivity $S_0$ of the GT detector 44 of the corresponding GT assembly 35 into a new sensitivity $S_0'$, to the GT signal processing unit 48.

In addition, in the case where it is judged that the newly transmitted sensitivity $S_0'$ changes less than the second judgement value by the nuclear instrumentation control process module 60M1, the nuclear instrumentation control process module 60M1 judges that it is not necessary to update the sensitivity $S_0$ of the GT detector 44 of the corresponding GT assembly 35 into a new sensitivity $S_0'$ so as not to execute the aforesaid sensitivity update process.

Furthermore, in the case where the newly transmitted sensitivity $S_0'$ changes not less that the first judgement value (e.g., 10% of the sensitivity $S_0$), the nuclear instrumentation control process module 60M1 judges the GT detector 44 of the corresponding to the GT assembly 35 to be wrong so as to output warning information including the address of the GT detector 44 and the GT assembly 35 which are wrong to the operator directly or via the display unit 63. As a result, according to the outputted warning information, the operator determines that the GT detector 44 corresponding to the warning information or the GT assembly 35 including the GT detector 44 corresponding to the warning information is wrong, thereby registering the GT detector 44 or the GT assembly 35 as a failure bypass.

In addition, the nuclear instrumentation control process module 60M1 of the CPU 60 of the process control computer 31 periodically evaluates the in-core elapse time of each GT assembly 35 successively updated and registered in the memory unit 61. In accordance with the elapse time of the in-core elapse time of each GT assembly 35, in the case where the GT heater calibration time interval set at the present point of time (within the in-core elapse time) is changed over into the next heater calibration time interval set in the next in-core elapse time, the nuclear instrumentation control process module 60M1 changes a display mode of display symbol of the corresponding GT assembly 35 (e.g., flushing the display symbol, etc.) on the heater calibration time interval registration image on the display unit 63 thereby informing a change-over of the above heater calibration time interval to the operator.

As described above, according to this first embodiment, in accordance with each heater calibration interval set according to each in-core elapse time of each GT assembly 35 (GT detector 44), the sensitivity of each GT detector 44 is measured by the operations of the nuclear instrumentation control process module 60M1, the GT signal processing unit 48, the GT heater control system 53 and the built-in heater 71, and the sensitivity of each GT detector 44 is updated according to the time change data of the measured sensitivity $S_0$, whereby it is possible to correct a drop-down or saturation of the output voltage of the GT detector 44 with respect to the gamma-ray heating value and to obtain an very accurate γ-ray heating value (GT data D1). Therefore, it is possible to further improve an accuracy of the process for correcting the core power distribution, thereby obtaining the core power distribution having a high reliability.

In particular, in an operation of a reactor, the sensitivity $S_0$ of each GT detector 44 of each GT assembly 35 slowly changes accompanying with an elapse time as shown by a broken line Y of FIG. 11, and then, becomes an equilibrium state. For this reason, in the nuclear instrumentation assembly 32 having a shorter in-core elapse time, which is mounted in the core 3 of the reactor and is started to be operated, the sensitivity $S_0$ thereof rapidly changes during its operation cycle. On the other hand, in the nuclear instrumentation assembly 32 which has been mounted from the previous operation cycle or before that, that is, having a longer in-core elapse time, the sensitivity $S_0$ of the GT detector 44 is almost stable.

Therefore, in the nuclear instrumentation assembly 32, in which the in-core elapse time is long and the sensitivity $S_0$ of the GT detector 44 of the GT assembly 35 is stable, a confirmation may be made whether or not the GT assembly 35 is wrong. Thus, since, for example, the heater calibration interval than 1000 hours or more as described above is set to the GT assembly 35 with stable sensitivity, it is possible to prevent an unnecessary in-ope state (bypass state) of the GT assembly from becoming long without carrying out unnecessary GT heater calibration process. Further, only GT assembly 35 having a relatively shorter in-core elapse time is calibrated by the built in heater at a relatively short heater calibration interval (e.g., 48 hours), thereby carrying out an effectively short-time GT heater calibration with respect to the GT heater. In addition, it is possible to make low a provability of heater breakdown in an operation life of the GT assembly 35.

Moreover, the heater calibration time interval of each GT assembly (each GT detector) is displayed on the heater calibration time interval registration image of the display unit 63; therefore, it is easy to make a heater calibration frequency management of the GT assembly 35, and it is possible to readily identify the presence of a short-time calibration target of the GT assembly 35.

In this first embodiment, the computation of the sensitivity $S_0$ of the GT detector 44 is carried out by means of the GT signal processing unit 48. However, the present invention is not limited to the structure. That is, the output voltage signal (mV) of the GT detector 44 is directly transmitted to the nuclear instrumentation control process module 60M1 of the process control computer 31, and then, the computation of the sensitivity $S_0$ of the GT detector 44 may be carried out by means of the nuclear instrumentation control process module 60M1. Namely, it is not substantial problem whether the computation of the sensitivity $S_0$ of the GT detector 44 is carried out by the CPU of which computer.

Moreover, in the above first embodiment, the sensitivity calibration time interval of the GT assembly 35 stored in the memory unit 61 of the process control computer 31 has four stages in accordance with the in-core elapse time history; however, the present invention is not limited to the structure. Namely the sensitivity calibration time interval may have plural stages, for example, three stages, or two stages. As seen from a degree of sensitivity change by individual in-core elapse times of the actual GT signal detectors, for example, referring to a sensitivity change graph as shown in FIG. 11, the sensitivity calibration time interval has characteristics such that the change is great in the initial mounted state, and is saturated accompanying with an elapse time. For this reason, in view of this time interval characteristics, for example, in the case where a third judgement value representing a gap between the actually measured sensitivity of each GT detector and prediction sensitivity thereof in heater calibration state, which is predicted from the time sequential data of the sensitivity, or a change value from the sensitivity result of each GT detector measured while the preceding sensitivity update process is executed, is set to a relatively small value (e.g., 1% of sensitivity), it is preferable that the sensitivity calibration time interval has multi stages such as four states described above.

Incidentally, in this embodiment, as a parameter for setting the calibration time interval of each GT detector, the in-core elapse time is used. However, the present invention is not limited to the structure. That is, an in-core neutron irradiation quantity of the sensor portion of each GT detector may be employed in place of the above in-core elapse time. In this case, the in-core neutron irradiation quantity for each GT detector 44 is accurately computed (simulated) by means of the power distribution simulation module 60M2 of the CPU 60. Furthermore, the simulated in-core neutron irradiation quantity of each GT detector 44 is stored in the memory unit 61 of the process control computer 31 in place of the in-core elapse time so that each heater calibration time interval of each GT detector is set in accordance with a range of 3 each in-core neutron irradiation quantity of each GT detector so as to store each heater calibration time interval in the memory unit 61. In addition, there is no need of accurately computing (simulating) the above in-core neutron irradiation quantity, and a parameter substantially proportional to the in-core neutron irradiation quantity may be replaced. For example, an average burn-up increment of each fuel nodes surrounding the GT detector 44 can be employed as the parameter.

According to this first embodiment, in the in-core fixed nuclear instrumentation system 30 of the reactor, the plurality of LPRM detectors 37 for detecting the local power distribution of power range in the reactor core 3 and the fixed GT detectors 44 of the gamma-ray thermometer assembly 35 for detecting the γ-ray heating value, are housed in the nuclear instrumentation tube 33. Further, the in-core fixed nuclear instrumentation system 30 includes: the in-core nuclear instrumentation assembly 32 in which the GT detectors 44 are arranged at least in the vicinity of the LPRM detectors 37; the LPRM signal processing unit 40 for processing the LPRM signal S2 from the LPRM detector 37; the GT signal processing unit 48 for processing the output voltage signal (GT signal) S1 from the GT assembly 35; and the GT heater control unit 53 for carrying out the electrically energizing control with respect to the built-in heater 71 built in the GT assembly 35.

On the other hand, the in-core fixed nuclear instrumentation system 30 is monitored and controlled by the nuclear instrumentation control process module 60M1 of the CPU 60 of the process control computer 31. The nuclear instrumentation control process module 60M1 constitutes a monitor and control module, and controls the operations of the GT heater control unit 53 and the GT signal processing unit 48. The GT heater control unit 53 carries out the electrically energizing control with respect to the built-in heater 71 of the GT assembly 35 so that the output voltage sensitivity of each GT detector 44 can be calibrated by heater heating.

Moreover, in the GT assembly 35, during reactor operation, the built-in heater 71 is electrically energized and heated, and then, the GT signal processing unit 48 measures an increase of output voltage of each GT detector 44 by heater heating (additional heating value) and the heating voltage and current to the built-in heater 71, and further, calibrates the thermocouple output voltage sensitivity of the GT detector 44 per unit heating value (W/g) by gamma-ray with the use of a previously measured heater resistance and the mass of the fixed GT detector 44. The interval of calibrating the output voltage sensitivity is set in accordance with the in-core elapse time of the gamma-ray thermometer assembly 35 as the parameter. The in-core elapse time of the gamma-ray thermometer assembly 35 is computed and so as to be stored in the memory unit 61 by the nuclear instrumentation control process module 60M1.

In accordance with each in-core elapse time of each GT assembly 35, the following heater calibration time intervals are previously prepared; for example, a first time interval, a second time interval, a third time interval . . . in the order of the shorter time interval. Then, the corresponding time interval is automatically selected in accordance with the computed in-core elapse time, and the output voltage sensitivity measurement by heater heating is carried out at the selected time interval.

The nuclear instrumentation control process module 60M1 outputs the warning information to the display unit 63 at the point of time when the heater calibration time interval of the output voltage sensitivity by heater heating of the fixed GT detector 44 of the GT assembly 35 is changed over from the previous time interval into a new time interval, and thus, the change-over of the calibration time interval is informed of the operator by the warning information.

[Second embodiment]

The following is a description on a second embodiment of an in-core fixed nuclear instrumentation system, a power distribution simulating system and a power distribution monitoring system according to the present invention.

This second embodiment has the same construction and operation of the reactor power distribution monitoring system 29, the in-core fixed nuclear instrumentation system 30 and the process control computer 31, as the first embodiment (see FIG. 1 to FIG. 11) of the present invention. Therefore, like reference numerals are used to designate the same elements as the first embodiment, and the details are omitted.

In the in-core fixed nuclear instrumentation system 30 and the power distribution simulating system 31 of this second embodiment, discrimination processing of the gamma-ray thermometer assembly 35 for calibrating an output voltage sensitivity by heater heating of the fixed GT detector 44 is basically different from that shown in the first embodiment of the present invention.

That is, the nuclear instrumentation control process module 60M1 as a part of processing functions of the CPU 60 has a function of computing a reactor operating time (hereinafter, defined as in-core elapse time) after each GT assembly 35 is mounted in the core 3 and a function of updating and storing each in-core elapse time of each GT assembly 35 in the memory unit 61 of the process control computer 31. Similarly to the first embodiment, a plurality of heater calibration time intervals {first heater calibration time interval (for example, 48 hours), second heater calibration time interval (for example, 165 hours), third heater calibration time interval (for example, 336 hours) and fourth heater calibration time interval (for example, 1000 hours)} are previously stored in the memory unit 61 so as to correspond to the in-core elapse times.

Moreover, the nuclear instrumentation control process module 60M1 has a function of storing an elapse time change data of the output voltage sensitivity $S_0$ of each GT detector 44 (time sequential data of the output voltage sensitivity) in the memory unit 61 of the process control computer 31 at each sensitivity calibration process of the GT assembly 35, which is carried out at each time interval selected in accordance with the in-core elapse time of the GT assembly 35 so that the time sequential data of the output voltage sensitivity correspond to the in-core elapse times. That is, in the memory unit 61, each time sequential data of each output voltage sensitivity of each GT detector 44 is stored as a table with respect to each in-core elapse time.

The nuclear instrumentation control process module 60M1 captures at least two or more latest time series data points from the present point of time with the use of the time series data of the sensitivity $S_0$ of the GT detector 44, and then, estimates a curve of an output voltage sensitivity change by a linear extrapolation or quadratic curve extrapolation on the basis of the time series data point, or estimates a future output voltage sensitivity change curve by approximating the data points to a linear approximate equation, a quadratic curve approximate equation or the least square approximation equation of a curve represented by the above equation (4) "$a+b \cdot e^{-\lambda t}$".

In the case of estimating the output voltage sensitivity change curve with the use of the above Equation (4) "$a+b \cdot e^{-\lambda t}$", "t" is an in-core elapse time, "a", "b" and "$\lambda$" are constant to be approximated. In this case, the "$\lambda$" may take a value representatively selected from the past sensitivity characteristic of the GT detector).

Figure 12:
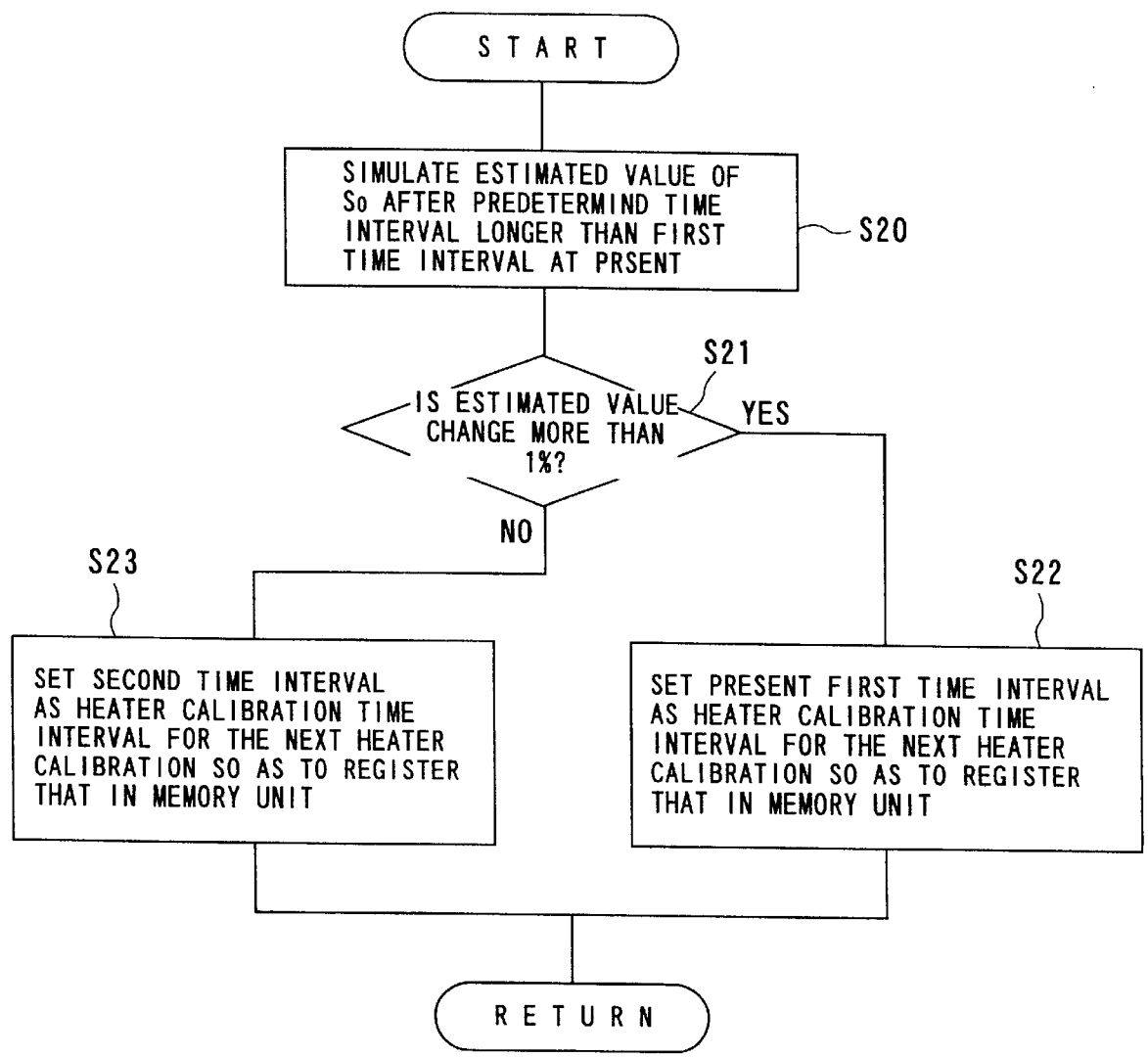
FIG. 12 is a flow chart schematically showing processes of the nuclear instrumentation control process module of the CPU of the process control computer according to a second embodiment of the present invention.

Then, the nuclear instrumentation control process module 60M1, as shown in FIG. 12, estimates a future value of the sensitivity $S_0$ of the GT detector 44 according to the above output voltage sensitivity change curve so as to calculate a value of the sensitivity $S_0$ after a predetermined time from the last heater heating calibration, that is, after a time interval (e.g., the second time interval of 168 hours) which is longer than a time interval to be selected next to the present selected time interval (e.g., the first time interval of 48 hours) (step S20).

In the case where the estimated value of the sensitivity $S_0$ changes to exceed the predetermined value, that is, the third judgement value, for example, in the case where it is estimated that the third judgement value is 1% of the sensitivity and the estimated value of the output voltage sensitivity $S_0$ changes more than the 1% from the sensitivity output voltage sensitivity measured at the point of the last heater heating calibration time (the judgement of step S21 is YES), a predetermined short time interval shorter than the next time interval (e.g., in the case where the present time interval is 48 hours, the predetermined short time interval is first time interval of 48 hours), is selected from the memory unit 61, and the selected time interval is set as the heater calibration time interval for the next heater calibration so as to be registered in the memory unit 61 (step S22).

On the other hand, in the case where it is estimated that the estimated value of the output voltage sensitivity $S_0$ changes not to exceed the third judgement value, that is, it is estimated that the estimated value of the output voltage sensitivity $S_0$ changes not more than the 1% from the sensitivity output voltage sensitivity measured at the point of the last heater heating calibration time (the judgement of step S21 is NO), a predetermined next time interval (e.g., the second time interval of 168 hours) longer than the present time interval (e.g., the first time interval of 48 hours) is selected from the memory unit 61, and the selected time interval is set as the heater calibration time interval for the next heater calibration so as to be registered in the memory unit 61 (step S23).

In this case, the nuclear instrumentation control process module 60M1 can automatically computes the heater calibration time interval with a predetermined limit range from the shortest heater calibration time interval (for example, first time interval of 48 hours) to the longest heater calibration time interval (for example, fourth time interval of 1000 hours) so that the sensitivity change is limited within a predetermined sensitivity range (within a range of the above third judgement value) in accordance with the change quantity of the estimated value of the output voltage sensitivity $S_0$ by the aforesaid estimating process of the nuclear instrumentation control process module 60M1.

According to the registration values of the heater calibration time intervals of the axial GT detectors 44 of one GT assembly 35 (excluding the assembly which is synthetically determined as being failure and bypass-registered in the nuclear instrumentation control process module 60M1), the nuclear instrumentation control process module 60M1 refers to the memory unit 61 so as to research the registered heater calibration time intervals of all axial GT detectors 44 of the GT assembly 35. Furthermore, the nuclear instrumentation control process module 60M1 transmits a heater calibration instruction of each GT detector 44 to the GT signal processing unit 48 and the GT heater control unit 53 on the basis of the heater calibration time interval having the shortest heater calibration time interval of all GT detectors 44 along the axial direction of the GT assembly 35.

The aforesaid function and heater calibrating method are necessary in the case of using the neutron irradiation quantity of the GT detector 44 as the parameter for heater calibration in place of the in-core elapse time of the GT assembly 35.

According to this second embodiment, only shipment (shipping) data value of an out-pile test or only initialization data is registered as an output voltage sensitivity $S_0$ of the GT detector 44 of the GT assembly 35 newly loaded in a regular inspection construction before an operation cycle. For this reason, the initial sensitivity $S_0$ of the GT detector 44 is detected, and then, the point of time when the core is a steady state is selected in a temporarily turbine operation at start-up, at the point of time of partial output after turbine operation, at the point of early time after rate output, and thus, the GT heater heating calibration processing is carried out three or four times by means of the operations of the aforesaid nuclear instrumentation control process module 60M1, the GT signal processing unit 48 and the GT heater control unit 53.

For example, by four-time or more heater calibration processing, concerning the output voltage sensitivity $S_0$ data of the GT detector 44 of the GT assembly 35 having four or more sensitivity $S_0$ data of the GT detector 44, a sensitivity $S_0$ value of the GT detector 44 after the predetermined time interval selected at present (here, is temporarily set as a second predetermined time interval) and a sensitivity $S_0$ value of the GT detector 44 after the predetermined time interval longer than the second predetermined time interval (here, is temporarily set as a third predetermined time interval), are estimated by a linear extrapolation or a quadratic curve extrapolation, or are estimated by using a liner approximation, quadratic curve approximation or the "$a+b \cdot e^{-\lambda t}$" curve approximation with the use of at least two or more latest time series data points from the present point of time of the sensitivity $S_0$ of the GT detector 44.

As a result of these estimations, in the case where it is estimated that the estimated change quantity of the sensitivity $S_0$ of the GT detector 44 after the second predetermined time interval exceeds the third judgement value 1%, the first calibration time interval shorter than the second predetermined time interval is registered as the next heater calibration time interval in the memory unit 61. On the other hand, in the case where it is estimated that the estimated change quantity of the sensitivity $S_0$ of the GT detector 44 after the third predetermined time interval does not exceed the third judgement value 1%, the third predetermined time interval longer than the second predetermined time interval is registered as the next heater calibration time interval in the memory unit 61.

Moreover, in the case where it is estimated that although the estimated change quantity of the sensitivity $S_0$ of the GT detector 44 after the second predetermined time interval does not exceed the third judgement value 1%, the estimated change quantity of the sensitivity $S_0$ of the GT detector 44 after the third predetermined time interval exceeds the third judgement value 1%, the second predetermined time interval is registered as the next heater calibration time interval in the memory unit 61.

Thereafter, automatic research process of each heater calibration time interval registered in the memory unit 61 is carried out in the GT detectors 44 discretely arranged in the axial direction of the identical GT assembly 35. Even in the event that in GT detector of the GT detectors 44 which are not bypass-registered, there is only one of GT heater calibration time interval having a short time interval, the heater calibration time interval of all GT detectors 44 of the corresponding GT assembly 35 is automatically corrected and registered as the aforesaid short heater calibration time interval in the memory unit 61.

In the finally registered GT calibration time interval, in the case where the time interval is changed over from the previous heater calibration time interval to a new heater calibration time interval, concerning the GT assembly 35, the nuclear instrumentation control process module 60M1 has a function of flushing and displaying the corresponding heater calibration time interval on the heater calibration time interval registration image on the display unit 63 so as to give a caution to the operator. Then, the operator checks the flushing and displaying heater calibration time interval data referring to the trend graph of the output voltage sensitivity $S_0$ of the GT detector 44 displayed on the display unit 63, and thus, can compare with the previous output voltage sensitivity $S_0$.

In the aforesaid manner, the final registration result of the GT heater calibration time interval registered in the memory unit 61 is processed by means of the nuclear instrumentation control process module 60M1, and then, is displayed on the display unit 63 so as to be informed of the operator.

That is, when reaching a predetermined heater calibration time corresponding to the heater calibration time interval of the predetermined GT assembly 35, the nuclear instrumentation control process module 60M1 gives a warning for carrying out the GT heater calibration process to the operator via the display unit 61, and then, displays the target GT assembly 35 on the display unit 61 on the basis of the registration result. In this case, although a GT heater calibration timing is different every GT assembly, heater calibration of all GT detectors 44 is necessarily carried out before adjustment process of the LPRM detector sensitivity by the GT signal is carried out in a cycle start-up (low power) or in the vicinity of a rated reactor output after start-up. Whereby it is possible to unify a timing base point of the heater calibration time interval of each GT assembly 35.

The GT heater heating calibration processing is carried out by the instruction from the process control computer 31 according to the same procedures as the first embodiment, and then, a newly obtained output voltage sensitivity $S_0$ of the GT detector 44 is transmitted to the process control computer 31. The operator's procedures after that is the same as the first embodiment.

This second embodiment has described the case of estimating the output voltage sensitivity $S_0$ of the GT detector 44 by extrapolating from at least two points of the output voltage sensitivity $S_0$ of the latest GT detector 44, e.g., three points, by using a linear equation approximation, a quadratic equation approximation or "$a+b\cdot e^{-\lambda t}$" equation approximation. The present invention is not limited to the structure, but the output voltage sensitivity $S_0$ of the GT detector 44 may be estimated by extrapolating from four points of the output voltage sensitivity $S_0$ of the latest GT detector 44 by using a cubic equation approximation or a least square approximation of other function.

As described above, according to this second embodiment, the sensitivity $S_0$ changes of the GT detector 44 in predetermined future time points are estimated from the latest $S_0$ trend data with respect to the present sensitivity $S_0$ of the GT detector 44. Then, in the case where the estimated change value for the present selected interval is larger than the third judgement value, the short time interval is registered as the GT heater calibration time interval; therefore, it is possible to flexibly cope with an unexpected output voltage sensitivity change of the GT assembly 35, and to prevent a power distribution accuracy by the GT assembly 35 from being deteriorated. Moreover, in the case where the GT heater calibration time interval is changed over from the previous time interval into a new time interval, the above change-over is informed via the display unit 63. Thus, it is possible to give a warning of inspection and caution for any failures to the operator, and to improve an efficiency of maintaining a reliability of the in-core instrumentation of the reactor.

In addition, it is possible to automatically calculate the heater calibration time interval within a predetermined range from the minimum heater calibration time interval to the maximum heater calibration time interval so that the sensitivity change is limited within a predetermined sensitivity change (within a range of the third judgement value) in accordance with the estimated sensitivity change.

According to this second embodiment, in the in-core fixed nuclear instrumentation system 30 of the reactor, the plurality of fixed neutron detectors (LPRM detectors) 37 for detecting the local power distribution of power range in the reactor core and fixed GT detectors 44 gamma-ray thermometer assembly 35 for detecting the γ-ray heating value, are housed in the nuclear instrumentation tube 33. Further, the in-core fixed nuclear instrumentation system 30 includes: the in-core nuclear instrumentation assembly 32 in which the GT detectors 44 are arranged at least in the vicinity of the fixed LPRM detectors 37; the LPRM signal processing unit 40 for processing the LPRM signal S2 from the LPRM detector 37; the GT signal processing unit 48 for processing the output voltage signal (GT signal) S1 from the gamma-ray thermometer assembly 35; the GT heater control unit 53 for carrying out an electrically energizing control with respect to the heaters 71 built in the GT assembly 35; and the nuclear instrumentation control process module 60M1 for simulating (computing) and storing the in-core elapse time or in-core irradiation quantity (burn-up quantity) of the GT assembly 35. The nuclear instrumentation control process module 60M1 controls the operations of the GT heater control unit 53 and the GT signal processing unit 48.

During a reactor operation, when the heater wire of the built-in heater 71 is electrically energized by means of the GT heater control unit 53, the thermocouple output voltage increasing sensitivity of the fixed GT detector 44 of the GT assembly 35 with respect to heater heating (additional heating value), is measured by means of the GT signal processing unit 48 on the basis of a heating voltage and current of the built-in heater 71 (heater wire). Then, an output voltage sensitivity per unit heating value (W/g) by a gamma-ray is calibrated by means of the GT signal processing unit 48 on the basis of the previously measured (already known) heater resistance value and the mass (heating conversion mass) of the fixed GT detector 44.

As the time interval of calibrating the output voltage sensitivity of the GT assembly 35, the nuclear instrumentation control process module 60M1 stores, when the GT assembly 35 is initially mounted in the core 3, the sensitivity time series data of each GT detector 44 computed by the GT signal processing unit 48 as the predetermined shortest time interval (for example, the first time interval) as the table with respect to the in-core elapse time in the memory unit 61. Furthermore, the nuclear instrumentation control process module 60M1 estimates and computes an output voltage sensitivity change curve from the latest two or more points time series data from the present point of time, and then, compares the output voltage sensitivity change value with the third judgement value set to a predetermined future time after the first time interval, and with the third judgement value set to a future time after the second time interval. In the case where the output voltage sensitivity change value does not exceed the third judgement value even after the longer second time interval, a heater heating calibration of each detector 44 is carried out at the predetermined second longer time interval.

With the elapse of in-core elapse time, in a state that the heater calibration time interval of the GT assembly of a longer, e.g., a third time interval is set, the nuclear instrumentation control process module 60M1 estimates and computes the output voltage sensitivity change curve from the latest two or more points time series data from the present point of time, and then, compares the output voltage sensitivity changes with predetermined future time points, that is, the third judgement value set with respect to a future time after the third time interval and a future time after the fourth time interval. Then, the nuclear instrumentation control process module 60M1 carries out the following output voltage calibration process for controlling the GT heater control unit 53 and the GT signal processing unit 48. More specifically, the processes includes:

1) in the case where the output voltage sensitivity change does not exceed the third judgement value even after the longer fourth time interval, a heater heating calibration of each GT detector 44 is carried out at the predetermined fourth longer time interval;

2) in the case where the output voltage sensitivity change does not exceed the third judgement value after the predetermined third time interval, but exceeds the third judgement value after the predetermined longer fourth time interval, a heater heating calibration of each detector 44 is carried out at the predetermined third longer time interval; and 3) in the case where the output voltage sensitivity change exceeds the third judgement value after the longer third time interval, a heater heating calibration of each detector 44 is carried out at the predetermined shorter second time interval, or the maximum value of the time intervals previously set for satisfying the third judgement value (in this case, either of the first or second time interval).

Moreover, the nuclear instrumentation control process module 60M1 outputs a warning signal to the display unit 63 at the point of time when the heater calibration time interval of the GT assembly 35 is changed over from the previous time interval into a new time interval, and thus, informs the change-over of heater calibration time interval of the operator.

[Third embodiment]

The following is a description on a third embodiment of an in-core fixed nuclear instrumentation system, a power distribution simulating system and a power distribution monitoring system of the present invention.

This third embodiment has the same construction and operation of the reactor power distribution monitoring system 29, the in-core fixed nuclear instrumentation system 30 and the power distribution simulating system 31 as the first and second embodiments of the present invention. Like reference numerals are used to designate the same constituent components as the first embodiment (see FIG. to FIG. 11), and the details are omitted.

In the in-core fixed nuclear instrumentation system 30 and the power distribution simulating system 31 according to the third embodiment, discrimination processing of the GT assembly 35 for calibrating an output voltage sensitivity by heater heating of the fixed GT detector 44 is basically different from those shown in the first and second embodiments of the present invention. Namely, this third embodiment has been made in combination with the first and second embodiments of the present invention.

The process control computer 31 is provided with the CPU 60 having the nuclear instrumentation control process module 60M1. The nuclear instrumentation control process module 60M1 has a function of computing a reactor operating time (in-core elapse time) after the GT assembly 35 is mounted in the core 3, and a function of storing the reactor operating time (in-core elapse time).

Similarly to the first embodiment, a plurality of heater calibration time intervals {first heater calibration time interval (for example, 48 hours), second heater calibration time interval (for example, 165 hours), third heater calibration time interval (for example, 336 hours) and fourth heater calibration time interval (for example, 1000 hours)} are previously stored in the memory unit 61 so as to correspond to the in-core elapse times.

In a state that there is no change in a normal operating parameter (the core state data including the reactor power level, the core cooling flow rate, the control rod pattern, etc.), in accordance with the elapse of time after being mounted in the core 3 (in-core elapse time in reactor operating mode), as described in the first embodiment, the nuclear instrumentation control process module 60M1, when executing the heater calibration, refers to the memory unit 61, thereby, automatically discriminating and selecting the GT assembly of heater calibration target from all GT assemblies 35 on the basis of the elapse time until the present from the previous calibration processing time of each GT assembly 35 and the heater calibration time interval corresponding to the computed present in-core elapse time of each GT assembly 35.

Furthermore, the nuclear instrumentation control process module 60M1 executes a re-judgement process at each GT heater calibration process and registers the heater calibration time interval corresponding to in-core elapse time of the discriminated GT assembly 35 in the memory unit 61, and then, transmits the registered heater calibration time interval corresponding to the in-core elapse time corresponding to each GT assembly 35 to the display unit 63 so as to display the registered heater calibration time interval of each GT assembly 35 on the heater calibration time interval registration image of the display unit 63.

Furthermore, the nuclear instrumentation control process module 60M1 automatically transmits a heater calibration processing execution instruction with respect to the GT assembly 35 selected as a heater calibration target, to the GT heater control unit 53 and the GT signal processing unit 48, or transmits a GT calibration instruction command transmission request with respect to the GT assembly 35 selected as a heater calibration target, to the display unit 63 so as to output and display the request onto the operator via the display unit 63.

In the GT assembly 35 requiring the heater calibration process displayed on the display unit 63, heater calibration is carried out in a predetermined sequence by means of the GT signal processing unit 48 and the GT heater control unit 53 according to an (automatic or manual) instruction of the nuclear instrumentation control process module 60M1 of the CPU 60 of the process control computer 31.

That is, the GT heater control unit 53 starts to supply a power (applies a voltage) to the built-in heater 71 of the GT assembly 35 with time delay corresponding to a positional address of the transmitted heater calibration processing execution instruction, and then, controls the heater voltage to be applied to the built-in heater 71 so that a current value flowing through the built-in heater 71 becomes a predetermined value.

Next, the GT heater control unit 53 measures the applied voltage value and the current value flowing through the built-in heater 71, and then, transmits the measured values to the GT signal processing unit 48.

On the other hand, the GT signal processing unit 48 receives the heater calibration processing execution instruction (positional address) transmitted from the nuclear instrumentation control process module 60M1, and then, in accordance with the receiving timing, concurrently measures the non-heated thermocouple output voltage signal (mV) of each GT detector 44 of the GT assembly 35 having the positional address. Further, the GT signal processing unit 48 receives the heater applied voltage and the current measured value transmitted from the GT heater control unit 53, and then, in accordance with the receiving timing, concurrently measures the heated thermocouple output voltage signal (mV) of each GT detector 44 of the GT assembly 35 along the axial direction.

Then, the GT signal processing unit 48 stores the non-heated and heated output voltage signals in each GT detector 44 of the measured heater calibration target GT assembly 35 in the memory unit 48B of the GT signal processing unit 48 for each GT detector 44. The above heater calibration process according to the heater calibration process execution instruction is continued while changing the positional addresses of the target GT assemblies until the heater calibration process to all of the target GT assemblies which have need of the heater calibration is finished.

Further, the GT signal processing unit 48 can compute the sensitivity $S_0$ of all GT detectors 44, and voltage and current of heater power supply of the heater calibration target GT assembly 35 on the basis of the stored no-heated and heated output voltage signals and heater power of each GT detector 44 according to the same procedures as the first embodiment. Then, the GT signal processing unit 48 stores the computed sensitivity $S_0$ of each GT detector 44 in the memory unit 48B of the processing unit 48, and transmits the computed sensitivity $S_0$ of each GT detector 44 to the nuclear instrumentation control process module 60M1 of the process control computer 31.

The aforesaid sensitivity measurement process by the GT heater control unit 53 and the GT signal processing unit 48 on the basis of the heater calibration process execution instruction, is repeatedly carried out until process with respect to all heater calibration target GT assemblies 35 is completed.

The nuclear instrumentation control process module 60M1 has a function of storing an elapse time change data of the output voltage sensitivity $S_0$ of each GT detector 44 transmitted from the GT signal processing unit 48 by the above sensitivity measurement process of the GT detector 44. Further, the nuclear instrumentation control process module 60M1 estimates (simulates) an output voltage sensitivity change curve by a linear extrapolation or quadratic curve extrapolation on the basis of the time series data points, or estimates (simulates) a future output voltage sensitivity change curve by approximating the data points to a linear approximation equation, a quadratic curve approximate equation or to the least square approximation equation of a curve represented by the above equation (4) "$a+b \cdot e^{-\lambda}_t$".

Then, the nuclear instrumentation control process module 60M1 simulates an estimated sensitivity change after a predetermined time interval (i.e., future time) to be automatically selected from the in-core elapse time at the present point of time from the point of the last heater calibration time.

In the case where the sensitivity change estimation value thus computed is more than the third judgement value (e.g., 1%), regardless of the next heater calibration time interval determined from the in-core elapse time stored in the memory unit 61, the nuclear instrumentation control process module 60M1 carries out update and registration with respect to the memory unit 61 at a predetermined time interval shorter one stage than the time interval selected at the present point of time, or at the maximum time interval of a plurality of the heater calibration time intervals previously stored in the memory unit 61 such that the sensitivity change is kept within a range of the third judgement value.

Moreover, in the case where the sensitivity change estimation value thus computed is less than the third judgement value (e.g., 1%), the nuclear instrumentation control process module 60M1 registers the next heater calibration time interval as a predetermined time interval determined from the in-core elapse time (e. g., the next heater calibration time interval determined from the in-core elapse time stored in the memory unit 61).

Then, the nuclear instrumentation control process module 60M1 researches the heater calibration time intervals of the axial GT detectors 44 of the GT assembly 35, and in the case where the heater calibration time interval of any one of detectors 44 (in this case, excluding detector which is determined as being synthetically failure, and is bypassed-registered to the nuclear instrumentation control process module 60M1), is registered in the memory unit 61 at a shorter time interval, the nuclear instrumentation control process module 60M1 transmits a heater calibration instruction of each GT detector 44 to the GT signal processing unit 48 and the GT heater control unit 53 on the basis of the heater calibration time interval having the shortest heater calibration time interval.

According to this third embodiment, the sensitivity $S_0$ of the GT detector 44 is calibrated at a predetermined shorter first time interval when the GT assembly 35 is initially mounted in the core 3, and then, when a predetermined in-core elapse time elapses, the heater calibration time interval is updated and registered as a predetermined longer second heater calibration time interval corresponding to the in-core elapse time. Thereafter, according to the above procedure, in accordance with the elapse of the in-core elapse time, a longer heater calibration time interval is automatically selected, and then, is successively updated and registered. However, in the case where the GT detector sensitivity $S_0$ change after the elapse of future time (equivalent to a GT heater calibration time interval selected according to the present in-core elapse time) estimated from the data trend (time change data) of GT detector sensitivity $S_0$ on the latest two or more points, is more than the third judgement value (e.g., 1%), the heater calibration time interval is temporarily changed and registered to the shorter time interval.

Thereafter, automatic research process of each heater calibration time interval registered in the memory unit 61 is carried out in the GT detectors 44 discretely arranged in the axial direction of the identical GT assembly 35. Then, in the case where even one of GT heater calibration time intervals having a shorter time interval is registered in the GT detectors 44 which are not bypass-registered, the heater calibration time interval of all GT detectors 44 of the corresponding GT assembly 35 is automatically corrected and registered as the short time interval in the memory unit 61.

In the finally registered GT heater calibration time interval, in the case where the time interval is changed over from the previous heater calibration time interval into a new heater calibration time interval, concerning the corresponding GT assembly 35, the nuclear instrumentation control process module 60M1 has a function of flashing and displaying the corresponding heater calibration time interval data on the heater calibration time interval registration image on the display unit 63 so as to give a caution to the operator. Thus, the operator refers to the trend graph of the output voltage sensitivity $S_0$ of the GT detector 44 displayed on the display unit 63 while checking the flashed and displayed heater calibration time interval and comparing the previous output voltage sensitivity $S_0$.

In the manner as described above, the final registration result of the GT heater calibration time interval registered in the memory unit 61 is displayed on the display unit 63 by means of the nuclear instrumentation control process module 60M1 so that the operator can see the result.

More specifically, when reaching a predetermined heater calibration time corresponding to the heater calibration time interval of the predetermined GT assembly 35, the nuclear instrumentation control process module 60M1 gives a warning for carrying out the GT heater heating calibration process to the operator via the display unit 63, and then, displays the target GT assembly 35 on the display unit 63 on the basis of the aforesaid registration result.

In the GT assembly 35 changed into the next calibration time interval shorter than the heater calibration time interval selected from the in-core elapse time, the sensitivity change until the next heater calibration time determined by the in-core elapse time at the present time after the next heater calibration, will be estimated, and then, in the case where the sensitivity change satisfies the third judgement value, the time interval will be returned to the heater calibration time determined by the in-core elapse time. On the other hand, in the case where the sensitivity change does not satisfy the third judgement value, the next heater calibration will be again carried out at the shorter time interval.

The above GT heater heating calibration process is carried out by the instruction of the process control computer 31 according to the same procedures as the first embodiment, and then, a newly obtained output voltage sensitivity $S_0$ of the GT detector 44 is transmitted to the process control computer 31. The operator's procedures after that is the same as the first embodiment.

As described above, according to this third embodiment, the sensitivity $S_0$ change of the GT detector 44 in a predetermined future time is estimated from the latest $S_0$ trend data with respect to the sensitivity $S_0$ of the GT detector 44 at the present time, and in the case where the estimated change value is more than the third judgement value, a GT heater calibration time interval having a short time interval is registered. Thus, it is possible to flexibly cope with an unexpected output voltage sensitivity change of the GT assembly 35, and to prevent a deterioration of power distribution measurement accuracy by the GT assembly 35. Moreover, in the case where the heater calibration time interval is changed over from the previous time interval into a new time interval, the above change-over is informed of the operator via the display unit 63. Thus, it is possible to give a warning of inspection and caution for any failures to the operator, and to improve an efficiency for maintaining a reliability of reactor in-core instrumentation.

According to this third embodiment, in the in-core fixed nuclear instrumentation system 30 of the reactor, the plurality of fixed neutron detectors (LPRM detectors) 37 for detecting the local power distribution of power range in the reactor core and fixed GT detectors 44 gamma-ray thermometer assembly 35 for detecting the γ-ray heating value, are housed in the nuclear instrumentation tube 33. Further, the in-core fixed nuclear instrumentation system 30 includes: the in-core nuclear instrumentation assembly 32 in which the GT detectors 44 are arranged at least in the vicinity of the fixed LPRM detectors 37; the LPRM signal processing unit 40 for processing the LPRM signal S2 from the LPRM detector 37; the GT signal processing unit 48 for processing the output voltage signal (GT signal) S1 from the gamma-ray thermometer assembly 35; the GT heater control unit 53 for carrying out an electrically energizing control with respect to the heaters 71 built in the GT assembly 35; and the nuclear instrumentation control process module 60M1 for calculating (computing) and storing the in-core elapse time or in-core irradiation quantity (burn-up quantity) of the GT assembly 35. The nuclear instrumentation control process module 60M1 controls the operations of the GT heater control unit 53 and the GT signal processing unit 48.

During a reactor operation, when the heater wire of the built-in heater 71 is electrically energized by means of the GT heater control unit 53, the thermocouple output voltage increasing sensitivity of the fixed GT detector 44 of the GT assembly 35 with respect to heater heating (additional heating value), is measured by means of the GT signal processing unit 48 on the basis of a heating voltage and current of the built-in heater 71 (heater wire). Then, an output voltage sensitivity per unit heating value (W/g) by a gamma-ray is calibrated by means of the GT signal processing unit 48 on the basis of the previously measured (already known) heater resistance value and the mass (heating conversion mass) of the fixed GT detector 44.

In the case of calibrating the output voltage sensitivity of the GT assembly 35, in the nuclear instrumentation control process module 60M1, the in-core elapse time (or in-core irradiation quantity) of the GT assembly 35 is used as the parameter, and the heater calibration time interval is selected according to the plurality of heater calibration time intervals to be selected in accordance with the in-core elapse time previously stored in the memory unit 61, and thus, the heater calibration by heater heating is carried out via the GT signal processing unit 48 and the GT heater control unit 53.

Further, the nuclear instrumentation control process module 60M1 stores the sensitivity time series data of each GT detector 44 computed by the GT signal processing unit 48, and estimates the sensitivity change curve from time series data of two or more latest points from the present point of time. In the case where the sensitivity change exceeds the third judgement value set with respect to a predetermined future time determined by the in-core elapse time, the time interval is changed into a calibration time interval having a short time interval, and the heater calibration is carried out by controlling the GT heater control unit 53 and the GT signal processing unit 48.

[Fourth embodiment]

The following is a description on a fourth embodiment of an in-core fixed nuclear instrumentation system, a power distribution simulating system and power distribution monitoring system of the present invention.

This fourth embodiment has the same structure and operation of the reactor power distribution monitoring system 29, the in-core fixed nuclear instrumentation system 30 and the power distribution simulating system 31 as the first and second embodiments of the present invention. Like reference numerals are used to designate the same constituent components as the first embodiment (See FIG. 1 to FIG. 11), and the details are omitted.

The reactor in-core fixed nuclear instrumentation system 30 and power distribution monitoring system 29 of this fourth embodiment are a modification of the first, second and third embodiments of the present invention. In the first, second and third embodiments of the present invention, a reactor operation elapse time (in-core elapse time) after the GT assembly 35 is mounted in the reactor core 3 has been used as the parameter in the GT heater calibration process of the sensitivity $S_0$ of the GT detector 44.

According to this fourth embodiment, the process control computer 31 has a function of computing a neutron irradiation quantity of the in-core nuclear instrumentation assembly 32. With the use of the function of computing the neutron irradiation quantity, the computed neutron irradiation quantity is used as the parameter in place of the in-core elapse time of the in-core nuclear instrumentation assembly 32.

The computation of the in-core neutron irradiation quantity of each GT assembly 35 is carried out by means of the power distribution simulation process module 60M2 of the CPU 60 of the process control computer 31. More specifically, the power distribution simulation process module 60M2 carries out the computation of the in-core neutron irradiation quantity with the use of the three-dimensional nuclear thermal-hydraulics simulation code of the power distribution simulation program module PM2 which is a BWR three-dimensional simulator module. By using the power distribution simulation program module PM2, not only the in-core elapse time of the in-core nuclear instrumentation assembly 32 but also an elapse time change of thermocouple by a neutron irradiation is taken into consideration and is used as the parameter. In this case, in place of accurately carrying out the computation of the neutron irradiation quantity, an average burn-up increment of nodes surrounding the GT detector 44 is used as the parameter substantially proportional to the neutron irradiation quantity, and then, an accumulative burn-up increment of each GT detector 44 after being mounted in the core 3 may be used as the parameter.

Thus, by the power distribution simulation module 60M2 of the process control computer 31, it is possible to more accurately reflect a sensitivity change of the GT detector 44 which varies by the in-core neutron irradiation.

This fourth embodiment shows the modification of the first, second and third embodiments of the present invention. In the in-core fixed nuclear instrumentation system of this fourth embodiment, the nuclear instrumentation control process module 60M1 stores the in-core elapse time or in-core neutron irradiation quantity of each GT detector 44 of the each GT assembly 35, and then, evaluates the stored data so as to control the heater heating calibration of each GT detector 44.

[Fifth embodiment]

The following is a description on a fifth embodiment of an in-core fixed nuclear instrumentation system, a power distribution simulating system and a power distribution monitoring system of the present invention.

This fifth embodiment is a modification of the first to fourth embodiments of the present invention. This fifth embodiment has the same construction and operation of the reactor power distribution monitoring system 29, the in-core fixed nuclear instrumentation system 30 and the power distribution simulating system 31 as the first and second embodiments of the present invention. Like reference numerals are used to designate the same constituent components as the first embodiment (See FIG. 1 to FIG. 11), and the details are omitted.

In the first to fourth embodiments of the present invention, at the point of time of carrying out the GT heater calibration, for example, the operator confirms that reactor operating mode parameters (the core state data S3 including the core power distribution, the core coolant flow rate, the control rod pattern, etc.) are constant, and then, in the state that the above core state data is constant, the GT heater calibration has been carried out.

However, in fact, the GT assembly 35 measures a gamma-ray heating value; for this reason, a response characteristic of the GT assembly 35 does not reach an accurate fission rate, that is, a GT signal level proportional to an in-core local power unless a nuclide decay chain of gamma-ray source is in an equilibrium state. Therefore, even if the reactor operating mode is a fixed state, unless the state is continued for a predetermined time, an accurate GT signal level is not obtained.

According to this fifth embodiment, the reactor core state data measuring device 55 detects core state changes such as the change of the core power distribution, the core coolant flow rate and the control rod pattern, and then, the nuclear instrumentation control process module 60M1 of the process control computer 31 makes a decision whether a predetermined time elapses after detecting the core state change, on the basis of the transmitted core state data D3.

More specifically, the nuclear instrumentation control process module 60M1 stores the change point of time when the core state (the parameter such as the core state data D3) varies, in the memory unit 61, and then, according to the same process as the first to fourth embodiments, when it is determined that a present time is reached to a predetermined time for executing the GT heater calibration process, the nuclear instrumentation control process module 60M1 automatically makes a decision whether a predetermined necessary time elapses after the change point at which the above core state (the parameter) varies, on the basis of the core state data D3. Further, the nuclear instrumentation control process module 60M1 displays the result on the display unit 63, and the operator confirms that the heater calibration process of the GT assembly 35 is suitably carried out, and manually starts up the GT heater calibration process, or automatically starts up the GT heater calibration process after the predetermined necessary time is elapsed from the change point at which the above core state (the parameter) varies.

In this structure of this embodiment, in a state that the GT signal level is in a non-equilibrium transient state, it is possible to prevent the sensitivity $S_0$ of the GT detector 44 from being calibrated by additional heating of the built-in heater 71, thereby, preventing an inaccurate conversion of unit heating value (W/g) of gamma-ray heating from the output voltage (mV) signal by the GT detector.

[Sixth embodiment]

The following is a description on a sixth embodiment of an in-core fixed nuclear instrumentation system, a power distribution simulating system and a power distribution monitoring system of the present invention.

This sixth embodiment has the same construction and operation of the reactor power distribution monitoring system 29, the in-core fixed nuclear instrumentation system 30 and the power distribution simulating system 31 as the first embodiment of the present invention. Like reference numerals are used to designate the same constituent components as the first embodiment (See FIG. 1 to FIG. 11), and the details are omitted.

The reactor power distribution monitoring system 29 of this sixth embodiment has the substantially same block configuration as shown in the reactor power distribution monitoring system of FIG. 1.

More specifically, as shown in FIG. 1, the reactor pressure vessel 2 is housed in the primary containment vessel 1, and the reactor core 3 is housed in the reactor pressure vessel 2. As shown in FIG. 2 and FIG. 3, the reactor core 3 is constructed in a manner that a large number of fuel assemblies 4 and control rods 5 are mounted therein.

In the reactor pressure vessel 2, the in-core nuclear instrumentation assembly 32 of the in-core fixed nuclear instrumentation system 30 is mounted in the fuel gap G between four fuel assemblies 4. The in-core fixed nuclear instrumentation assembly 32 includes the nuclear instrumentation tube 33, a plurality of (N) fixed neutron detectors (LPRM detectors) 37 constituting the neutron detector assembly 34 and a plurality ($\geq N$) of fixed γ-ray heating detectors (GT detectors) 44 constituting the γ-ray heating detector assembly 35, which are housed in the nuclear instrumentation tube 33.

Meanwhile, the in-core fixed nuclear instrumentation system 30 has the power range neutron flux measuring system 41 and the gamma thermometer power distribution measuring system 50. The power range neutron flux measuring system 41 is composed of the plurality of fixed LPRM detectors 37 mounted in the core 3 and the signal processing unit 40. On the other hand, the gamma thermometer power distribution measuring system 50 is composed of the GT assemblies 35 each having a plurality ($\geq N$) of the GT detectors 44 and the GT signal processing unit 48.

Thus, the in-core fixed nuclear instrumentation assembly 32 is provided with a detector group of the in-core fixed nuclear instrumentation system 30, and the in-core nuclear instrumentation assembly 32 including the fixed detector group measures neutron flux and the γ-ray heating value at predetermined measurement points in the core 3.

Further, the in-core fixed nuclear instrumentation system 30 includes the gamma-ray thermometer control unit 53 for supplying the power to the built-in heater 71 of the GT assembly 35. The gamma-ray thermometer control unit 53 carries out a control for electrically energizing the built-in heater 71 of the GT assembly 35 via the power cable 54 so as to adjust and control a heater heating value.

Moreover, in the reactor pressure vessel 2 or a primary system piping (not shown), a core state data measuring device 55 is provided. The core state data measuring device 55 measures core state data S3 (process quantity) including a control rod pattern, a core coolant flow rate, an internal pressure of the reactor pressure vessel, flow of feed water, a temperature of feed water (a core inlet coolant temperature) and so on, which are used as various operating parameters indicative of a reactor operating mode (state) of the reactor.

Further, one part of the core state data measuring devices 55, which is inside of the vessel 1, is connected to a core state data processing unit 58 via a signal cable 57 penetrating through a penetration portion 56, and other part thereof, which is outside of the vessel 1, is connected via the signal cable 57 to the core state data processing unit 58, so that a process data measuring system 59 is constructed.

In addition, the power distribution monitoring system 29 of this embodiment is provided with a process control computer 31. The process control computer 31 inputs the following data: more specifically, the GT data D1 (W/g signal) obtained by signal processing of the GT signal processing unit 48 based on the GT signal S1 detected by the GT detector 44; the LPRM data D2 obtained by signal processing of the LPRM signal processing unit 40 based on the LPRM signal S2 detected by the LPRM detector 27; and the core state data D3 obtained by signal processing of the core state data signal processing unit 58 based on the core state data signal S3 measured by the core state data measuring device 55. Further, the process control computer 31 simulates the reactor power distribution, and thus monitoring and controlling the in-core nuclear instrumentation system 30.

The process control computer 31 includes the CPU 60 having the power distribution simulation process module 60M2. The process module 60M2 is operative to input the core state data D3, and to simulate the neutron flux distribution in the core 3, the power distribution therein and the margin with respect to the operational thermal limit value by executing the three-dimensional nuclear thermal-hydraulics simulation according to the physical model (three-dimensional nuclear thermal-hydraulics simulation code) of the program module PM2 stored in the memory unit 61 of the process control computer 31.

Furthermore, the CPU 60 includes: the power distribution simulation process module 60M2 which corrects the power distribution simulation result of the process module 60M1 by referring the GT data D1 (W/g signal) or the LPRM data D2, and thus, obtains the core power distribution reflecting the actually measured data in the core 3 and having a high reliability; and the nuclear instrumentation control process module 60M1 for monitoring and controlling the in-core nuclear instrumentation system 30. In addition, the process control computer 31 has the memory unit 61, the input console and the display unit 63.

The GT assembly 35 incorporated into the in-core fixed nuclear instrumentation system 30 of this sixth embodiment has the same structure as the GT assembly shown in FIG. 2, FIG. 3, FIG. 5 and FIG. 6 described in the first embodiment.

By the way, the in-core power distribution simulation of the reactor, in which the large number of fuels assemblies 4 closely stand in the core 3, is carried out by the power distribution simulation process module 60M2 of the process control computer 31 according to the so-called three-dimensional nuclear thermal-hydraulics simulation. Then, the power distribution simulation process module 60M2 displays the in-core power distribution, the operational limit value {the MLHGR(kW/m) and the MCPR} of core fuel, the margin with respect to the operational limit value, to the operator via the display unit 63.

According to this sixth embodiment, the core state data signal S3 indicative of the present core state obtained from the core state data measuring device 55 in the core 3 is collected by the core state data processing unit 58 (there is the case where it is carried out by the process control computer 31), and then, the reactor thermal output, the core inlet coolant temperature and so on are simulated. The core state data D3 including the simulation result of the reactor thermal output and so on is transmitted to the power distribution simulation module 60M2 of the CPU 60 of the process control computer 31 via the signal interface function of the nuclear instrumentation control process module 60M1 of the CPU 60.

The process control computer 31, which monitors the reactor operating mode and the core power distribution, always continuously receives the core state data D3 (the parameters showing the state in the core 3), and then, the power distribution simulation process module 60M2 periodically (e.g., one time per hour) or always caries out the core power distribution simulation (three-dimensional nuclear thermal-hydraulics simulation) on the basis of the latest operating parameters of the reactor (the core state data D3) and the three-dimensional nuclear thermal-hydraulics simulation code of the program module PM2 in accordance with the simulation request command inputted by operating the input console 62 by the operator.

Then, the process control computer 31 (the power distribution simulation process module 60M2) corrects the core power distribution obtained by the above three-dimensional nuclear thermal-hydraulics simulation of the process module 60M2 on the basis of the GT data D1 (W/g signal) or the LPRM data D2 at the point of time of the core power distribution simulation, thereby calculating the in-core power distribution and the margin with respect to the operational thermal limit value, which have high accuracy and high reliability.

In addition, in this sixth embodiment, the axial in-core power distribution is adapted so as to be corrected with the GT data (w/g) converted by the GT signal processing unit 48 on the basis of the GT signals S1 detected by the GT detectors 44 having the number (e.g., the same number as LPRM detectors 37, that is, four or more) less than 24 nodes (there is the case of 12 nodes or 26 nodes) and the three-dimensional nuclear thermal-hydraulics simulation code.

Related to some nodes in the axial direction at which the GT detector 44 is provided, difference between each simulation value of $\gamma$-ray heating values of each axial node of each GT assembly 35 and each actual measured value (GT data D1 value) thereof is obtained by ratio.

Then, by the power distribution simulation process module 60M2 of the CPU 60, data indicative of differences (ratios) between the respected actual $\gamma$-ray heating values (GT data D1 values) of the GT detectors 44 having the limited number in the core axial direction and the respected simulation values of the $\gamma$-ray heating values corresponding to the GT detectors 44 are interpolated and extrapolated in other (remained) nodes in the axial direction, respectively, wherein the GT detector 44 is not provided at the other nodes in the axial direction, thereby obtaining the correction data of the γ-ray heating value differences with respect to the whole axial nodes. Incidentally, in addition to interpolation and extrapolation in the axial direction, it is possible to interpolate and extrapolate the γ-ray heating value difference corrections (correction ratios; correction factors) with respect to radial positions at which the GT assemblies are not provided along a core radial direction.

In the case of carrying out the above power distribution learning correction, when capturing (gathering) the GT data D1 (W/g) computed by the GT signal processing unit 48 on the basis of the GT signal S1 for the power distribution simulation process module 60M2, the nuclear instrumentation control process module 60M1 of the CPU 60 makes a decision whether or not a predetermined time, e.g., one hour or more elapses after the parameter (core state data S3) indicative of the core state varies, on the basis of the core state data D3.

As a result, in the case where the predetermined time does not elapse, the nuclear instrumentation control process module 60M1 of the CPU 60 outputs a warning indicative that the predetermined time does not elapsed to the display unit 63, and thus, informs the result of the operator via the display unit 63.

On the other hand, regardless of the aforesaid state that the predetermined time elapses or the state that the predetermined time does not elapse, the power distribution simulation process module 60M2 of the process control computer 31 carries out the three-dimensional nuclear thermal-hydraulics simulation so as to simulate the in-core power distribution, and then, the process module 60M2 learns and corrects the simulated in-core power distribution with the use of the GT data D1 based on the GT signal S1.

At this time, in the case where the in-core power distribution is obtained by adapting and correcting it by the GT data D1 based on the GT signal S1 measured in a state that the predetermined time does not elapse, that is, the GT data D1 based on the GT signal S1 of non-equilibrium state, the nuclear instrumentation control process module 60M1 of the CPU 60 outputs a warning indicative of the power distribution adapting correction result based on the GT signal of non-equilibrium state to the display unit 63 so as to be displayed thereon thereby informing the warning to the operator.

The power distribution adapting process (method) by the power distribution simulation process module 60M2 of the process control computer 31 is substantially the same as the contents described in the specification and drawings in the U.S. patent application No. 09/271,350. Thus, in FIG. 13, there is shown a schematically flow chart of the core power distribution simulating process and the power distribution adapting correction process of the CPU 60.

Figure 13:
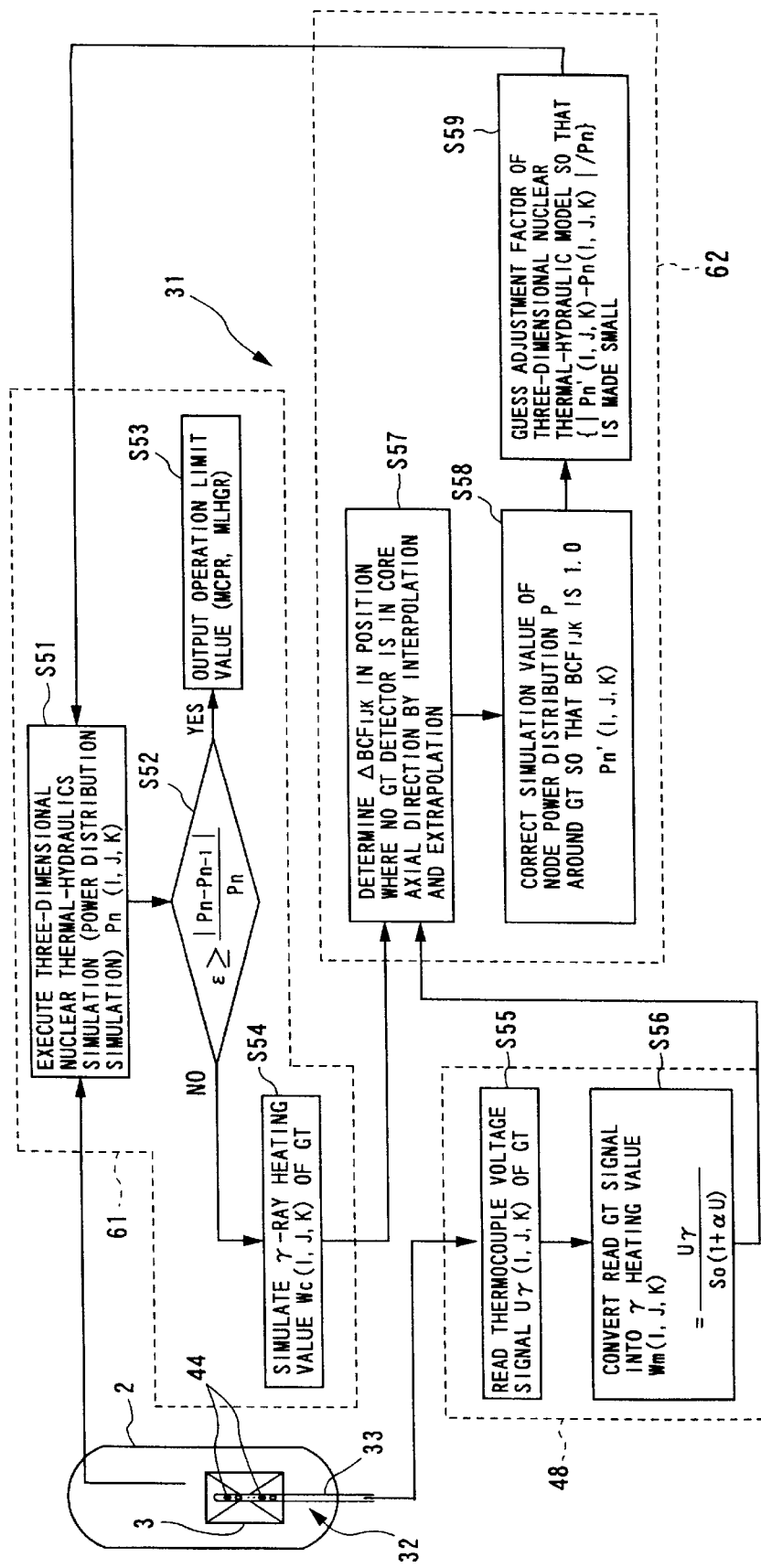
FIG. 13 is a flow chart schematically showing mainly processes of a power distribution simulation process module of the CPU of the process control computer according to the sixth embodiment of the present invention.

More specifically, as shown in FIG. 13, the power distribution simulation process module 60M2 of the CPU 60 of the process control computer 31 carries out the three-dimensional nuclear thermal-hydraulics simulation based on the core state data D3 and the three-dimensional nuclear thermal-hydraulics simulation code of the program module PM2, and thus, an in-core power distribution Pn (I, J, K) is simulated (step S51). In this case, an additional character (I, J, K) denotes a position of each node of the fuel assembly, and n denotes iteration number during a core power distribution simulation at the present iteration.

Next, the power distribution simulation process module 60M2 makes a decision whether or not a difference between a node core power distribution Pn (I, J, K) at the present iteration (n) and node core power distribution Pn−1 (I, J, K) at the previous iteration (n−1) is less than a predetermined (fixed) value (step S52). If the decision of step S52 is YES, the process module 60M2 calculate an operational thermal limit value (minimum critical power ratio: MCPR, and maximum linear heat generating ratio: MLHGR) and a margin based on the operational thermal limit value so as to output the operational thermal limit value and so on to the display unit 63 so as to be displayed thereon (step S53).

If the decision of step S52 is NO, that is, when the simulation process of the core power distribution is not sufficiently repeated, the power distribution simulation process module 60M2 determines a simulation value {Wc (I, J, K)} of γ-ray heating value on the basis of the simulated core power distribution (step S54).

Meanwhile, as described above, the GT signal processing unit 48 reads the thermocouple output voltage signal $U_γ$ (I, J, K) detected from the GT detector 44 (step S55), and then, the read thermocouple output voltage signal $U_γ$ (I, J, K) is converted into the gamma-ray heating value $W_m$ (I, J, K) (corresponding to GT data D1)(step S56).

At this time, the power distribution simulation process module 60M2 determines difference data (γ-ray heating value difference correction data) between the calculated simulation value {Wc (I, J, K)} of γ-ray heating value and the gamma-ray heating value Wm (I, J, K). Then, the difference data is interpolated and extrapolated in each node of the core axial direction, and thus, γ-ray heating value difference correction data $BCF_{IJK}$ with respect to all axial nodes are determined (step S57).

In the power distribution simulation process module 60M2, the simulated reactor power distribution on the way of final converged value Pn (I, J, K) is corrected {Pn (I, J, K)→P'n (I, J, K)} so that the γ-ray heating value difference correction data (corrective coefficient) $BCF_{IJK}$ with respect to all axial nodes are "1.0", that is, the simulation value {Wc (I, J, K)} of the γ-ray heating value in each node and the gamma-ray heating value Wm (I, J, K) are coincident with each other. A correction ratio {power distribution correction quantity (adapting correction quantity)} for each fuel assembly node at this iteration is stored in the memory unit 61 of the process control computer 31 (step S58).

Then, in the process module 60M2, an adjustment factor of the three-dimensional nuclear thermal-hydraulics code (physical model) is guessed in accordance with P'n (I, J, K) corrected by the gamma-ray heating value Wm (I, J, K) (GT data value) based on the actually measured GT signals (step S59), after the step S59, the process of the process module 60 returns to step S51. Then, the above iteration processes of the step S51 to step S59 of the process module 60M2 are repeated until the judgement of step S52 is YES.

Finally, when the judgement of step S52 is YES, the corrected results including the corrected core power distribution, the operational thermal limit value (MCPR, MLHGR) and so on are obtained (step S53).

As described above, the amendment of the adjustment factor of the repetition simulation is executed according to the three-dimensional nuclear thermal-hydraulics simulation code (physical model) so that the power distribution simulation process module 60M2 carries out the power distribution simulation after the next iteration (n+1 iteration) (see step S51), and thus, when the step S52 is converged so that the judgement of the step S52 is YES, a core power distribution having a high accuracy is obtained.

Figure 14:
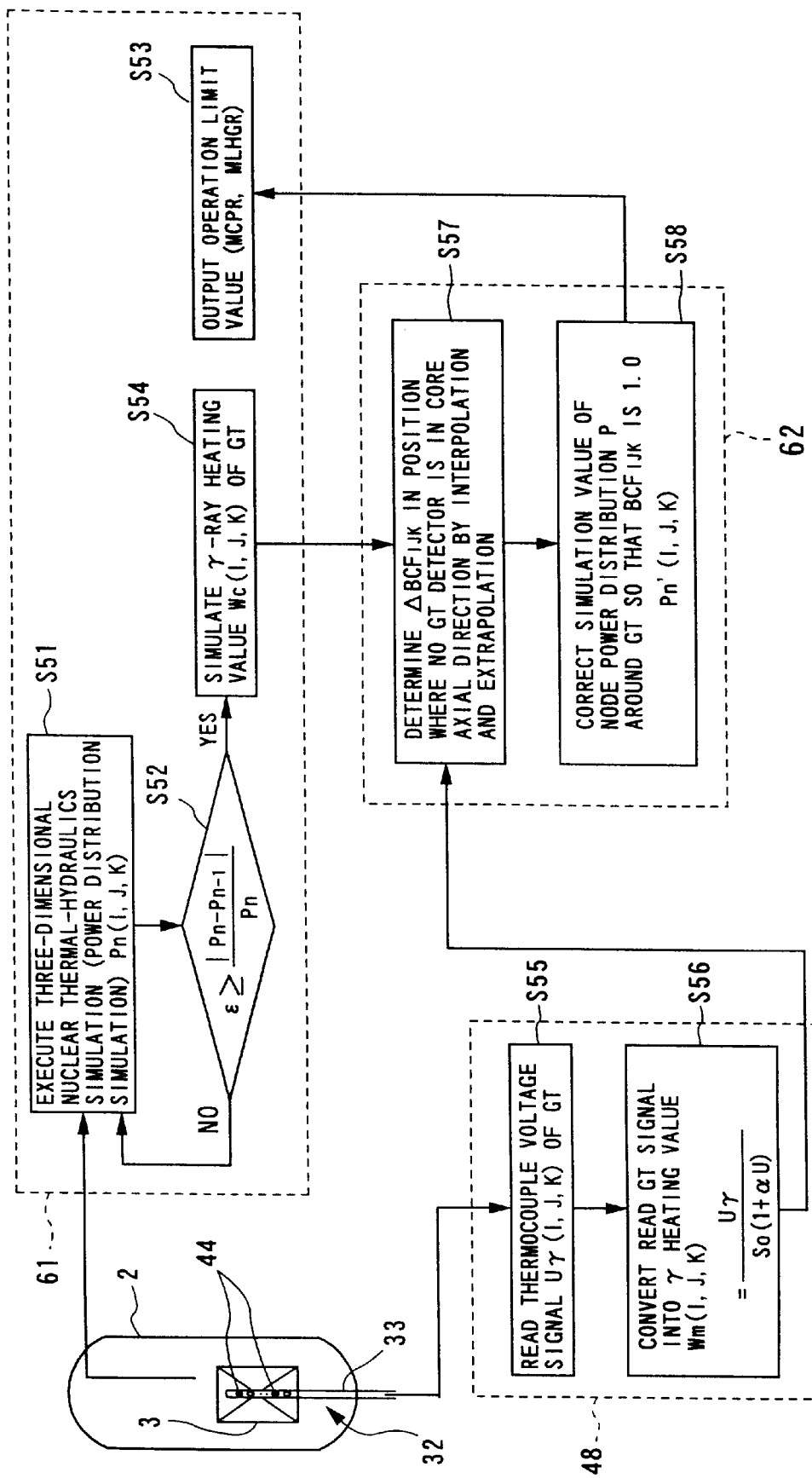
FIG. 14 is a flow chart showing a modification of FIG. 13.

Incidentally, as a another adapting correction process of the CPU 60, FIG. 14 shows a modification of the flow chart of FIG. 13.

That is, as shown in FIG. 14, the power distribution simulation process module 60M2 of the CPU 60 of the process control computer 31 carries out the three-dimensional nuclear thermal-hydraulics simulation with iteration method based on the core state data D3 and the three-dimensional nuclear thermal-hydraulics simulation code of the program module PM2 so as to simulate the in-core power distribution Pn (I, J, K) (step S51 in FIG. 14).

Next, the power distribution simulation process module 60M2 makes a decision whether or not a difference between a node core power distribution Pn (I, J, K) at the present iteration (n) and node core power distribution Pn−1 (I, J, K) at the previous iteration (n−1) is less than a predetermined (fixed) value (step S52).

When the decision of step S52 is NO, in a case where the simulation process of the core power distribution is not sufficiently repeated, the process of the process module 60 returns to step S51, and the power distribution simulation process module 60M2 carries out next (n+1) iteration three-dimensional nuclear thermal-hydraulics simulation so as to simulate (n+1) iteration in-core power distribution Pn+1(I, J, K). On the other hand, when the decision of step S52 is YES, the process module 60M2 determines a simulation value {Wc (I, J, K)} of γ-ray heating value on the basis of the simulated core power distribution (step S54).

Meanwhile, as described above, the GT signal processing unit 48 reads the thermocouple output voltage signal $U_γ$ (I, J, K) detected from the GT detector 44 (step S55), and then, the read thermocouple output voltage signal $U_γ$ (I, J, K) is converted into the gamma-ray heating value $W_m$ (I, J, K) (corresponding to GT data D1)(step S56).

At this time, the process module 60M2 determines difference data (γ-ray heating value difference correction data) between the determined simulation value {Wc (I, J, K)} of γ-ray heating value and the gamma-ray heating value Wm (I, J, K). Then, the difference data is interpolated and extrapolated in each node of the core axial direction, and thus, γ-ray heating value difference correction data $BCF_{IJK}$ with respect to all axial nodes are determined (step S57).

In the process module 60M2, the simulated reactor power distribution Pn (I, J, K) is corrected {Pn (I, J, K)→P'n (I, J, K)} so that the γ-ray heating value difference correction data (corrective coefficient) $BCF_{IJK}$ with respect to all axial nodes are "1.0", that is, the simulation value {Wc (I, J, K)} of the γ-ray heating value in each node and the gamma-ray heating value Wm (I, J, K) are coincident with each other. A correction ratio {power distribution correction quantity (adapting correction quantity)} for each fuel assembly node at this time is stored in the memory unit 61 of the process control computer 31 (step S58), the process of the CPU 60 returns to step S53.

The power distribution simulation process module 60M2 obtains the operational thermal limit value (MCPR, MLHGR) and so on according to the basis of the corrected core power distribution (step S53).

As a result of that, when the step S52 is converged so that the judgement of the step S52 is YES, a core power distribution having a high accuracy is obtained.

Incidentally, in this modification, the corrected core power distribution is contradicted to a neutron flux distribution, but the adapting correction process shown in the modification is one process in a large number of adapting correction processes.

Figure 15:
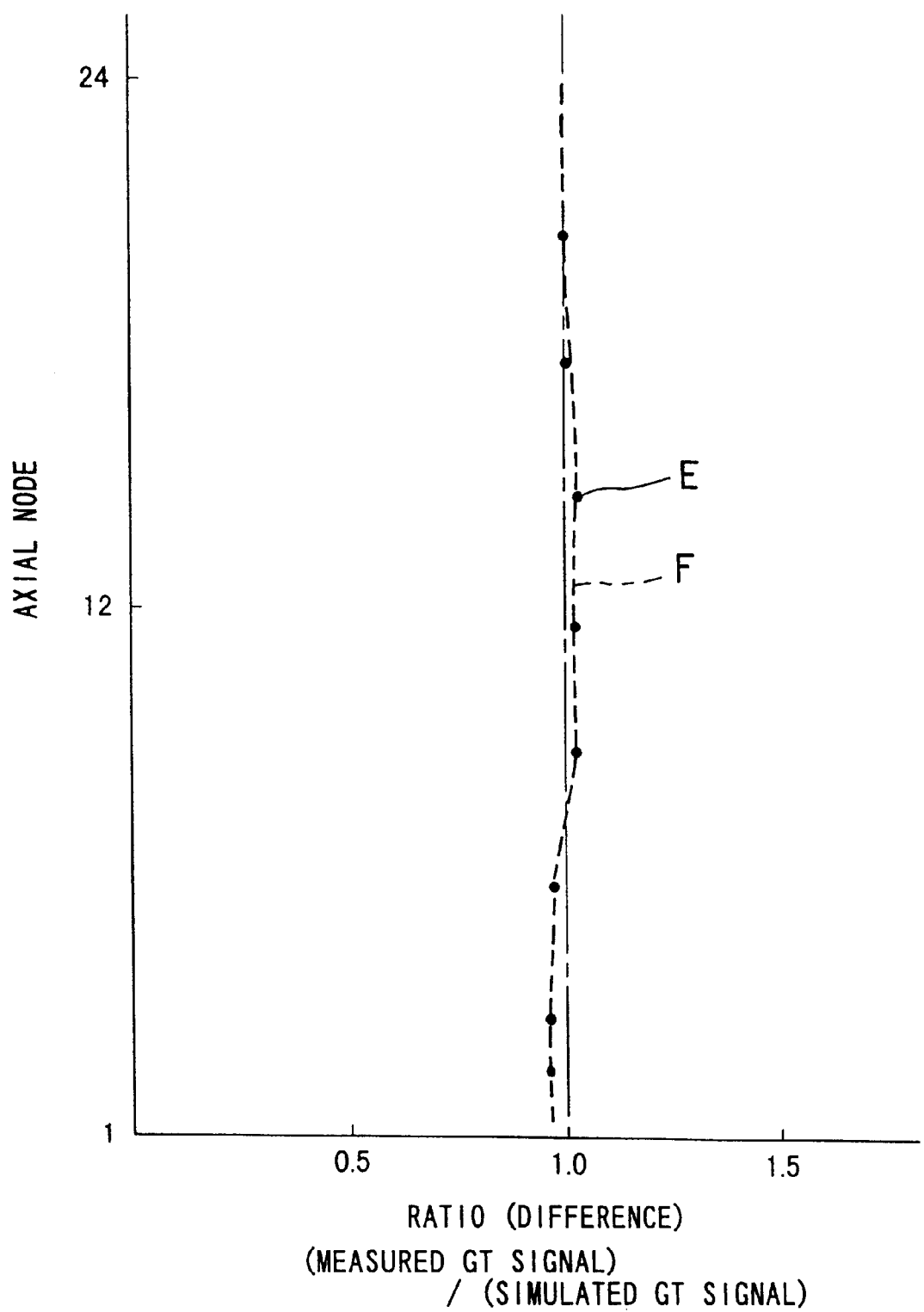
FIG. 15 is an explanatory view showing how to obtain a correction ratio of all axial nodes by an actually measured GT signal value and a simulated GT signal value by a three-dimensional nuclear thermal-hydraulics simulation code.

Still furthermore, FIG. 15 is an explanatory view of interpolating and extrapolating the ratios (symbol E in FIG. 15) of the simulated GT signal levels on the positions where the GT detectors 44 are provided to the actually measured GT signal levels in the axial 24 nodes. In this case, a linear interpolation is carried out, and both ends are extrapolated as ratios of GT detectors 44 on upper and lower ends being kept constant.

That is, in FIG. 15, a symbol F represents a result of the approximation line of the linear interpolation. Moreover, the interpolation and extrapolation may be a quadratic curve.

On the other hand, in this embodiment, the nuclear instrumentation control process module 60M1 of the CPU 60 initializes elapse time counter (step S70A), and counts the elapse time (step S70B). Next, the CPU 60 judges whether or not the core state change is detected by the core state data (step S70C).

In the case where the core state change is detected, that is, the judgement of step S70C is YES, the CPU 60 returns to a process of step S70A.

In the case where the core state change is not detected, that is, the judgement of step S70C is NO, the CPU 60 judges whether or not the LPRM detector gain adjustment instruction is requested by the input console 62 (step S70D).

In the case where the LPRM detector gain adjustment instruction is not requested, that is, the judgement of step S70D is NO, the CPU 60 returns to a process of step S70B.

On the other hand, in the case where the LPRM detector gain adjustment instruction is requested, that is, the judgement of step S70D is YES, the process module 60M1 makes a decision whether or not a predetermined time, e.g., one hour or more elapses after the parameter (the core state data S3) varies (step S71).

In the case where the predetermined time, for example, one hour, elapses, that is, the judgement of step S71 is YES, the process module 60M1 confirms that the predetermined time elapses so as to transmit an adjustment execution instruction of at least one of a sensitivity and a gain of the LPRM detector 37 including the gamma-ray heating value Wm (I, J, K) (GT data value) of each node to the LPRM signal processing unit 40 via the nuclear instrumentation control process module 60M1, periodically or in accordance with the operator's operating instruction via the input console 61 (step S72).

The LPRM signal processing unit 40 sets at least one of the sensitivity and the gain of each LPRM detector 44 to a value corresponding to the gamma-ray heating value Wm (I, J, K) (Unit: W/g) on the identical node position, or to a value proportional thereto, in accordance with the transmitted adjustment execution instruction.

On the other hand, in the case where the predetermined time does not elapse after detecting the core state change, that is, the judgement of step S71 is NO, the process module 60M1 of the CPU 60 does not carry out the LPRM detector sensitivity and gain adjustment process, that is, does not transmit the adjustment execution instruction to the LPRM signal processing unit 40 at this point of time, and waits until the next predetermined time (period) adjustment (or the next adjustment instruction is transmitted by the operator) or until the above predetermined time, (e.g., one or more hour) elapses (step S73). In the case of waiting, the process module 60M1 outputs an information representing a waiting state as a warning to the operator via the display unit 63.

As described above, according to this sixth embodiment, the operator is prevented from unnoticeably using an error caused by power distribution adapting by the GT detection signal obtained in a state (non-equilibrium state) which does not reach an equilibrium state of gamma decay chain in which the output signal level of the GT detector 44 of the GT assembly 35 accurately corresponding to the core power distribution. Thus, it is possible to improve a reliability of the reactor power distribution monitoring system 29, the in-core fixed nuclear instrumentation system 30 and the power distribution simulating system 31. Furthermore, the adjustment of at least one of the sensitivity and the gain of the LPRM detector 37 is prevented from being carried out with the use of the GT signal of the aforesaid non-equilibrium state; therefore, it is possible to further improve a reliability of the reactor power distribution monitoring system 29, the in-core fixed nuclear instrumentation system 30 and the power distribution simulating system 31.

According to this sixth embodiment, in the in-core fixed nuclear instrumentation system 30, a plurality of fixed neutron detectors (LPRM detectors) 37 for detecting a local power distribution of power range in the reactor core 3 and fixed GT detectors 44 gamma-ray thermometer assembly 35 for detecting a γ-ray heating value, are housed in the nuclear instrumentation tube 33. Further, the in-core fixed nuclear instrumentation system 30 includes: the in-core nuclear instrumentation assembly 32 in which the GT detectors 44 are arranged at least in the vicinity of the fixed LPRM detectors 37; the LPRM signal processing unit 40 for processing the LPRM signal S2 from the LPRM detector 37; the GT signal processing unit 48 for processing the output voltage signal S1 from the gamma-ray thermometer assembly 35; the GT heater control unit 53 for carrying out an electrically energizing control with respect to the heaters 71 built in the GT assembly 35; the core state data measuring device 55 for detecting core state data indicative of the core states such as a reactor power level, core coolant flow rate, control rod pattern or the like; and the nuclear instrumentation control process module 60M1 of the CPU 60 for calculating and storing the in-core elapse time or in-core irradiation burn-up of the GT assembly 35 in the memory unit 61. The nuclear instrumentation control process module 60M1 makes a decision whether or not the predetermined time elapses after detecting the core state change in accordance with the core state data while outputting the result to the display unit 63 so as to inform it of the operator as a warning.

Further, the nuclear instrumentation control process module 60M1 has an interface function of the process control computer 31, and gathers the GT data D1 (W/g signal) based on the GT signal S1 outputted from the GT assembly 35. Then, the power distribution simulation process module 60M2 simulates a reactor power distribution with the use of the gathered GT data D1, and corrects the power distribution result based on the physical model so as to obtain a core power distribution reflecting the actually measured data and having a high reliability.

Furthermore, the nuclear instrumentation control process module 60M1 transmits the adjustment instruction of at least one of the sensitivity and the gain of the LPRM detector 37 to the LPRM signal processing unit 40 so as to execute the adjustment of at least one of the sensitivity and the gain of the LPRM detector 37 with the use of the GT data D1 (γ-ray heating value; W/g signal) based on the GT signal S1 from the GT detector 44 of the same core axial position as the LPRM detector 37 in the identical in-core nuclear instrumentation tube 33.

[Seventh embodiment]

The following is a description on a seventh embodiment of an in-core fixed nuclear instrumentation system, a power distribution simulating system and a power distribution monitoring system of the present invention.

This seventh embodiment shows a modification of the reactor power distribution monitoring system 29, the in-core fixed nuclear instrumentation system 30 and the power distribution simulating system 31, which have been described in the sixth embodiment. In the sixth embodiment, the adjustment of at least one of the sensitivity and the gain of the LPRM detector 37 has been carried out so as to coincide with the GT data (W/g detection signal) of the GT detector 44 located on the same position as the LPRM detector 37.

On the contrary, in this seventh embodiment, the memory unit 61 of the process control computer 31 stores a predetermined correlation equation data showing a relationship between a reading value (simulation value) of the LPRM detector 37 and nodal power of the fuel nodes around the LPRM detector, wherein the correlation equation data has a correlation parameter including a fuel type (enrichment distribution in a horizontal cross section, Gd distribution design type), control rod inserted state, node burn-up, historical node void fraction, instantaneous node void fraction, etc.}.

Figure 17:
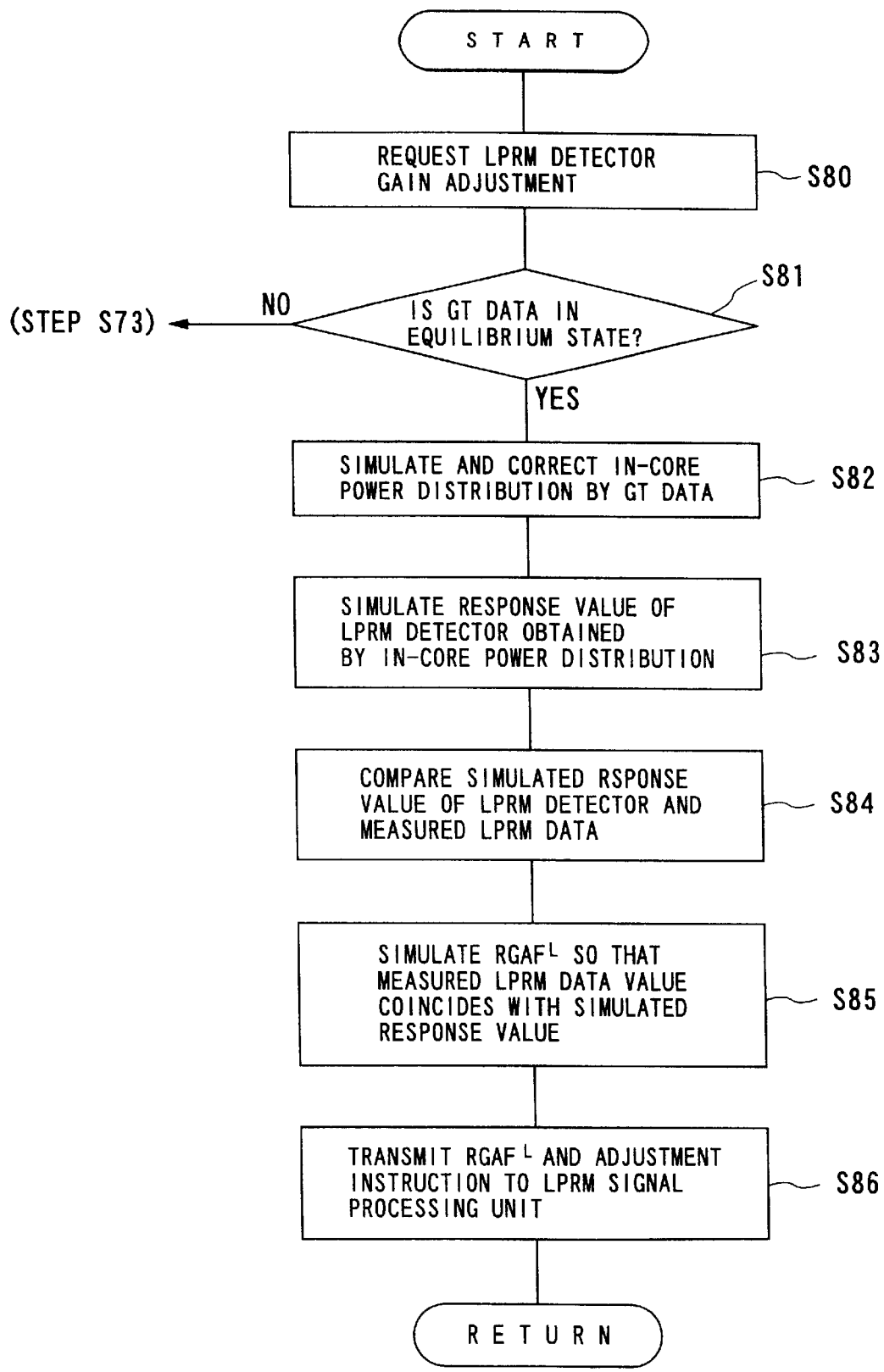
FIG. 17 is a flow chart schematically showing mainly processes of a power distribution simulation process module of the CPU of the process control computer according to a seventh embodiment of the present invention.

Then, in the process control computer 31, the CPU 60 (the power distribution simulation process module 60M2), as shown in FIG. 17, receives the request for executing the LPRM data gain adjustment transmitted from the input console S80. Then, in the case where it is determined that the GT signal is in an equilibrium state on the basis of the core state data (the judgement of step S81 is YES), the CPU 60 simulates and corrects the three-dimensional power distribution in the core 3 by using the GT data D1 (W/g signal) based on the GT signal S1 detected by each GT detector 44 of the GT assembly 35 (step S82).

In accordance with the simulated result of the power distribution and the correlation equation data, the CPU 30 of the process computer 31 simulates a response value of the LPRM detector 37 on the basis of fuel nodal power around the LPRM detector 37 obtained by the simulated result of the power distribution (step S83).

The process module 60M1 of the CPU 60 compares the simulated response value of the LPRM detector 37 and the actually measured LPRM data D2 value (step S84) so as to simulate a gain adjustment factor (RGAF$^L$; where L represents an address of the LPRM detector 37) related to at least one of the sensitivity and the gain of the LPRM detector 37 so that the actual detection value (actually measured LPRM data D2 value) of the LPRM detector 44 coincides with the transmitted simulated response value thereof (step S84). Next, the process module 60M1 transmits the gain adjustment factor RGAF$^L$ and an adjustment instruction of at least one of the sensitivity and the gain of the LPRM detector 37 to the LPRM signal processing unit 40, respectively.

The LPRM signal processing unit 40 adjusts the actually measured LPRM data D2 so as to multiply the actually measured LPRM data D2 by the gain power factor RGAF$^L$ or by an integration gain adjustment factor GAF$^L_n$.

The integration gain adjustment factor GAF$^L_n$ by which the actually measured LPRM signal S2 is multiplied is obtained described above.

$$GAF^L_n = GAF^L_{(n-1)} \cdot RGAF^L \tag{5}$$

where, the GAF$^L_{(n-1)}$ represents (n−1) time integration gain adjustment factor and the GAF$^L_n$ represents n time integration gain adjustment factor. As described above, by multiplying the last time GAF$^L_{(n-1)}$ by the RGAF$^L$, it is possible to determine the gain adjustment factor (the GAF$^L_n$) by which the LPRM signal S2 is multiplied so as to obtain the LPRM data D2. Incidentally, the integration gain adjustment factor the GAF$^L_n$ by which the LPRM signal S2 is multiplied is referred to "first gain adjustment factor" and the above gain adjustment factor RGAF$^L$ is referred to "second gain adjustment factor".

The first gain adjustment factor is stored in the memory unit of the LPRM signal processing unit 40, and further, may be transmitted to the process control computer 31. The details of the correlation parameter used in the response simulation of the LPRM detector 37 are omitted because the correlation parameter is an already-known technique.

Figure 16:
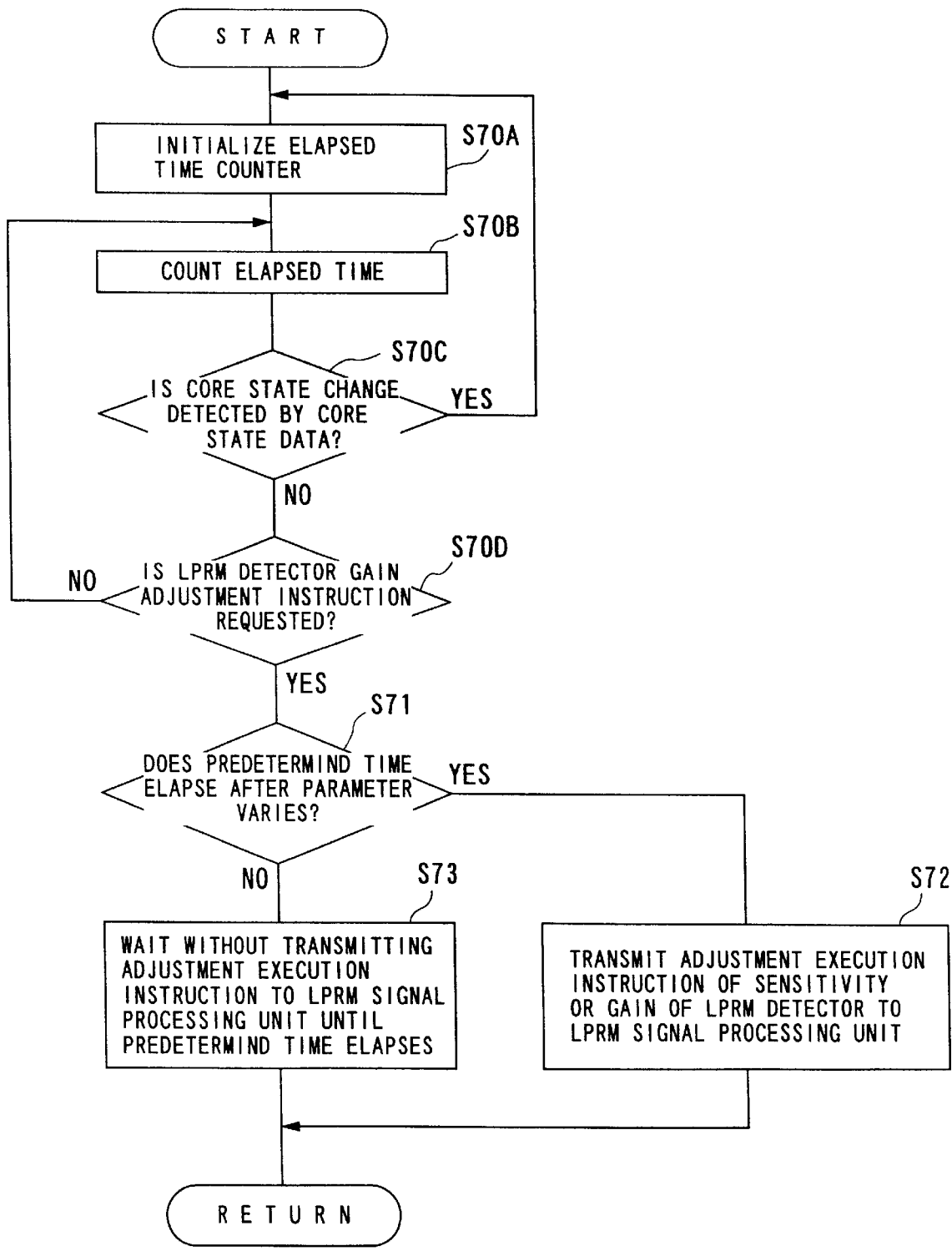
FIG. 16 is a flow chart schematically showing mainly processes of the nuclear instrumentation control process module of the CPU of the process control computer according to the sixth embodiment.

In this sixth and seventh embodiments, in the case where it is determined that the GT detection signal S2 (GT data D2) does not reach an equilibrium signal level; namely, in the case where the nuclear instrumentation control process module 60M1 confirms that the predetermined time (e.g., one hour or more) does not elapse after the core state parameter (core state data D3) varies (the judgement of step S81 is NO), the process module 60M1 of the CPU 60 outputs a non-equilibrium warning of the GT detection signal to the display unit 63 so as to be displayed thereon and executes the process described in step S73 in FIG. 16, and, in the case where the judgement of step S81 is YES, the process module 60M2 carries out a power distribution adaptive simulation is carried out by the process module 60M2 on the basis of the detected GT signals.

At this time, the process module 60M2 of the CPU 60 carries out the adaptive simulation on the basis of the GT data D1 of non-equilibrium state so as to correct the simulated core power distribution. In addition, the process module 60M2 of the CPU 60 may execute the adaptive simulation with the use of LPRM signals which will be described later in ninth and tenth embodiments, so as to correct the core power distribution. Further, it is possible to carry out the adaptive simulation with the use of GT signals predicted by a GT signal prediction function which will be described later in an eleventh embodiment so as to correct the core power distribution. The process module 60M2 of the CPU 60 may select either of the above correcting simulation processes.

In the adjustment of at least one of the sensitivity and the gain of the LPRM signal, in the case where the adjustment is periodically and high frequently carried out (e.g., one time per hour in a state that the core state does not vary more than one hour), the data D1 to D3 captured via the nuclear instrumentation control process module 60M1 of the CPU 60 of the process control computer 31 is transmitted to the power distribution simulation module 60M2 by interface process of the process module 60M1.

At this time, the power distribution simulation process module 60M2 simulates the second gain adjustment factor $RGAF^L$ by which the LPRM data D2 transmitted from the LPRM signal processing unit 40 is multiplied, so as to store the second gain adjustment factor $RGAF^L$ in the memory unit 61 without transmitting the second gain adjustment factor $RGAF^L$ to the LPRM signal processing unit 40. Therefore, in the LPRM signal processing unit 40, no sensitivity or gain adjustment process is carried out with the use of the newly first gain adjustment factor; on the other hand, in the power distribution simulation process module 60M2, the adjustment of at least one of the sensitivity and the gain of the LPRM detector 37 is carried out on the basis of the second gain adjustment factor $RGAF^L$.

Then, after the core power distribution greatly varies, and for example, one hour or more elapses, and thereafter, in the case where the response simulated value of the LPRM signal by the three-dimensional nuclear thermal-hydraulics simulation is shifted from the actually measured value of the LPRM data D2 processed by the LPRM signal processing unit 40 more than a predetermined ratio (e.g., 20%), or only in the case where a predetermined time, e.g., 1000 hours or more elapses, the second gain adjustment factor $RGAF^L$ is transmitted from the CPU 60 of the process control computer 31 to the LPRM signal processing unit 40 so that newly first gain adjustment factor $GAF^L_n$ is obtained by multiplying the last first gain adjustment factor $GAF^L_{n-1}$ by the transmitted second gain adjustment factor $RGAF^L$. Therefore, the adjustment of at least one of the sensitivity and the gain of the LPRM data D2 is carried out by the LPRM signal processing unit 40 with the use of the newly first gain adjustment factor $GAF^L_n$. Then, the following method is considered; more specifically, at the point of time when the adjustment of at least one of the sensitivity and the gain is carried out with the use of the first gain adjustment factor $GAF^L_n$, the second gain adjustment factor $RGAF^L$ is zero-cleared to 1.0 (means that the read LPRM data D2 is used as it is).

By doing so, it is possible to reduce the adjustment frequency of at least one of the sensitivity and the gain of the LPRM data D2 in the LPRM signal processing unit 40, to reduce a bypass time of the LPRM assembly 34 which is a part of the safety protection system with respect to the reactor, and to execute an adjustment of the safety protection system under surveillance and control by the operator.

According to this seventh embodiment, in the in-core fixed nuclear instrumentation system 30, a plurality of fixed neutron detectors (LPRM detectors) 37 for detecting a local power distribution of power range in a reactor core and fixed GT detectors 44 gamma-ray thermometer assembly 35 for detecting a γ-ray heating value, are housed in the nuclear instrumentation tube 33. Further, the in-core fixed nuclear instrumentation system 30 includes: the in-core nuclear instrumentation assembly 32 in which the GT detectors 44 are arranged at least in the vicinity of the fixed LPRM detectors 37; the LPRM signal processing unit 40 for processing the LPRM signal S2 from the LPRM detector 37; the GT signal processing unit 48 for processing the output voltage signal S1 from the gamma-ray thermometer assembly 35; the GT heater control unit 53 for carrying out an electrically energizing control with respect to the heaters 71 built in the GT assembly 35; the core state data measuring device 55 for detecting core state data indicative of the core states such as a reactor in-core power level, core coolant flow rate, control rod pattern or the like; and the nuclear instrumentation control process module 60M1 for simulating and storing the in-core elapse time or in-core irradiation burn-up of the GT assembly 35. The nuclear instrumentation control process module 60M1 receives the core states such as a reactor in-core power level, core coolant flow rate, control rod pattern, etc., which are outputted from the core state data measuring device 55 and are processed by the core state data processing unit 58, and then, makes a decision whether or not the predetermined time elapses after detecting the core state change in accordance with the core state data while outputting the result to the display unit 63 so as to inform it of the operator as a warning.

Further, the nuclear instrumentation control process module 60M1 outputs the result to the display unit 63 so as to inform it of the operator. Moreover, the power distribution simulation process module 60M2 learns and simulates a core power distribution by the GT data (gamma heating value) computed based on the GT signal detected by the fixed GT detector 44 and the three-dimensional nuclear thermal-hydraulics simulation model, and simulates a reading value (simulated value) of each LPRM detector 37 from the core power distribution. Further, the power distribution simulation process module 60M2 compares the reading value with the actually reading value at present (actual detected value), and thus, carries out an adjustment of at least one of the sensitivity and the gain of each LPRM detector 37.

In the case where the conventional nuclear instrumentation system uses the TIP, when using the LPRM detector signal D2 as auxiliary means of the power distribution monitoring system, there is a difference between a correlation of fuel nodal power around the GT detection portion of the GT signal D1 and a correlation of fuel nodal power around the LPRM detection portion of the LPRM signal D2. In particular, it is found that the LPRM detection signal D2 strongly depends upon an output of a corner fuel rod on the nuclear instrumentation tube 33 side of the fuel assembly 4, as compared with the GT signal D1. Therefore, by operating the fuel rod 5, in the case where a power distribution on a cross section of the fuel assembly 4 adjacent to the nuclear instrumentation tube 33 is greatly different between the control rod side and the nuclear instrumentation tube side, the GT signal change and the LPRM signal change have no proportional relationship.

However, in the sixth and seventh embodiments, a behavior of the LPRM detection signal is proportional to a thermal neutron flux in the actual LPRM detection portion; therefore, very fast response is noticeable. For this reason, in the power distribution after operating the control rod 5, even if the GT signal becomes an equilibrium state, the LPRM signal always coincides with a thermal neutron level at a position of the nuclear instrumentation tube. Thus, a power distribution learning simulation is carried out on the basis of the LPRM signals, and thereby, there is a merit such that no delay of response is caused with respect to a change of local power. This embodiment will be described hereinafter in ninth and tenth embodiments detailedly.

[Eighth embodiment]

The following is a description on an eighth embodiment of an in-core fixed nuclear instrumentation system, a power distribution simulating system and a power distribution monitoring system of the present invention.

This eighth embodiment shows a modification of the reactor power distribution monitoring system 29, the in-core fixed nuclear instrumentation system 30 and the power distribution simulating system 31, which have been described in the sixth and seventh embodiments. In the eighth embodiment, a method for adjusting at least one of the sensitivity and the gain of the LPRM detector 37 is different from the above sixth and seventh embodiments, and other construction is the substantially same as those; therefore, the details are omitted.

The LPRM signal processing unit 40 has a function of adjusting (calibrating) at least one of the sensitivity and the gain of each LPRM detector 37. The adjusting method based on the adjusting function of the LPRM detector 37 includes tow kinds, that is, a first adjusting method and a second adjusting method.

In the case of adjusting at least one of the sensitivity and the gain of each LPRM detector 37, the first adjusting method by the LPRM signal processing unit 40 comprises the following steps of: dividing the large number of LPRM detectors 37 into a plurality of APRM channels or LPRM groups (there is an LPRM detector which is not captured in the APRM channels depending upon a design); automatically selecting a predetermined LPRM detector 37 from each APRM channel or each LPRM group by an instruction signal from the nuclear instrumentation control process module 60M1 according to the maximum bypass number condition of the LPRM detector allowable in the operation each LPRM detector 37 belonging to each APRM channel or each LPRM group so as to change into a bypass state (bypass mode); adjusting at least one of the sensitivity and the gain of the selected LPRM detector 37 of the bypass mode; and returning the LPRM detector 37 of the bypass mode after being adjusted to a normal mode.

Therefore, the adjustment of at least one of the sensitivity and the gain of each LPRM detector 37 is almost simultaneously carried out in the LPRM signal processing unit 40 in accordance with the instruction from the nuclear instrumentation control process module 60M1 by the number of "{number of APRM channels (or number of LPRM groups)×(number of maximum allowable LPRM detector bypasses)}", and is carried out without the bypass of each APRM channel or each LPRM group itself. The LPRM adjustment is carried out with respect to all LPRM detectors 37, and thereafter, the gain adjustment of each APRM channel need to be carried out by way of precaution. In order to make a confirmation, the CPU 60 of the process control computer 31 automatically carries out a simulation for making a comparison between the APRM signal instruction with a thermal output computed from a heat balance of an atomic power plant. In the case where a difference by the comparative computation is more than a preset value, the CPU 60 of the process control computer 31 outputs a warning to the display unit 63 so as to inform it of the operator.

As a result, there is no bypass of the APRM channels or the LPRM groups in which the LPRM gain or sensitivity adjustment is executed, and the adjustment of at least one of the sensitivity and the gain of each LPRM detector is carried out for a short time.

In the case of adjusting at least one of the sensitivity and the gain of each LPRM detector 37, the second adjusting method by the LPRM signal processing unit 40 comprises the following steps of: selecting and bypassing one APRM channel (one LPRM group) from each APRM channel or each LPRM group (there is an LPRM detector which is not captured in the APRM channel depending upon a design) according to the instruction from the nuclear instrumentation control process module 60M1; changing all LPRM detectors 37 belonging to the one bypassed APRM channel (LPRM group) into a bypass state (bypass mode); and adjusting at least one of the sensitivity and the gain of each LPRM detector 37 of the bypass mode.

Therefore, at least one of the sensitivity and the gain of the LPRM detector 37 is almost simultaneously adjusted by the LPRM signal processing unit 40 according to the instruction from the nuclear instrumentation control process module 60M1 by the number of LPRM detectors included in one or the bypass allowable maximum number of APRM channels or LPRM groups. When the adjustment of at least one of the sensitivity and the gain of the LPRM detector 37 is completed, the LPRM detector 37 and the APRM channel (LPRM group) of the bypass mode is returned to a normal mode.

When the LPRM detector 37 and the APRM channel (LPRM group of the bypass mode is returned to the normal mode, almost simultaneously, the adjustment of at least one of the sensitivity and the gain of each APRM channel need to be carried out by way of precaution. In order to make a confirmation, the process control computer 31 automatically carries out a simulation for making a comparison between the APRM signal instruction with and a thermal output computed from a heat balance of an atomic power plant. In the case where a difference by the comparative computation is more than a preset value, the process control computer 31 outputs a warning to the display system 63 so as to inform it of the operator. Then, when the adjustment of at least one of the sensitivity and the gain of all LPRM detectors constituting one APRM channel or one LPRM group is completed, the LPRM signal processing unit 40 starts an adjustment of another APRM channel (or another LPRM group) according to the instruction from the nuclear instrumentation control process module 60M1.

As a result, during the adjustment of at least one of the sensitivity and the gain of the LPRM detector, one or the maximum number of bypass allowable APRM channels (or LPRM groups) is simultaneously bypassed. However, even if a fault is caused in the nuclear instrumentation control process module 60M1, the bypass mode of the APRM of the safety protection system and the bypass mode of the LPRM detectors 37 are only specified bypass allowable APRM channels (or specified LPRM groups). Thus, a reliability of the safety protection system is superior to the first adjusting method.

The LPRM detectors 37 belonging to one APRM have different core ordinates, and disperse in the core axial direction. Four LPRM detectors which exist in the specified nuclear instrumentation tube 33 belong to substantially different APRM channels, respectively. Therefore, the LPRM detector 37 belonging to one APRM channel is automatically selected and adjusted from a plurality of LPRM detectors and not manually selected by the operator, whereby there is an advantage such that a mistake in the manual selection can be prevented.

By using the gamma-ray thermometer, at least one of the sensitivity and the gain of the LPRM detector is high frequently carried out, and in the case of carrying out the adjustment, the aforesaid atomization and consideration to a safety are required.

[Ninth embodiment]

The following is a description on a ninth embodiment of an in-core fixed nuclear instrumentation system, a power distribution simulating system and a power distribution monitoring system of the present invention.

This ninth embodiment has the basically same structure as the reactor power distribution monitoring system 29, the in-core fixed nuclear instrumentation system 30 and the power distribution simulating system 31, which have been described in the first embodiment (see FIG. 1 to FIG. 11); therefore, the details are omitted.

In the reactor power distribution monitoring system 29, the in-core fixed nuclear instrumentation system 30 and the reactor power distribution simulating system 31 of this ninth embodiment, the core state data S3 representing the parameter of the core state (operating mode) such as a core power level, core coolant flow rate and control rod pattern, detected by the reactor core state data measuring device 55, is inputted as the digital core state data D3 to the nuclear instrumentation control process module 60M1 of the CPU 60 of the process control computer 31 via the core state data processing unit 58.

The nuclear instrumentation control process module 60M1 detects a change of the core state in accordance with the inputted core state data D3 so as to make a decision whether or not a predetermined time elapses, thereby displaying the result on the display unit 63 so as to inform the result of the operator.

Then, on the basis of the result displayed on the display unit 63, in the case where the operator makes a decision that the operating mode does not satisfy a required condition, the operator outputs an simulation instruction to the power distribution simulation process module 60M2 of the CPU 60 via the nuclear instrumentation control process module 60M1 thereof by operating the input console 62.

At this time, the power distribution simulation process module 60M2 of the CPU 60 adapts and corrects a three-dimensional power distribution on the basis of the latest nuclear instrumentation information (core state data; core state, operating mode) obtained from the core 3.

The above embodiments described so far have described the case where the core state is a steady state, and when the steady state continues for a sufficiently long period, the core power distribution simulating processing is carried out by adaptive simulation using the three-dimensional simulation model and the GT data of the GT assembly. In this ninth embodiment, the following is a description on a process in place of the processing means of simulating the core power distribution just after the parameter representing the operating state such as power distribution or power level or the like changes.

Just after the parameter representing the operating state such as power distribution or power level or the like changes, it is determined that the GT signal of the GT assembly 35 does not reach an equilibrium state. In such a case, by using the LPRM detector assembly 34 having a fast response in the GT assembly 35 and the LPRM detector assembly 34 constituting the in-core nuclear instrumentation assembly 32, there is employed a first adaptive correction process of correcting a power distribution obtained by the simulation based on the three-dimensional simulation model.

More specifically, according to the first adaptive correction process, the memory unit 61 of the process control computer 31 stores interpolation and extrapolation approximation data (data set) on the basis of correlation parameters for showing a correlation between a fuel assembly nodal power value and an LPRM data reading value (simulated value corresponding to the actually measured LPRM data D2) {e.g., a fuel type, a node burn-up, presence of control rod, a historical relative water density (historical void fraction), an instantaneous relative water density (instantaneous void fraction)}, or an interpolation and extrapolation look up table data (data set) based on the above correlation parameter.

According to the first adaptive correction process, for example, in the case where it is determined by the GT signal processing unit 48 or the nuclear instrumentation control process module 60M1 of the process control computer 31 that the GT signal of the GT assembly 35 does not reach an equilibrium state, when carrying out the adaptive correction, the power distribution simulation process module 60M2 simulates a core power distribution at the present point of time on the basis of the following data.

More specifically, the data includes: core power distribution data stored in the memory obtained, in a state (equilibrium state) that the latest steady state retroactive from the point of time of adaptive correction execution (present point of time) requests, by the adaptive correction based on the GT signal S1 outputted from the GT assembly 35 at that time; adaptive correction data calculated and stored value for each fuel assembly node; and change data of the operating parameter (core state data D3) representing the core state (operating mode) such as an increase of core average burn-up until the present point of time (the point of time of adaptive correction executive processing) from the power distribution simulation in the above equilibrium state, control rod pattern from the latest point of time, core coolant flow rate, core power, core inlet enthalpy, core pressure or the like.

Then, the power distribution simulation process module 60M2 determines LPRM prediction values corresponding to the simulated power distribution at the present point according to the values of the correlation parameters {e.g., a fuel type, a node burn-up, presence of control rod, a historical relative water density (historical void fraction), an instantaneous relative water density (instantaneous void fraction)} and the approximation equation (look up table) stored in the memory unit 61.

On the other hand, the LPRM data D2 adjusted by the LPRM signal processing unit 48 according to the process described in the above seventh embodiment, is gathered in the power distribution simulation process module 60M2 of the CPU 60.

Figure 18:
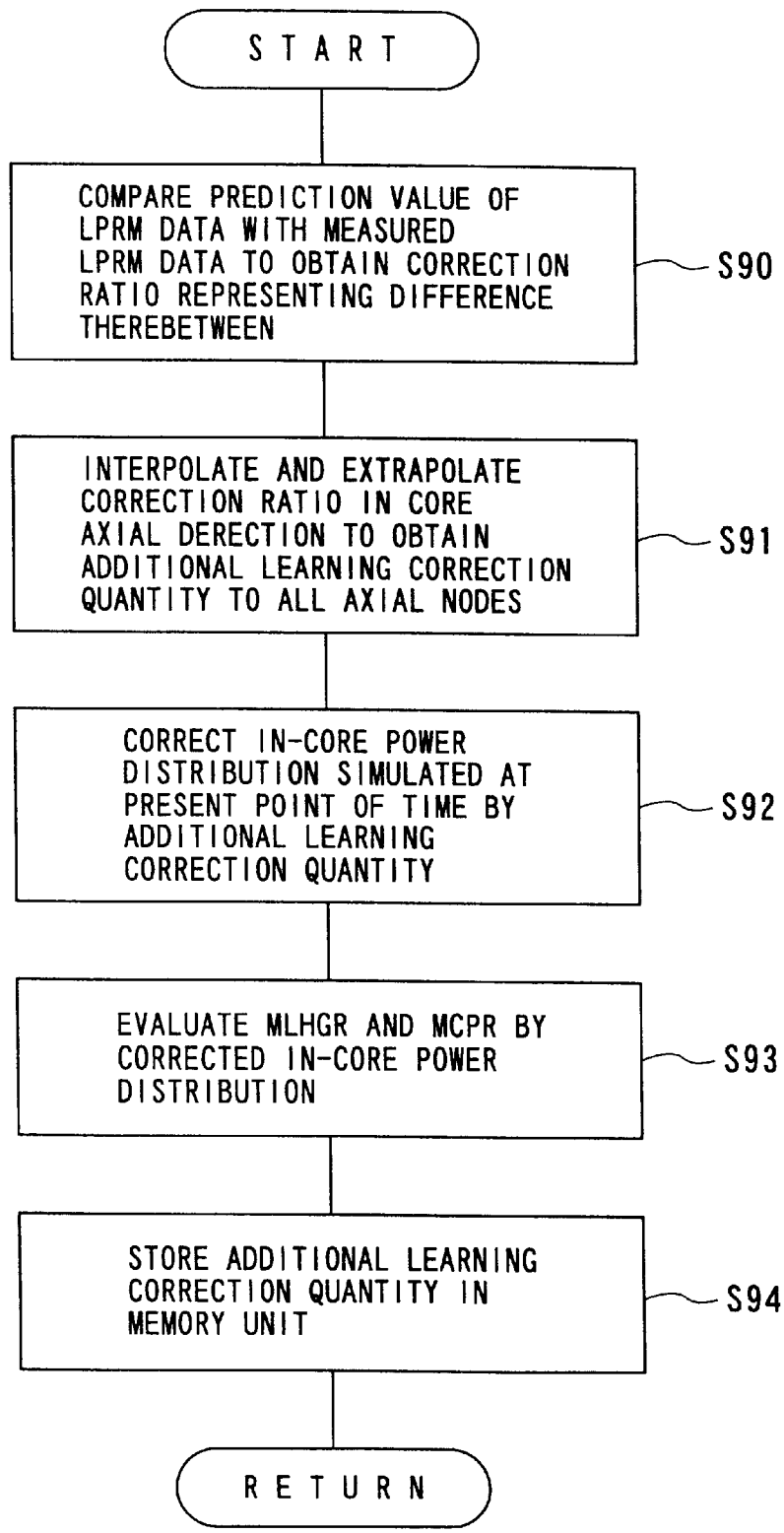
FIG. 18 is a flow chart schematically showing mainly processes of a power distribution simulation process module of the CPU of the process control computer according to a ninth embodiment of the present invention.

Then, the power distribution simulation process module 60M2, as shown in FIG. 18, makes a comparison between the prediction value of the LPRM data based on the simulation result at the present point of time and the actually measured LPRM data D2 so as to obtain a correction ratio representing the difference between the LPRM data prediction value and the actually measured LPRM data D2 (step S90), thereby interpolating and extrapolating the correction ratio in the core axial direction, so that it is possible to obtain a correction ratio (additional adaptive correction quantity; relative adaptive correction quantity) with respect to all axial nodes (step S91).

Next, the power distribution simulation module 60M2 corrects the in-core power distribution for each axial node which is simulated at the present point of time on the basis of the determined additional adaptive correction quantity of all axial node (step S92). Subsequently, the power distribution simulation module 60M2 evaluates the maximum linear heat generating ratio (MLHGR) and the minimum critical power ratio (MCPR) at the present point of time (at the point of adaptive correction execution process time) on the basis of the corrected in-core power distribution of each axial node (step S93).

Next, the power distribution simulation process module 60M2 stores the additional adaptive correction quantity of all axial nodes based on the aforesaid LPRM data D2 in the memory unit 61, independently from the adaptive correction quantity of all axial nodes based on the GT data D1 stored therein (step S94).

In the above manner, in the case of carrying out power distribution adaptive correction in the GT signal non-equilibrium state, the in-core power distribution simulated at the point of power distribution adaptive correction process time is corrected on the basis of the adaptive correction in the GT data D1 equilibrium state and the additional adaptive correction quantity based on the LPRM data, whereby it is possible to generate a core power distribution having a high accuracy.

Then, in the case where it is determined by the GT signal processing unit 48 or the nuclear instrumentation control process module 60M1 of the process control computer 31 that the GT data D1 of the GT assembly 35 reaches the equilibrium state, the power distribution simulation process module 60M2 zero-clears the additional adaptive correction quantity based on the LPRM data D2 stored in the memory unit 61 {means that the additionally relative adaptive correction ratio (correction coefficient) based on the LPRM data D2 is returned to 1.0}. As shown in FIG. 13 and FIG. 14, again an adaptive correction quantity based on only the GT data D1 in an equilibrium state is obtained and stored in the memory unit 61, and then, a power distribution adaptive correction process is carried out on the basis of the obtained adaptive correction quantity.

Thereby, even in the case where the GT data from the GT assembly 35 varies in a non-equilibrium state, the power distribution simulation process module 60M2 can execute a power distribution adaptive correction simulation based on in-core nuclear instrumentation. Therefore, it is possible to carry out, while the GT data lies in a non-equilibrium state, the in-core power distribution adaptive correction without waiting until the GT data D1 reaches the equilibrium state, thereby periodically or always executing the in-core power distribution adaptive correction process.

According to this ninth embodiment, in the point of power distribution adaptive correction time of non-equilibrium, the power distribution adaptive correction simulation has been carried out with the use of the interpolated and extrapolated additional adaptive correction obtained according to the LPRM data D2 detected by four LPRM detectors 37 arranged along the core axial direction. When the GT data reaches the equilibrium state, the additionally relative adaptive correction quantity having the possibility including an error in interpolation and extrapolation is zero-cleared at a timing of power distribution adaptive correction process based on the GT data, and thereafter, the power distribution adaptive correction process is carried out on the basis of the GT data D1 of the equilibrium state detected by the large number of GT detectors 35 arranged along the axial direction. Therefore, it is possible to solve the problem that an error of the LPRM assembly 34 gives an influence to the in-core power distribution simulation for a long period. Thus, since the simulation depends upon only error of the GT assembly 35, it is possible to considerably improve an accuracy of evaluation of the maximum linear heat generating ratio (MLHGR) and the minimum critical power ratio (MCPR).

[Tenth embodiment]

The following is a description on a tenth embodiment of an in-core fixed nuclear instrumentation system, a power distribution simulating system and a power distribution monitoring system of the present invention.

In the in-core fixed nuclear instrumentation system 29, the in-core nuclear instrumentation system 30 and the power distribution simulating system 31 of this tenth embodiment, similarly to the structure described in the ninth embodiment, it is determined that the GT data of the GT assembly 35 does not reach an equilibrium state. In such a case, of the GT assembly 35 constituting the in-core nuclear instrumentation assembly 32 and the LPRM detector assembly 34, with the use of the LPRM detector assembly 34 having a fast response, there is employed a second adaptive correction process of adapting and correcting a power distribution obtained by the simulation based on the three-dimensional simulation model.

The second adaptive correction process is based on the process of directly adjusting the LPRM signal S2 detected by the LPRM detector 37 with the use of the GT data D1 (W/g) converted into a gamma-ray heating value based on the GT signal S1 of the GT assembly 35.

According to the second adaptive correction process, at a given point of time after the directly adjustment process of at least one of the sensitivity and the gain of the LPRM signal S2 is completed with the use of the GT data by the LPRM signal processing unit 40 of the LPRM signal S2 of the LPRM detector 37, the power distribution simulation process module 60M2 simulates a core power distribution at the present given point of time on the basis of the following data. That is, the data includes: core power distribution data stored in the memory unit 61 obtained by the adaptive correction process based on the GT data D1 outputted from the GT assembly 35 in the latest equilibrium state before the present given point of time; adaptive correction data from a simulation prediction power value for each fuel assembly node by the GT data D1; and change data of the operating parameter (core state data D3) representing the core state (operating mode) until the present point of time from the power distribution simulation in the above equilibrium state.

In this case, the simulation process of the power distribution simulation process module 60M2 described in the ninth embodiment is different from this tenth embodiment in that, when the GT signal lies in the transient state, the LPRM signal is considered as varying the same proportional quantity as the GT signal.

That is, when the LPRM signal is adjusted at a relatively high frequency, for example, one time per day or per hour so as to coincide with the W/g signal level of the GT data D1, even in the case where the power change is caused in the local in the core 3 or the whole thereof, the change of each fuel assembly node by burn-up is very small. As a result, it is possible to make very small a power peaking change by the burn-up of the fuel rod 5 on the corner portion of the nuclear instrumentation tube side strongly given the influence to the detection signal level of the LPRM detector 37; therefore, the change can be disregarded.

Accordingly, an average power change of the fuel assembly node is reflected in the GT signal level detected by the GT detector 44 and the LPRM signal level detected by the LPRM detector 37 at the same change rate.

However, the control rod 5 is inserted or drawn out; for this reason, a change is generated in the control rod state or the fuel void fraction in the fuel channel. In this case, a great change is generated between a response change of the GT signal and a response change of the LPRM signal.

As described in the first embodiment, in the memory unit 61, at least one of approximate expression data (data set) according to correlation parameters representing the correlation between the output values of the nodes of the fuel assembly 4 and the GT data values D1 based on the GT signals S1 and interpolation and extrapolation lookup table data (data set) according to the above correlation parameters is stored, wherein the correlation parameters includes, for example, a fuel type, a node burn-up, presence of control rod, a historical relative water density (historical void fraction), an instantaneous relative water density (instantaneous void fraction).

In view of the aforesaid backgrounds, in this tenth embodiment, the memory unit 61 of the process control computer 31 stores first interpolation and extrapolation approximation equation data (look up table data) based on a correlation parameter for representing a correlation between the fuel assembly nodal power value and the LPRM data based on the LPRM signal, or only a second interpolation and extrapolation approximation data (look up table data) for the LPRM data, which is described hereinafter.

In the case where the LPRM signal S2 of the LPRM detector 37 is high frequently adjusted by means of the LPRM signal processing unit 40 with the use of the GT data D1, when the control rod state or a void fraction of the channel changes so that an instantaneous or rapid transient phenomenon of the LPRM data D2 is generated, the second approximation data (look up table data), in order to simulate a different rate between an LPRM response change quantity of the LPRM data D2 and a GT response change quantity of the GT data D1 (change quantity in the case where the GT data D1 instantaneously shows a value of equilibrium state, is stored in the memory unit 61 of the process control computer 31 as interpolation and extrapolation approximation data (data set) or look up table data (data set) each of which is based on a correlation parameter for representing a correlation between the LPRM response change quantity of the LPRM data and the GT response change quantity of the GT data {e.g., a fuel type, a node burn-up, presence of control rod, a historical relative water density (historical void fraction), an instantaneous relative water density (instantaneous void fraction)}.

Namely, the second approximation data (look up table data) for the LPRM detector is used in the process of the power distribution simulation process module 60M2, as described hereinafter.

Figure 19:
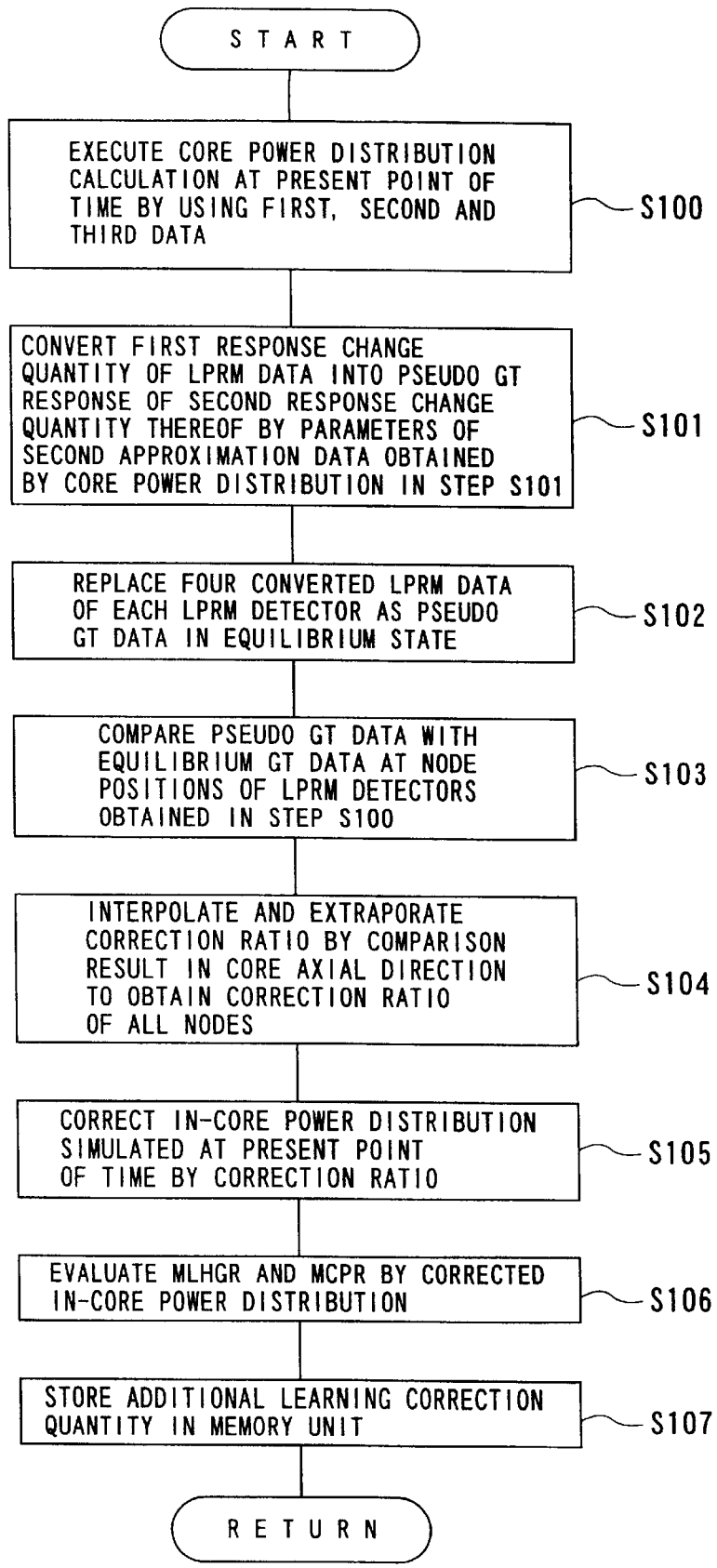
FIG. 19 is a flow chart schematically showing mainly processes of the nuclear instrumentation control process module of the CPU of the process control computer according to a tenth embodiment of the present invention.

That is, as shown in FIG. 19, in a state that it is determined by the GT signal processing unit 48 or the nuclear instrumentation control process module 60M1 that the GT data of the GT assembly 35 is changed into a transient state, in response to a selection instruction command of a power distribution adapting mode outputted from the input console by the operator, or a change instruction command of the power distribution adaptive mode automatically outputted from the nuclear instrumentation control process module 60M1, the power distribution simulation process module 60M2 executes the core power distribution calculation on the basis of the operational parameters (core state data) D3 at the present point of time in which the GT data D1 lies in the non-equilibrium state but the power distribution adaptive simulation is instructed with the LPRM data being calibrated, by using the core power distribution data (first data) in a state (equilibrium state) that the latest steady state retroactive from the present point of time, the adaptive correction data (second data) and the change data (third data) of the operating parameter (core state data D3) representing the core state (operating mode) until the present point of time (the point of time of adaptive correction executive processing) from the power distribution simulation in the above equilibrium state (step S100).

Next, the process module 60M2 receives the LPRM data D2 at the present point of time and obtains the parameters related to the second approximation data (look up data) according to the power distribution at the present point of time so as to convert the first response change quantity of the LPRM data D2 into the pseudo GT response of the second response change quantity thereof corresponding to the equilibrium value of the GT data (step S101).

Then, the power distribution simulation process module 60M2 replaces the four LPRM data D2 of each LPRM detector with the converted second response change quantity in the axial direction as pseudo GT data reaching the equilibrium state at the present point of time (step S102).

The power distribution simulation process module 60M2 makes a comparison between the above pseudo GT data value of the predetermined nodes at which the LPRM detectors are positioned and equilibrium GT data of the predetermined nodes in equilibrium GT data value (simulated value) of 24 nodes obtained in step S100 (step S103).

Furthermore, the power distribution simulation module 60M2 interpolates and extrapolates a correction ratio, which is obtained from the comparison process, referred to step S103, showing a difference between the pseudo GT data value and the equilibrium GT data value (simulated value) in the core axial direction so as to obtain a correction ratio (additional adaptive correction quantity; relative adaptive correction quantity) with respect to all axial nodes (24 nodes) (step S104).

The power distribution simulation process module 60M2 corrects an in-core power distribution of each fuel assembly node of the simulation result at the present point of time on the basis of the obtained additional adaptive correction quantity (correction ratio) of all axial nodes (step S105) so as to evaluate the maximum linear heat generating ratio (MLHGR) and the minimum critical power ratio (MCPR) at the present point of time (step S106).

Moreover, the power distribution simulation process module 60M2 stores the additional adaptive correction quantity of all axial nodes based on the aforesaid pseudo GT data in the memory unit 61, independently from the adaptive correction based on the GT data D1 of all axial nodes stored therein (step S107).

In the above manner, when the GT data is in non-equilibrium state and the signal level of them reaches in the transient state, in the case of carrying out power distribution adaptive correction process, the in-core power distribution simulated at the point of power distribution adaptive correction process execution time is learn and corrected on the basis of the adaptive correction in the GT data D1 which is in the equilibrium state and the additional adaptive correction based on the pseudo GT data estimated as the equilibrium value of the transient state obtained from the LPRM data, so that it is possible to generate a power distribution having a high accuracy.

Then, in the case where it is determined by the GT signal processing unit 48 or the nuclear instrumentation control process module 60M1 of the process control computer 31 that the GT data D1 of the GT assembly 35 reaches the equilibrium state, the power distribution simulation process module 60M2 zero-clears the additional adaptive correction quantity based on the LPRM data D2 stored in the memory unit 61 {means that the additionally relative adaptive correction ratio (correction coefficient) based on the LPRM data D2 is returned to 1.0}. As shown in FIG. 13 and FIG. 14, again an adaptive correction quantity based on only the GT data D1 in an equilibrium state is obtained and stored in the memory unit 61, and then, a power distribution adaptive correction process is carried out on the basis of the obtained adaptive correction quantity.

Thereby, even in the case where the GT data from the GT assembly 35 varies in a non-equilibrium state, the power distribution simulation process module 60M2 can execute a power distribution adaptive correction simulation based on in-core nuclear instrumentation. Therefore, it is possible to carry out, while the GT data lies in a non-equilibrium state, the in-core power distribution adaptive correction without waiting until the GT data D1 reaches the equilibrium state, thereby periodically or always executing the in-core power distribution adaptive correction process.

According to this tenth embodiment, in the point of power distribution adaptive correction time of non-equilibrium, the power distribution adaptive correction simulation has been carried out with the use of the interpolated and extrapolated additional adaptive correction obtained according to the LPRM data D2 detected by four LPRM detectors 37 arranged along the core axial direction. When the GT data reaches the equilibrium state, the additionally relative adaptive correction quantity having the possibility including an error in interpolation and extrapolation is zero-cleared at a timing of power distribution adaptive correction process based on the GT data, and thereafter, the power distribution adaptive correction process is carried out on the basis of the GT data D1 of the equilibrium state detected by the large number of GT detectors 35 arranged along the axial direction. Therefore, it is possible to solve the problem that an error of the LPRM assembly 34 gives an influence to the in-core power distribution simulation for a long period. Thus, since the simulation depends upon only error of the GT assembly 35, it is possible to considerably improve an accuracy of evaluation of the maximum linear heat generating ratio (MLHGR) and the minimum critical power ratio (MCPR).

In the ninth and tenth embodiments, in the case where the GT data is in a non-equilibrium state, the in-core power distribution has been simulated with the use of the LPRM data. In the non-equilibrium state, in the case where the LPRM detector 37 is bypassed due to a failure, it is possible to disregard the LPRM data of the bypassed LPRM detector 37 so as to preferentially gather the simulation value, or to use the LPRM data on a nuclear instrumentation tube position having a symmetry based on core fuel loading control rod pattern, in place of the bypassed LPRM data.

[Eleventh embodiment]

The following is a description on an eleventh embodiment of an in-core fixed nuclear instrumentation system, a power distribution simulating system and a power distribution monitoring system of the present invention.

This eleventh embodiment has the basically same structure as the reactor power distribution monitoring system 29, the in-core fixed nuclear instrumentation system 30 and the power distribution simulating system 31, which have been described in the first embodiment (see FIG. 1 to FIG. 11); therefore, the details are omitted.

In the power distribution monitoring system 29, the in-core fixed nuclear instrumentation system 30 and the power distribution simulating system of this eleventh embodiment, the number of GT detectors 44 in the axial direction is larger than that of LPRM detectors 37. By using this advantage, it is possible to carry out an adaptive correction of power distribution with the use of only GT data D1 even in the case where the GT data D1 outputted from the GT detector 44 is in a transient state.

More specifically, in the reactor power distribution monitoring system 29 described in the ninth and tenth embodiments, the GT data D1 outputted from the GT detector 44 is in a state of not reaching an equilibrium level of gamma decay, that is, after the operating parameter (core state data D3) including a core power, core coolant flow rate, control rod pattern varies, for examples within a short time such as an hour, a level of the GT data D1 (W/g) based on the GT signal S1 varies in minutes. Then, when the power distribution simulation process module 60M2 corrects the power distribution on the basis of the GT data D1, due to the non-equilibrium state of the GT data D1 is non-equilibrium state, the local power is over-estimated (in the case where the local power lowers) or is underestimated (in the case where the local power increases).

For this reason, even if the power distribution simulation process module 60M2 corrects the power distribution, the correction result of the power distribution includes an error. Thus, the response of the LPRM detector 37 having a fast response has been used as an auxiliary means (see ninth and tenth embodiments).

However, four LPRM detectors 37 are only arranged in the axial direction; for this reason, there is the possibility that an accuracy is deteriorated in view of the adaptive correction of the axial power distribution.

To solve the above problem, the in the reactor power distribution monitoring system 29, the in-core fixed nuclear instrumentation system 30 and the power distribution simulating system 31, the core state parameter signal (core state data D3) including a core power level, a core coolant flow rate, a control rod pattern and so on, which is outputted from the reactor core state data processing unit 58, is inputted to the power distribution simulation process module 60M2 via the nuclear instrumentation control process module 60M1 of the CPU 60 of the process control computer 31. Then, the power distribution simulation process module 60M2 periodically (every predetermined time) or always simulates an in-core power distribution on the basis of the inputted core state data D3 and the GT data D1.

Figure 20:
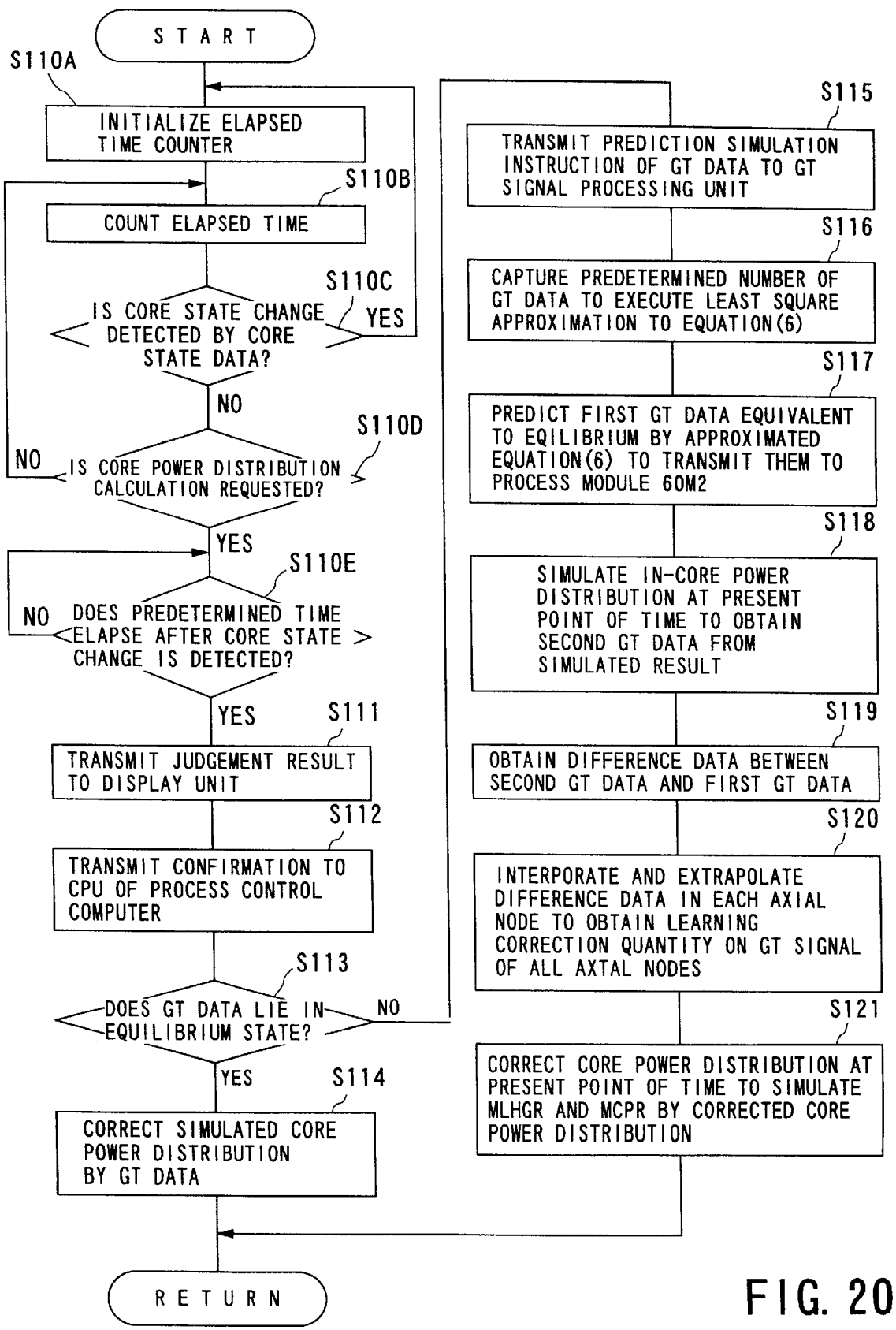
FIG. 20 is a flow chart schematically showing mainly processes of the nuclear instrumentation control process module, the power distribution simulation process module and the GT signal processing unit according to an eleventh embodiment of the present invention.

Namely, as shown in FIG. 20, the nuclear instrumentation control process module 60M1 of the CPU 60 initializes elapse time counter (step S110A), and counts the elapse time (step S110B). Next, the process module 60M1 judges whether or not the core state change is detected by the core state data (step S110C).

In the case where the core state change is detected, that is, the judgement of step S110C is YES, the process module 60M1 returns to a process of step S110A.

In the case where the core state change is not detected, that is, the judgement of step S110C is NO, the process module 60M1 judges whether or not the LPRM detector gain adjustment instruction is requested by the input console 62 (step In the case where the LPRM detector gain adjustment instruction is not requested, that is, the judgement of step S110D is NO, the process module 60M1 returns to a process of step S110B.

On the other hand, in the case where the LPRM detector gain adjustment instruction is requested, that is, the judgement of step S110D is YES, the process module 60M1

Namely, as shown in FIG. 20, the process module 60M1 detects a change of the core state on the basis of the core state data D3 so as to make a judgement whether or not a predetermined time elapses after the change of the core state is detected (step S110E).

Then, in the case where it is determined that the predetermined time elapses after detecting the change of the core state (the judgement of step S110E is YES), the process module 60M1 transmits the judgement result to the display unit 63 so as to inform it of the operator via the display unit 63 (step S111).

Then, the operator confirms the judgement result displayed on the display unit 63 so as to transmit a confirmation instruction to the nuclear instrumentation control process module 60M1 of the CPU 60 of the process control computer 31 by operating the input console 62 (step 112).

The nuclear instrumentation control process module 60M1 automatically makes a judgement whether or not the GT data D1 lies in an equilibrium state (step S113).

When the judgement of step S113 is YES, that is, the GT data D1 lies in the equilibrium state, the power distribution simulation process 60M2 of the CPU 60 corrects the simulated core power distribution according to the GT data D1 in the equilibrium state (step S114).

On the other hand, when the judgement of step S113 is NO, that is, the GT data D1 does not lie in the equilibrium state, the process module 60M1 transmits a simulation instruction for predicting the GT data D1 to the GT signal processing unit 48 (step S115).

In accordance with the transmitted GT signal prediction simulation instruction, the CPU 48A of the processing unit 48 gathers the predetermined number of GT data D1 (W/g signal level) generated according to the varying GT signal S1 at each predetermined times, for example, at several tens of seconds (20 to 30 seconds) or at each minute, that is, captures several or 10 points of the GT data D1 so as to carry out least square approximation to the following equation (6) (step S116).

$$(a + \Sigma b_i \cdot e^{-\lambda_i t}) \quad (6)$$

Where, "a" and "b" are constants to be approximated, and "t" is an elapse time (second or minute). In addition, "$\lambda$" is a nuclear time constant (see Table 1) set each node according to a time constant library previously stored in the memory unit 61 of the process control computer 31.

The CPU 48A of the GT signal processing unit 48 approximates the GT data D1 to the above equation (6) so as to determine the constants (coefficients), and then, estimates (predicts) an equilibrium level of the GT data based on the GT signal S1 actually measured by the GT detector 44 after a required time, e.g., one hour or more elapses according to the above equation (6) on the basis of the determined coefficients, thereby transmitting the estimated first GT data (equivalent to the equilibrium value) to the power distribution simulation process module 60M2 of the CPU 60 of the process control computer 31 (step S117). In addition, the above estimation (prediction) process of the equilibrium level of the GT data according to the above least square approximation may be carried out by the process module 60M1 of the CPU 60 of the process control computer 31.

On the other hand, the process module 60M2 simulates an in-core power distribution corresponding to the reactor operating mode on the basis of the core state data D3 representing the operating mode at the present point of time so as to obtain second GT data from the simulation result (step S118).

Next, the process module 60M2 obtains data showing a difference (ratio) between the second GT data (equivalent to the equilibrium value) simulated by the above simulation and the first GT data estimated from the actually measured GT signal S1 (step S119).

Subsequently, the process module 60M2 interpolates and extrapolates the difference data in each node arranged in the core axial direction so as to generate correction data (correction ratio data) with respect to all axial nodes, making it possible to obtain an adaptive correction quantity based on the GT signal of all axial nodes (step S120).

Then, the process module 60M2 corrects an in-core power distribution for each fuel assembly node of the simulation result at the present point of time on the basis of the determined adaptive correction quantity of all axial nodes and then calculates the maximum linear heat generating ratio (MLHGR) and the minimum critical power ratio (MCPR) at the present point of time (at the point of adaptive correction execution processing time) on the basis of the corrected in-core power distribution (step S121).

As a result, even in the case where the GT signal outputted from the GT detector 44 varies, a so-called reactor transient state, it is possible to monitor and evaluate a reactor power distribution.

At this time, the GT signal processing unit 48 (or the nuclear instrumentation control process module 60M1) carries out the prediction simulation for estimating (predicting) the equilibrium signal level of the GT detector 44 after a required time, e.g., one hour or more elapses. The prediction simulation is automatically successively carried out for each new time (e.g., for each 20 to 30 seconds or for each minute) for the duration that an information on prediction function mode (power distribution adaptive mode by GT data estimation) selective instruction is transmitted via the nuclear instrumentation control process module 60M1 from the input console 62.

More specifically, when the GT signal processing unit 48 (the nuclear instrumentation control process module 60M1) gathers the GT data D1 (W/g level signal) based on the new GT signal S1, the GT signal processing unit 48 cancels (deletes) the oldest data in time series, and updates the predictive GT data value (equilibrium value) from a time series GT data group having several or 10 data including the new GT data D1 according to the least square approximation based on the above equation (6), and thus, transmits the updated GT data value (equilibrium value) to the power distribution simulation process module 60M2. Then, the process module 60M2 carries out the in-core power distribution adaptive correction on the basis of the updated GT predictive simulation value. Furthermore, the process module 60M2 outputs an information indicative of a mode (power distribution adaptive correction by GT data estimation) of carrying out the power distribution adaptive correction with the use of the GT data equilibrium value to the display unit 63 so as to inform it of the operator.

The GT detector 44 has a thermal time constant of an order of second unit, and a gamma-ray source contributing to heating of the GT detector 44 has a time constant distribution of a wide range from a time constant of emitting a gamma-ray substantially simultaneous with a nuclear fission or a short time such as an order of second to a time constant of an order of minute, time and day.

A weight of component of each time constant depends upon a gamma source included in the fuel; however, the gamma source is different depending upon a fission nuclide (e.g., U235, Pu239, etc.) in a nuclear fission, and is different depending upon an elapse time after the nuclear fission.

A nuclide enrichment is strictly treated in the three-dimensional BWR simulator; for this reason, a component of nuclear time constant is determined for each node of the fuel assembly, and as a result, it is not practical use because the nuclear time constant data library stored in the memory unit becomes large.

So, in this eleventh embodiment, the time constant of the gamma source is limited to a time constant subjected to the gamma source at the point of time after a required time, e.g., one hour or a minute order elapses, and the number of data is limited to 10 or less or about 10. Then, the least square approximation is carried out so as to meet the following equation (7).

$$(a+\Sigma b_i e^{-\lambda_i t}) \quad (7)$$

Coefficients of a, bi (i=1 to about 10 at the maximum) is obtained from the above equation (7), and then, an equilibrium GT data value after a required time, e.g., one hour is estimated from the time series data of the GT data. A time constant (sec$^{-1}$) of JNDC approximation equation shown in the table 1 obtained from the nuclear time constant library is selected as a value of $\lambda_i$ in the above equation (7). This is one example, other time constants may be selected depending upon edit, and the number of data is reduced to 10 or less, and thereby, the GT detector has a further longer time constant (half life), and there is a method of omitting a low gamma source strength. For example, it is considered that a time constant of 10$^{-5}$ (sec$^{-1}$) is disregarded.

TABLE 1

| group | $\lambda$(sec$^{-1}$) |
| --- | --- |
| 1 | 1.330E-02 |
| 2 | 3.488E-02 |
| 3 | 1.357E-03 |
| 4 | 3.591E-03 |
| 5 | 5.004E-03 |
| 6 | 1.850E-04 |
| 7 | 5.645E-04 |
| 8 | 1.922E-05 |
| 9 | 4.918E-05 |
| 10 | 5.435E-05 |

According to this process, the GT signal processing unit 48 (the nuclear instrumentation control process module 60M1) selects the GT data D1 (W/g signal) based on the GT signal S1 outputted from the GT detector 44 for predetermined time, e.g., 30 seconds or one minute, and then, stores ten and several data in the memory unit 61 in time series. Further, the GT signal processing unit 48 (the nuclear instrumentation control process module 60M1) erases (deletes) the old time GT data, and successively updates and stores the new GT data in the memory unit 61. For example, the least square approximation of the following equation (8) is repeatedly carried out every 30 seconds or one minute.

$$(a+\Sigma b_i e^{-\lambda_i t}) \quad (8)$$

The GT prediction value after a predetermined time, e.g., about one hour is updated every least square approximation, and thereby, even if the GT signal S1 is in the non-equilibrium state, it is possible to generate the pseudo GT data value of the equilibrium state based on the GT signal outputted from the GT detector 44 every predetermined time, e.g., 30 second or one minute. Then, after about 5 to 15 minutes just after power change, it is possible to obtain the prediction equilibrium GT data value based on the GT signal outputted from the GT detector 44.

A sampling interval of the time series data is practically selected according to an operation (processing) speed of the GT signal processing unit 48 or the process control computer 31; therefore, the sampling interval is not limited to 30 seconds or one minute. In this embodiment, a clearly limited time interval is selected so that the sampling interval is determined to 30 seconds or one minute. However, it is considered that several number of GT data or 10 data may be successively sampled at substantially each 1 second per 1 sampled data for filtering noise for example fluctuation noise included in the GT data. The sampling process is able to obtain the least square approximation having high accuracy.

In addition, the number of data, which is stored in time series in the memory unit 61 and is fitted to the least square approximation, is not limited to about 10, but may be reduced to the number of data, that is, about 5 in view of a balance of a predictive accuracy and a time required for estimation. Namely, it is important to obtain a predictive value as fast as possible without decreasing the predictive accuracy.

Figure 21:
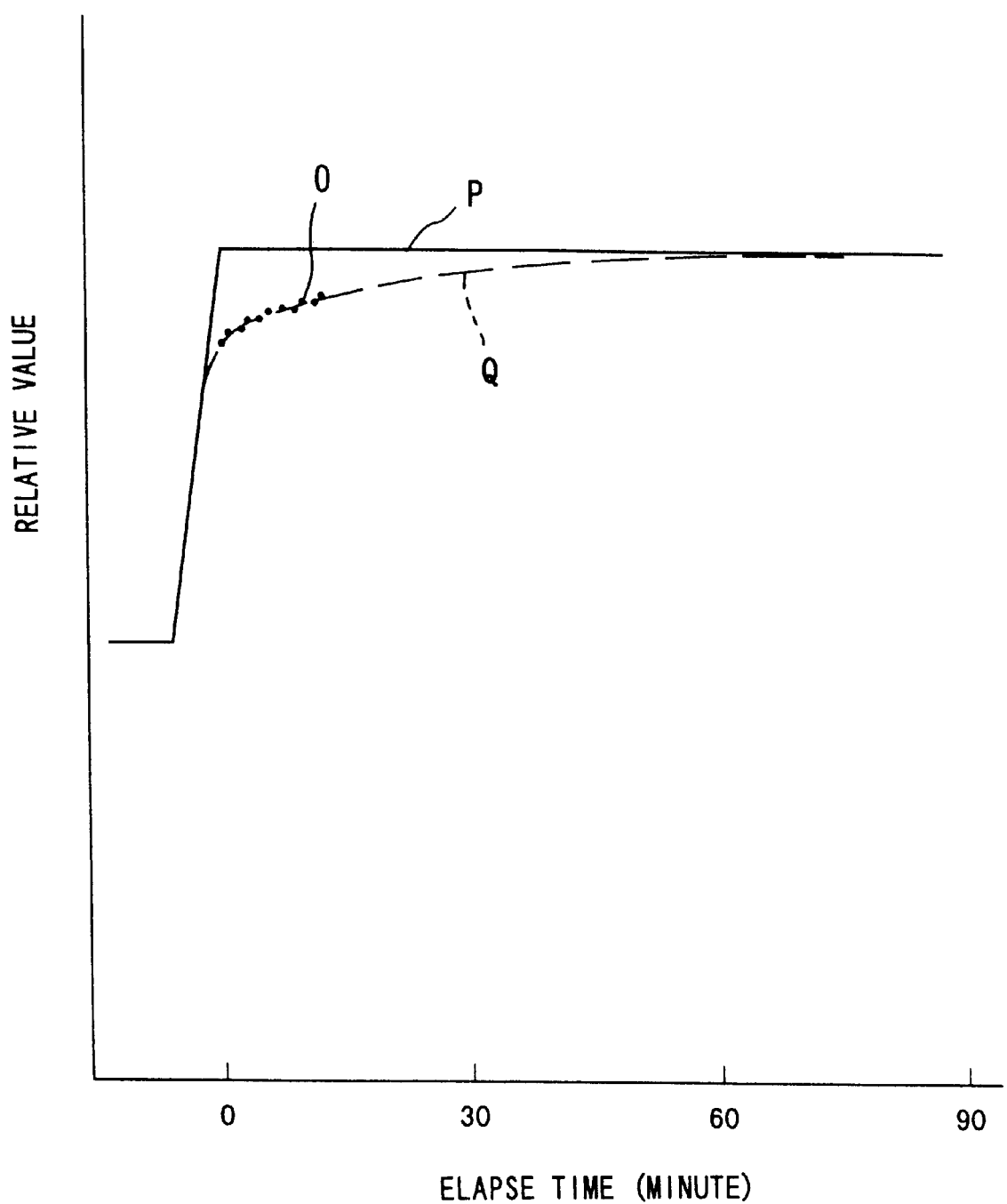
FIG. 21 is a view showing an actually measured GT data value and a GT data prediction value with respect to an elapse time (minute) when a power of fuel part around a detection portion of the GT detector increases.
Figure 22:
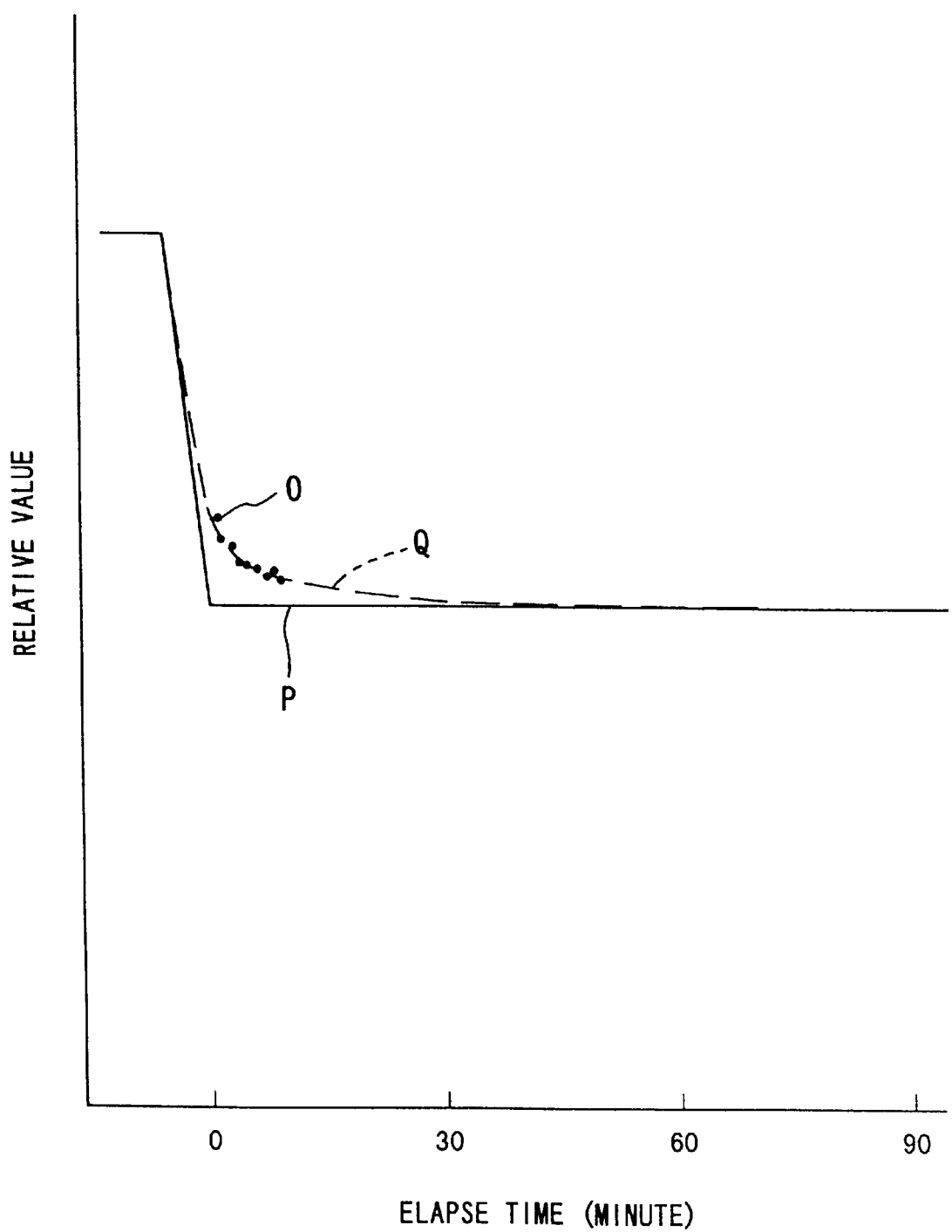
FIG. 22 is a view showing an actually measured GT data value and a GT data prediction value with respect to an elapse time (minute) when a power of fuel part around a detection portion of the GT detector decreases.

The following is a description on an operation of the in-core fixed nuclear instrumentation system 30 and the power distribution simulating system 31 with reference to FIG. 21 and FIG. 22. FIG. 21 is a graph showing the actually measured GT data value and the GT data prediction value with respect to the elapse time (minute) in the case where the power of fuel node around the detection portion of the GT detector 44 increases. FIG. 22 is a graph showing the actually measured GT data value and the GT data prediction value with respect to the elapse time (minute) in the case where the power of fuel node around the detection portion of the GT detector 44 conversely decreases.

In FIG. 21 and FIG. 22, a solid line P shows the actual change of the core local power, a dotted line O shows the actually measured GT data (W/g signal) value, and a broken line Q shows the GT data prediction value. In any cases, the GT signal having the number of data after change, e.g., 10 is captured in time series, and then, is fitted to the least square approximation. By using the sum of the polynomial and the constant term of the obtained exponential function (see equations (6) to (8)), the equilibrium value can be accurately simulated. In particular, a decay time constant of gamma source contributing for the duration from a minute to hour is selected so as to reduce the number of polynomial, and thereby, it is possible to very effectively shorten the simulation time.

In calculation of the least square approximation, in order to make convergence fast, a set of a and bi of the initial guess is prepared separately from the case of core power increase and the case of core power decrease.

As a result, according to the aforesaid simple process, it is possible to readily estimate the gamma-ray heating value (GT equilibrium data value) in the equilibrium state of gamma decay without simulating a history before the point of time at which the transient change happens, which includes the power change of local power distribution and the whole of core, and a distribution of gamma source at the point of time, which are studied conventionally, so as to execute a complicate process for determining a gamma heating value after core power change according to the simulated result.

Moreover, the power distribution monitoring system 29 is operated at a mode (power distribution adaptive mode by GT data prediction) for determining the gamma heating value (GT data value) by a predictive calculation, and then, the above information is displayed on the display unit 63 so as to inform it of the operator. Whereby it is possible to give the following caution to the operator, that is, a caution of including an error by the predictive calculation in LPRM adjustment and the power distribution simulation result already corrected.

In this eleventh embodiment, the equilibrium state prediction simulation function of the GT data value used in the case where the GT signal is in the non-equilibrium state, and it is normal not to always use the function. The present invention is not limited to this.

The following is a description on a modification of this eleventh embodiment. More specifically, the GT signal processing unit 48 always transmits the GT data (W/g signal using the prediction simulation function to the process control computer 31 (power distribution simulation process module 60M2) except heater calibration of the GT detector 44. Then, the CPU 60 of the process control computer 31 always captures the transmitted predicted GT data value, and uses the predicted GT data value for adapting correction of the power distribution, or for adjusting at least one of the LPRM sensitivity and gain in the LPRM signal processing unit 48.

In this modification, the process of adjusting at least one of the LPRM sensitivity and the gain includes the following two processes: more specifically, (1) a process for adjusting at least one of the sensitivity and the gain of the LPRM detector so as to directly coincide with the GT equilibrium data simulation value; and (2) a process for adapting and simulating the in-core power distribution by the power distribution simulation process module 60M2 with the use of the GT equilibrium data simulation value, and adjusting at least one of the sensitivity and the gain of the LPRM detector so as to directly coincide with the LPRM signal (LPRM data) simulated with the use of the simulated result.

At least one of the sensitivity and the gain of the LPRM detector 37 is carried out according to an operation command from the operator from the display unit 63 via the nuclear instrumentation control process module 60M1.

Whereby the operator does not need to be anxious about whether the GT data level is in the non-equilibrium state or the equilibrium state, and power distribution adaptive simulation and LPRM gain and sensitivity adjustment are automatically carried out on the basis of the GT data of equilibrium level. Therefore, it is possible to readily use the in-core power distribution monitoring system 29, and to reduce a load work onto the operator.

In this case, however, the GT signal processing unit 48 or the CPU 60 of the process control computer 31 always monitors an accuracy by the least square approximation, and in the case where the accuracy of the least square approximation is less than a predetermined accuracy, the CPU 60 outputs a warning to the display unit 63 so as to inform it of the operator. Then, the operator manually controls the power distribution adaptive simulation or at least one of the adjustment of the sensitivity and the gain of the LPRM using the above GT equilibrium data value via the input console 62. With the above construction, in the case where the accuracy of the least square approximation is less than the predetermined accuracy, the power distribution adaptive simulation or the adjustment of at least one of the sensitivity and the gain of the LPRM using the above GT equilibrium data value is stopped, and then, is changed into the power distribution adaptive simulation or the adjustment of at least one of the sensitivity and the gain of the LPRM based on the operator's manual instruction. Thus, it is possible to maintain a high reliability of the power distribution monitoring system.

As described above, in this eleventh embodiment, even in a state that the GT signal detected by the GT detector does not reach the signal level of equilibrium state of the gamma decay chain, the response of the GT detector 44 is readily corrected so as to carry out the three-dimensional power distribution adaptive process. Therefore, with the use of only simply GT detection signal of the in-core fixed nuclear instrumentation system 30, it is possible to monitor the operational thermal limit value such as the maximum linear heat generating ratio (MLHGR) and the minimum critical power ratio (MCPR). The monitoring can be carried out within a practical time delay at an arbitrary point of time.

While there has been described what is at present considered to be the preferred embodiments and modifications of the present invention. It will be understood that various modifications which are not described yet may be made therein, and it is intended to cover in the appended claims all such modifications as fall within the true spirit and scope of the invention.

What is claimed is:

1. An in-core fixed nuclear instrumentation system for a reactor, comprising:

a plurality of in-core nuclear instrumentation assemblies each having a nuclear instrumentation tube, a plurality of fixed neutron detectors housed in the nuclear instrumentation tube and adapted to detect neutron flux of a local power distribution of a power range in a core of the reactor and a gamma-ray thermometer assembly housed in the nuclear instrumentation tube, said gamma-ray thermometer assembly having a plurality of fixed γ-ray heating detectors for detecting γ-ray heating values and a heater built therein and adapted to calibrate the fixed γ-ray heating detectors, said fixed γ-ray heating detectors being arranged at least close to the fixed neutron detectors;

means for processing a neutron flux detection signal based on the detected neutron flux by each of the fixed neutron detectors;

means for processing a gamma-ray thermometer signal based on the detected γ-ray heating value by each of the fixed γ-ray heating detectors of each of the gamma-ray thermometer assemblies;

means for electrically energizing the heater in each of the gamma-ray thermometer assemblies;

means for storing a plurality of predetermined time intervals therein; and means for selecting one of the predetermined time intervals for specified γ-ray thermometer assemblies respectively, wherein said energizing means is adapted to control an electrical energy supplied to the heater according to the selected one of the predetermined time intervals so as to heat the heater, thereby executing a heater calibration of output voltage sensitivities of the fixed γ-ray heating detectors of the gamma-ray thermometer assembly.

2. An in-core fixed nuclear instrumentation system according to claim 1, wherein said means for processing a gamma-ray thermometer signal has means for measuring increases of the output voltages of the fixed γ-ray heating detectors of the gamma-ray thermometer assemblies, and said energizing means has means for measuring current and voltage corresponding to the supplied electrical energy with the energizing means so as to execute the heater calibration according to the measured increases of the output voltages of the γ-ray heating detectors and the measured currents and voltages, said increases of the output voltages being caused by the heating of the heaters, and said selection means has means for storing at least one of an in-core mounted time of each of the gamma-ray thermometer assemblies and an in-core irradiation quantity of each of the fixed γ-ray heating detectors thereof, which are calculated while the reactor operates, said in-core mounted time of each gamma-ray thermometer assemblies representing an operating time of the reactor after each of the gamma-ray thermometer assemblies is mounted in the core, and means for selecting one of the predetermined time intervals according to at least one of the in-core mounted time and the in-core irradiation quantity corresponding to the gamma-ray thermometer assembly.

3. An in-core fixed nuclear fixed nuclear instrumentation system according to claim 2, wherein said means for processing a gamma-ray thermometer signal is adapted to store time series data of the output voltage sensitivity of the fixed γ-ray heating detector of each of the gamma-ray thermometer assemblies, estimate a change curve of each output voltage sensitivity thereof by sampling latest two and over time series data points from a present point of time by using the time series data, in a case where the change curve of the output voltage sensitivity exceeds a predetermined judgment value present with respect to a predetermined future time, set another one of the predetermined time intervals prior to the selected time interval, said another one of the time intervals being shorter than the selected time interval or being a maximum time interval of the predetermined time intervals satisfying the predetermined judgment value, and said energizing means executes the heater calibration of the output voltage sensitivity by heating of the heater at a reset future time in accordance with the set another one of the time intervals.

4. An in-core fixed nuclear instrumentation system according to claim 2, wherein said means for processing a gamma-ray thermometer signal comprises means for automatically judging whether or not the selected time interval at a present point of time is changed to another one of the predetermined time intervals, said another one of the predetermined time intervals being adjacently longer than the selected time interval.

5. An in-core fixed nuclear instrumentation system according to claim 2, wherein said predetermined time intervals includes a first time interval, a second time interval, a third time interval and so on in an order from a shortest time interval, and wherein said energizing means is adapted to execute, at first, the heater calibration at the first shortest predetermined time interval in the stored predetermined time intervals so as to store time series data of the output voltage sensitivity of the fixed γ-ray heating detector of each of the gamma-ray thermometer assemblies according to each execution of the heater calibration, estimate a change curve of the output voltage sensitivity thereof by sampling latest two and over time series data points from a present point of time by using the time series data, in a case where the change curve of the output voltage sensitivity is less than a first predetermined judgement value preset with respect to a second predetermined future time interval, set the heater calibration interval with the second predetermined time interval in the stored predetermined time intervals, said second predetermined time interval being longer than the first predetermined time interval so as to execute the heater calibration of the output voltage sensitivity after the second predetermined future time interval by heating of the heater, in a case where the change curve of the output voltage sensitivity exceeds the first predetermined judgement value preset with respect to the second predetermined future time interval, execute the heater calibration of the output voltage sensitivity by heating of the heater in accordance with the first predetermined time interval, when executing the heater calibration at the second predetermined time interval, in a case where the change curve of the output voltage sensitivity is less than a first predetermined judgement value preset with respect to a third predetermined future time interval, set the heater calibration interval with the third predetermined time interval in the stored predetermined time intervals, said third predetermined time interval being longer than the second predetermined time interval, so as to execute the heater calibration of the output voltage sensitivity after the third predetermined future time interval by heating of the heater, in a case where the change curve of the output voltage sensitivity exceeds the first predetermined judgement value preset with respect to the third predetermined future time interval, execute the heater calibration of the output voltage sensitivity by heating of the heater in accordance with the second predetermined time interval.

6. An in-core fixed nuclear instrumentation system according to claim 2, wherein said means for processing a gamma-ray thermometer signal is adapted to store time series data of the output voltage sensitivity of the fixed γ-ray heating detector of the gamma-ray thermometer assembly according to each execution of the heater calibration, estimate a change curve of the output voltage sensitivity thereof by sampling latest two and over time series data points from a present point of time by using the time series data, in a case where the change curve of the output voltage sensitivity exceeds a predetermined judgment value preset with respect to a predetermined future time of current selected time interval, set another one of the predetermined time intervals, said another one of the time intervals being a maximum time interval which is capable of being selected in the predetermined time intervals or of being an adjacently shorter than the current selected time interval, and said energizing means executes the heater calibration of the output voltage sensitivity at the predetermined future time by heating of the heater in accordance with the set another one of the time intervals.

* * * * *